(12) United States Patent
Kondo et al.

(10) Patent No.: US 7,340,106 B2
(45) Date of Patent: Mar. 4, 2008

(54) IMAGE PROCESSING APPARATUS AND METHOD, AND IMAGE-CAPTURING APPARATUS

(75) Inventors: Tetsujiro Kondo, Tokyo (JP); Naoki Fujiwara, Tokyo (JP); Junichi Ishibashi, Saitama (JP); Takashi Sawao, Tokyo (JP); Takahiro Nagano, Kanagawa (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 10/362,579

(22) PCT Filed: Jun. 25, 2002

(86) PCT No.: PCT/JP02/06337

§ 371 (c)(1),
(2), (4) Date: Jul. 28, 2003

(87) PCT Pub. No.: WO03/001454

PCT Pub. Date: Jan. 3, 2003

(65) Prior Publication Data

US 2004/0005084 A1 Jan. 8, 2004

(30) Foreign Application Priority Data

Jun. 26, 2001 (JP) ............................. 2001-193370

(51) Int. Cl.
*G06K 9/40* (2006.01)

(52) U.S. Cl. ...................... 382/264; 382/274; 382/275; 382/282; 358/464; 345/640

(58) Field of Classification Search ................ 382/264, 382/266, 275, 282, 274; 358/463, 466, 3.26, 358/3.27; 348/586, 607; 345/611, 616, 345/640

See application file for complete search history.

(56) References Cited

U.S. PATENT DOCUMENTS 4,992,869 A 2/1991 Samad et al.

5,615,287 A * 3/1997 Fu et al. ..................... 382/232

(Continued)

FOREIGN PATENT DOCUMENTS

EP 0 395 274 10/1990

(Continued)

OTHER PUBLICATIONS

Guo J et al: "Fast and Robust Moving Object Segmentation Technique for MPEG-4 Object-Based Coding and Functionality" Proceedings of the SPIE, SPIE, Bellingham, VA, US, vol. 3561, 1998, pp. 106-117, XP000870016 ISSN: 0277-786X.

(Continued)

*Primary Examiner*—Yosef Kassa
(74) *Attorney, Agent, or Firm*—Frommer Lawrence & Haug LLP; William S. Frommer; Thomas F. Presson

(57) ABSTRACT

The present invention allows the amount of movement indicating the movement of an object within an exposure period to be obtained. An estimated-mixture-ratio processor 401 calculates an estimated mixture ratio for each pixel and an estimated motion vector by a calculation corresponding to a model of a covered background area, and sends the calculated estimated mixture ratio and the calculated estimated motion vector to a mixture-ratio determining portion 403. An estimated-mixture-ratio processor 402 calculates an estimated mixture ratio for each pixel and an estimated motion vector by a calculation corresponding to a model of an uncovered background area, and sends the calculated estimated mixture ratio and the calculated estimated motion vector to the mixture-ratio determining portion 403. The mixture-ratio determining portion 403 sets a mixture ratio and a motion vector according to area information indicating to which of a foreground area, a background area, the covered background area, or the uncovered background area a designated pixel belongs. The present invention can be applied to image processing apparatuses.

24 Claims, 80 Drawing Sheets

U.S. PATENT DOCUMENTS

| | | | | |
|---|---|---|---|---|
| 5,742,354 | A * | 4/1998 | Vlahos et al. | 348/586 |
| 5,787,199 | A * | 7/1998 | Lee | 382/203 |
| 5,812,787 | A * | 9/1998 | Astle | 709/247 |
| 5,867,284 | A * | 2/1999 | Heinrichs et al. | 358/516 |
| 5,923,791 | A * | 7/1999 | Hanna et al. | 382/295 |
| 5,933,151 | A * | 8/1999 | Jayant et al. | 345/473 |
| 6,005,683 | A * | 12/1999 | Son et al. | 358/488 |
| 6,054,999 | A * | 4/2000 | Strandberg | 345/474 |
| 6,134,346 | A * | 10/2000 | Berman et al. | 382/163 |
| 6,396,949 | B1 * | 5/2002 | Nichani | 382/173 |
| 6,525,741 | B1 * | 2/2003 | Klassen et al. | 345/589 |
| 6,707,487 | B1 * | 3/2004 | Aman et al. | 348/169 |
| 6,771,834 | B1 * | 8/2004 | Martins et al. | 382/257 |
| 6,829,384 | B2 * | 12/2004 | Schneiderman et al. | 382/154 |
| 6,839,463 | B1 * | 1/2005 | Blake et al. | 382/173 |

FOREIGN PATENT DOCUMENTS

| | | |
|---|---|---|
| EP | 0 933 727 | 8/1999 |
| EP | 1 411 473 | 4/2004 |
| JP | 3-62692 | 3/1991 |
| JP | 7-336688 | 12/1995 |
| JP | 10-164436 | 6/1998 |
| JP | 2000-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |

OTHER PUBLICATIONS

Lequang D et al: "Motion field and image intensity segmentation for object-oriented coding of video sequences" Proceedings of the SPIE—The International Society for Optical Engineering SPIE-Int. Soc. Opt. Eng USA, vol. 3024, 1997, pp. 711-722, XP002399417 ISSN: 0277-786X.

* cited by examiner

FIG. 3
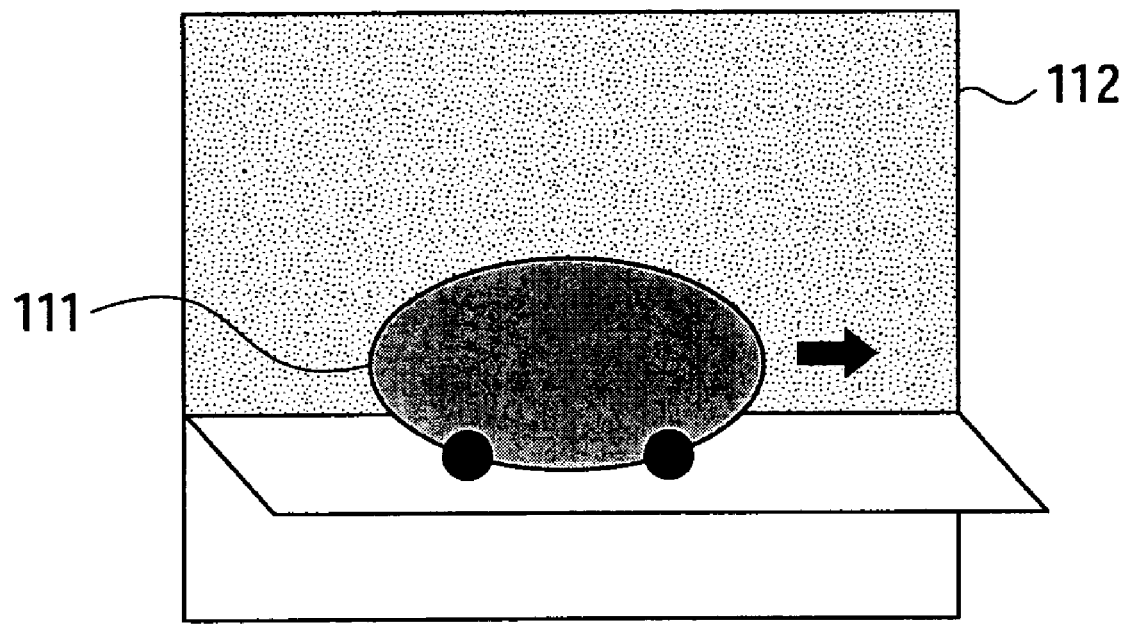
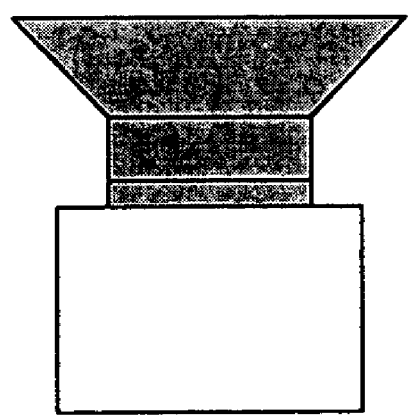

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

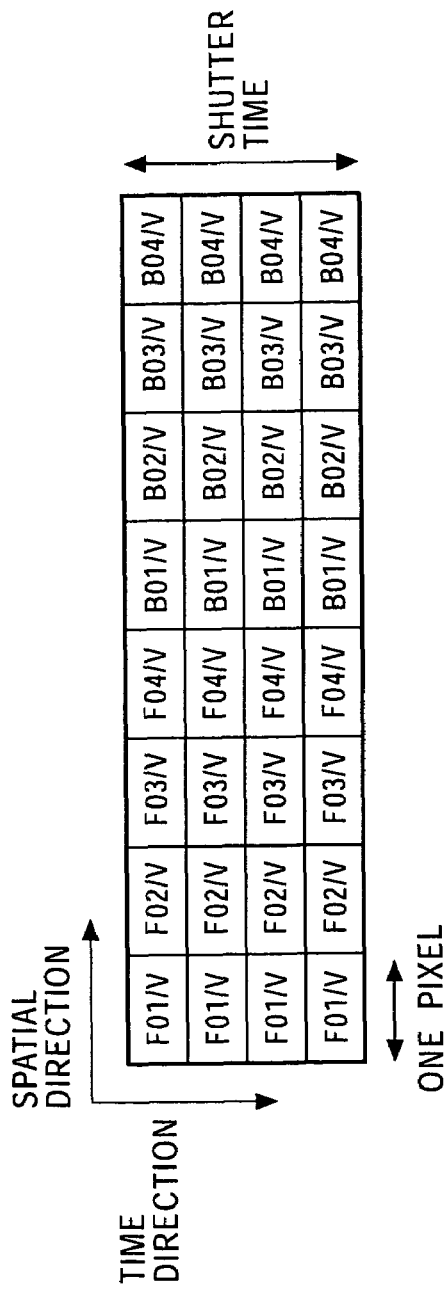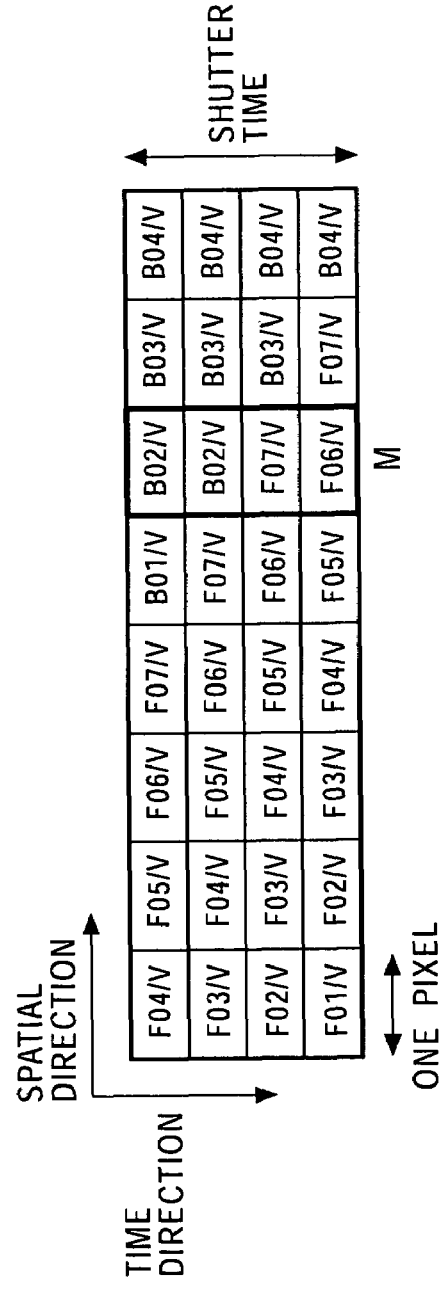

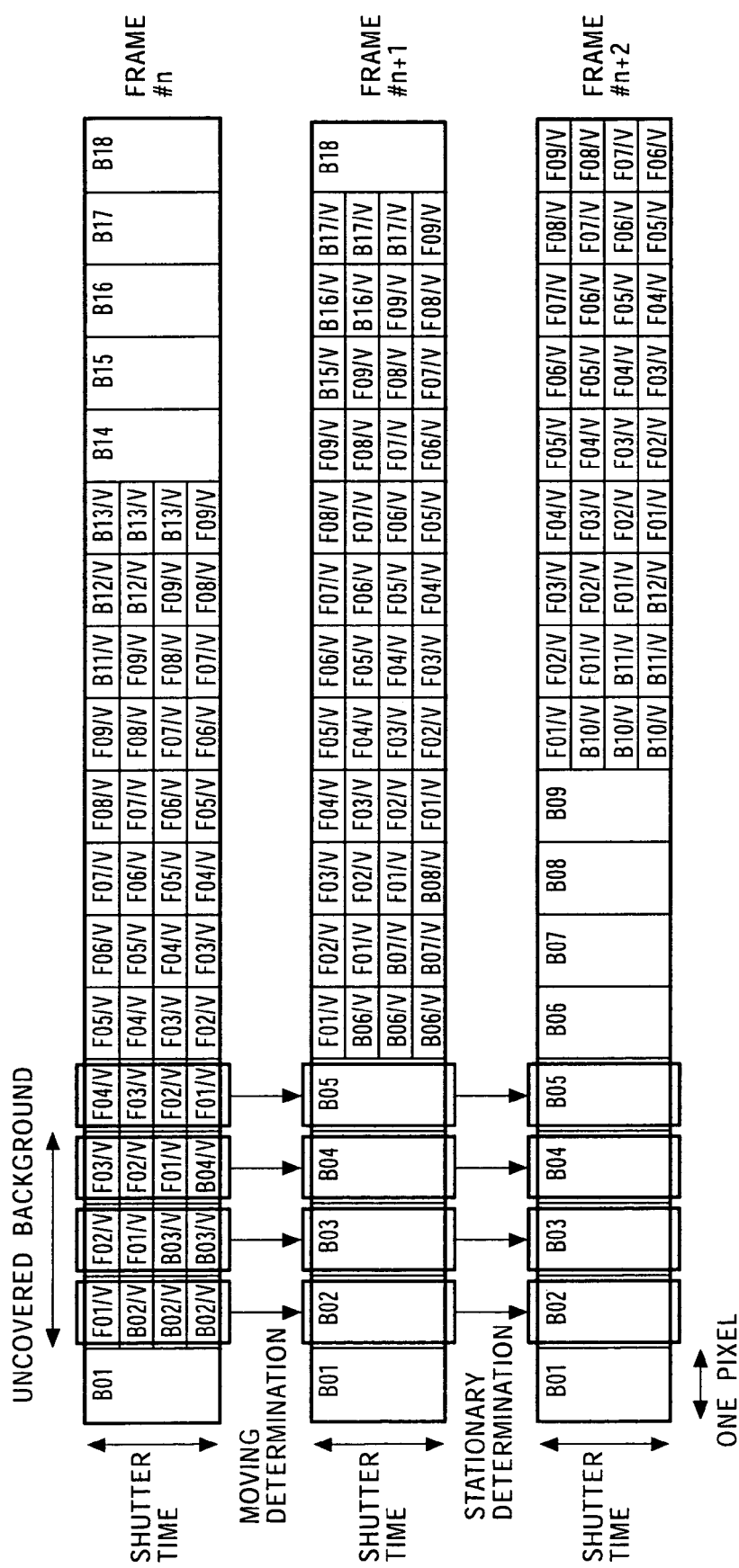

FIG. 30

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

FIG. 38A

| $X_0$ | $X_1$ | $X_2$ |
|---|---|---|
| $X_3$ | $X_4$ | $X_5$ |
| $X_6$ | $X_7$ | $X_8$ |

FIG. 38B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 39A

| $X_0$ | $X_1$ | $X_2$ |
|---|---|---|
| $X_3$ | $X_4$ | $X_5$ |
| $X_6$ | $X_7$ | $X_8$ |

FIG. 39B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 42

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 60A
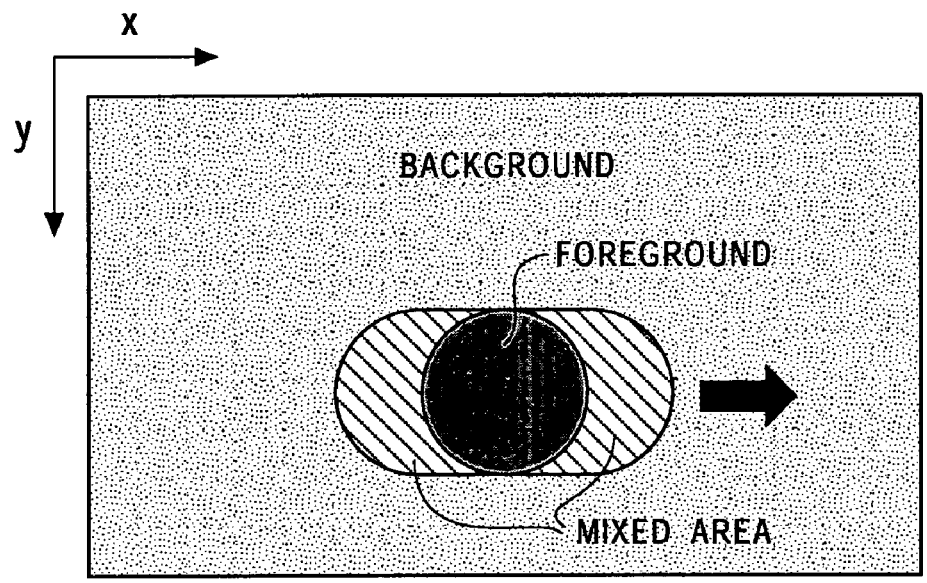
SEPARATE FOREGROUND AND BACKGROUND
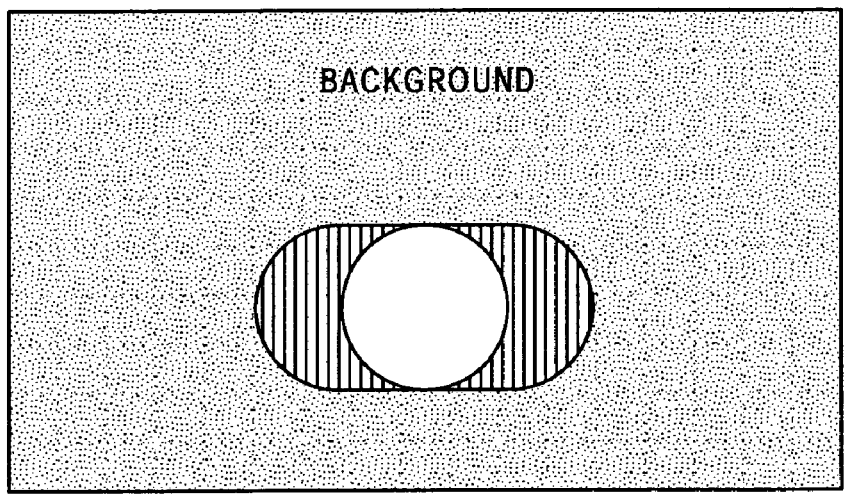
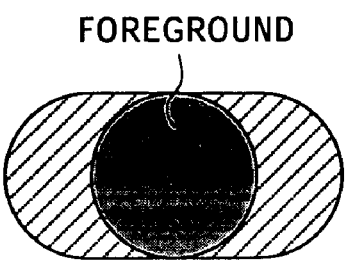

IMAGE PROCESSING APPARATUS AND METHOD, AND IMAGE-CAPTURING APPARATUS

TECHNICAL FIELD

The present invention relates to image processing apparatuses and methods, and image-capturing apparatuses, and more particularly, to an image processing apparatus and method, and an image-capturing apparatus in which a difference between a signal detected by a sensor and the real world is taken into consideration.

BACKGROUND ART

Conventionally, a technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

However, when a moving object is captured as a motion image, the image of the moving object is captured according to an exposure period of which one frame is captured, that is, a shutter period. Conventionally, obtaining the amount of movement indicating the movement of the object within the shutter period was not considered.

DISCLOSURE OF INVENTION

The present invention has been made in view of the above-described background. Accordingly, it is an object of the present invention to make it possible to obtain the amount of movement indicating the movement of an object within an exposure period.

An image processing apparatus according to the present invention is characterized by including mixture-ratio detection means for detecting, in a mixture area where a foreground object component constituting a foreground object and a background object component constituting a background object are mixed in image data, a mixture ratio indicating the ratio of a mixture between the foreground object component and the background object component, and movement-amount detection means for detecting the amount of movement of the foreground object in an exposure period when pixel data constituting the image data has been obtained, in correspondence with the mixture ratio.

The image processing apparatus can be configured such that the mixture-ratio detection means includes relational-expression generating means for extracting, in correspondence with a designated pixel in a designated frame of the image data, the pixel data in a nearby frame close to the designated frame as background pixel data corresponding to the background object; also for extracting the designated-pixel data of the designated pixel and vicinity-pixel data of a vicinity pixel in a vicinity of the designated pixel in the designated frame; and for generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

The image processing apparatus can be configured such that the relational-expression generating means generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

The image processing apparatus can be configured such that the movement-amount detection means detects the reciprocal of the gradient of the linear changes of the mixture ratios corresponding to the positions of the pixels in the mixture area as the amount of movement of the foreground object within the exposure period when the image data has been obtained, and outputs the detected amount of movement.

An image processing method according to the present invention is characterized by including a mixture-ratio detection step of detecting, in a mixture area where a foreground object component constituting a foreground object and a background object component constituting a background object are mixed in image data, a mixture ratio indicating the ratio of a mixture between the foreground object component and the background object component, and a movement-amount detection step of detecting the amount of movement of the foreground object in an exposure period when pixel data constituting the image data has been obtained, in correspondence with the mixture ratio.

The image processing method can be configured such that the mixture-ratio detection step is provided with a relational-expression generating step of extracting, in correspondence with a designated pixel in a designated frame of the image data, the pixel data in a nearby frame close to the designated frame as background pixel data corresponding to the background object; also of extracting the designated-pixel data of the designated pixel and vicinity-pixel data of a vicinity pixel in a vicinity of the designated pixel in the designated frame; and of generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions in the mixture-ratio detection step.

The image processing method can be configured such that, in the relational-expression generating step, the relational expressions are generated according to a first approximation in which the values of components of the foreground object are the same, the components being included in the designated-pixel data and the vicinity-pixel data, and a second approximation in which the mixture ratio changes linearly with respect to the positions of the pixels in the mixture area.

The image processing method can be configured such that, in the movement-amount detection step, the reciprocal of the gradient of the linear changes of the mixture ratios corresponding to the positions of the pixels in the mixture area is detected as the amount of movement of the foreground object within the exposure period when the image data has been obtained, and the detected amount of movement is output.

A program in a recording medium according to the present invention is characterized by including a mixture-ratio detection step of detecting, in a mixture area where a foreground object component constituting a foreground object and a background object component constituting a background object are mixed in image data, a mixture ratio indicating the ratio of a mixture between the foreground object component and the background object component, and a movement-amount detection step of detecting the amount of movement of the foreground object in an exposure period when pixel data constituting the image data has been obtained, in correspondence with the mixture ratio.

The recording medium can be configured such that the mixture-ratio detection step is provided with a relational-expression generating step of extracting, in correspondence with a designated pixel in a designated frame of the image data, the pixel data in a nearby frame close to the designated frame as background pixel data corresponding to the background object; also of extracting the designated-pixel data of the designated pixel and vicinity-pixel data of a vicinity pixel in a vicinity of the designated pixel in the designated frame; and of generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

The recording medium can be configured such that, in the relational-expression generating step, the relational expressions are generated according to a first approximation in which the values of components of the foreground object are the same, the components being included in the designated-pixel data and the vicinity-pixel data, and a second approximation in which the mixture ratio changes linearly with respect to the positions of the pixels in the mixture area.

The recording medium can be configured such that, in the movement-amount detection step, the reciprocal of the gradient of the linear changes of the mixture ratios corresponding to the positions of the pixels in the mixture area is detected as the amount of movement of the foreground object within the exposure period when the image data has been obtained, and the detected amount of movement is output.

A program according to the present invention is characterized by causing a computer to execute a mixture-ratio detection step of detecting, in a mixture area where a foreground object component constituting a foreground object and a background object component constituting a background object are mixed in image data, a mixture ratio indicating the ratio of a mixture between the foreground object component and the background object component, and a movement-amount detection step of detecting the amount of movement of the foreground object in an exposure period when pixel data constituting the image data has been obtained, in correspondence with the mixture ratio.

The program can be configured such that the mixture-ratio detection step is provided with a relational-expression generating step of extracting, in correspondence with a designated pixel in a designated frame of the image data, the pixel data in a nearby frame close to the designated frame as background pixel data corresponding to the background object; also of extracting the designated-pixel data of the designated pixel and vicinity-pixel data of a vicinity pixel in a vicinity of the designated pixel in the designated frame; and of generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

The program can be configured such that, in the relational-expression generating step, the relational expressions are generated according to a first approximation in which the values of components of the foreground object are the same, the components being included in the designated-pixel data and the vicinity-pixel data, and a second approximation in which the mixture ratio changes linearly with respect to the positions of the pixels in the mixture area.

The program can be configured such that, in the movement-amount detection step, the reciprocal of the gradient of the linear changes of the mixture ratios corresponding to the positions of the pixels in the mixture area is detected as the amount of movement of the foreground object within the exposure period when the image data has been obtained, and the detected amount of movement is output.

An image-capturing apparatus according to the present invention is characterized by including image-capturing means for outputting an image of an object captured by an image-capturing device that includes a predetermined number of pixels having a time integrating function, as image data formed of a predetermined number of pixel data; mixture-ratio detection means for detecting, in a mixture area where a foreground object component constituting a foreground object and a background object component constituting a background object are mixed in the image data, a mixture ratio indicating the ratio of a mixture between the foreground object component and the background object component, and movement-amount detection means for detecting the amount of movement of the foreground object in an exposure period when the pixel data constituting the image data has been obtained, in correspondence with the mixture ratio.

The image-capturing apparatus can be configured such that the mixture-ratio detection means includes relational-expression generating means for extracting, in correspondence with a designated pixel in a designated frame of the image data, the pixel data in a nearby frame close to the designated frame as background pixel data corresponding to the background object; also for extracting the designated-pixel data of the designated pixel and vicinity-pixel data of a vicinity pixel in a vicinity of the designated pixel in the designated frame; and for generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

The image-capturing apparatus can be configured such that the relational-expression generating means generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

The image-capturing apparatus can be configured such that the movement-amount detection means detects the reciprocal of the gradient of the linear changes of the mixture ratios corresponding to the positions of the pixels in the mixture area as the amount of movement of the foreground object within the exposure period when the image data has been obtained, and outputs the detected amount of movement.

In a mixture area where a foreground object component constituting a foreground object and a background object component constituting a background object are mixed in image data, a mixture ratio indicating the ratio of a mixture between the foreground object component and the background object component is detected, and the amount of movement of the foreground object in an exposure period when pixel data constituting the image data has been obtained is detected in correspondence with the mixture ratio.

Therefore, the amount of movement indicating the movement of an object within the exposure period can be obtained.

BRIEF DESCRIPTION OF THE DRAWINGS

FIG. 3 illustrates image capturing performed by a sensor.

FIG. 9 illustrates a model in which pixel values are developed in the time direction and the period corresponding to the shutter time is divided.

FIG. 10 illustrates a model in which pixel values are developed in the time direction and the period corresponding to the shutter time is divided.

FIG. 29 illustrates a model in which pixel values are developed in the time direction and the period corresponding to the shutter time is divided.

FIG. 30 illustrates conditions for determining the areas.

FIG. 38A illustrates the calculation of a correlation value.

FIG. 38B illustrates the calculation of a correlation value.

FIG. 39A illustrates the calculation of a correlation value.

FIG. 39B illustrates the calculation of a correlation value.

FIG. 42 illustrates determinations made by an area determining portion 342.

FIG. 60A illustrates an input image, a foreground component image, and a background component image.

BEST MODE FOR CARRYING OUT THE INVENTION

Figure 1:
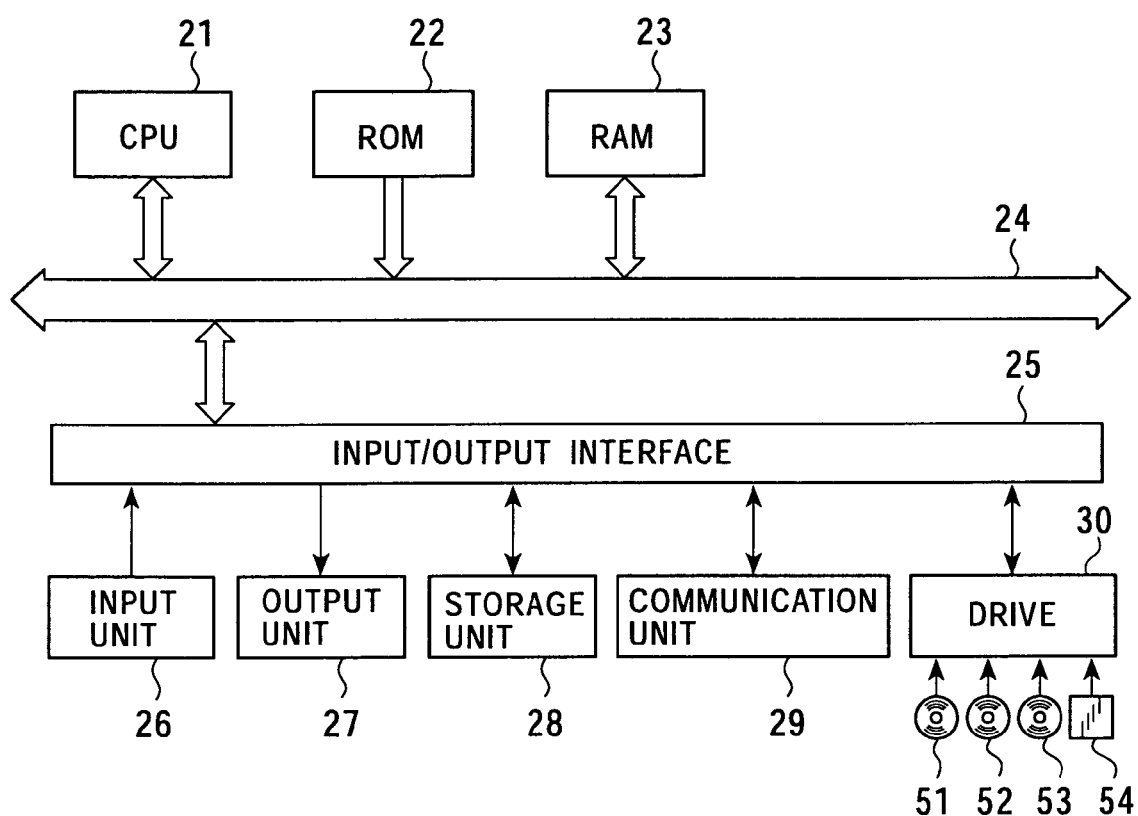
FIG. 1 is a view showing an image processing apparatus according to an embodiment of the present invention.

FIG. 1 illustrates an image processing apparatus according to an embodiment of the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26 formed of a keyboard, a mouse, a microphone, and so on and an output unit 27 formed of a display, a speaker, and so on are connected to the input/output interface 25. The CPU 21 executes various types of processing in response to commands input from the input unit 26. The CPU 21 then outputs an image or sound obtained as a result of the processing to the output unit 27.

The storage unit 28, connected to the input/output interface 25, is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disk 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

Figure 2:
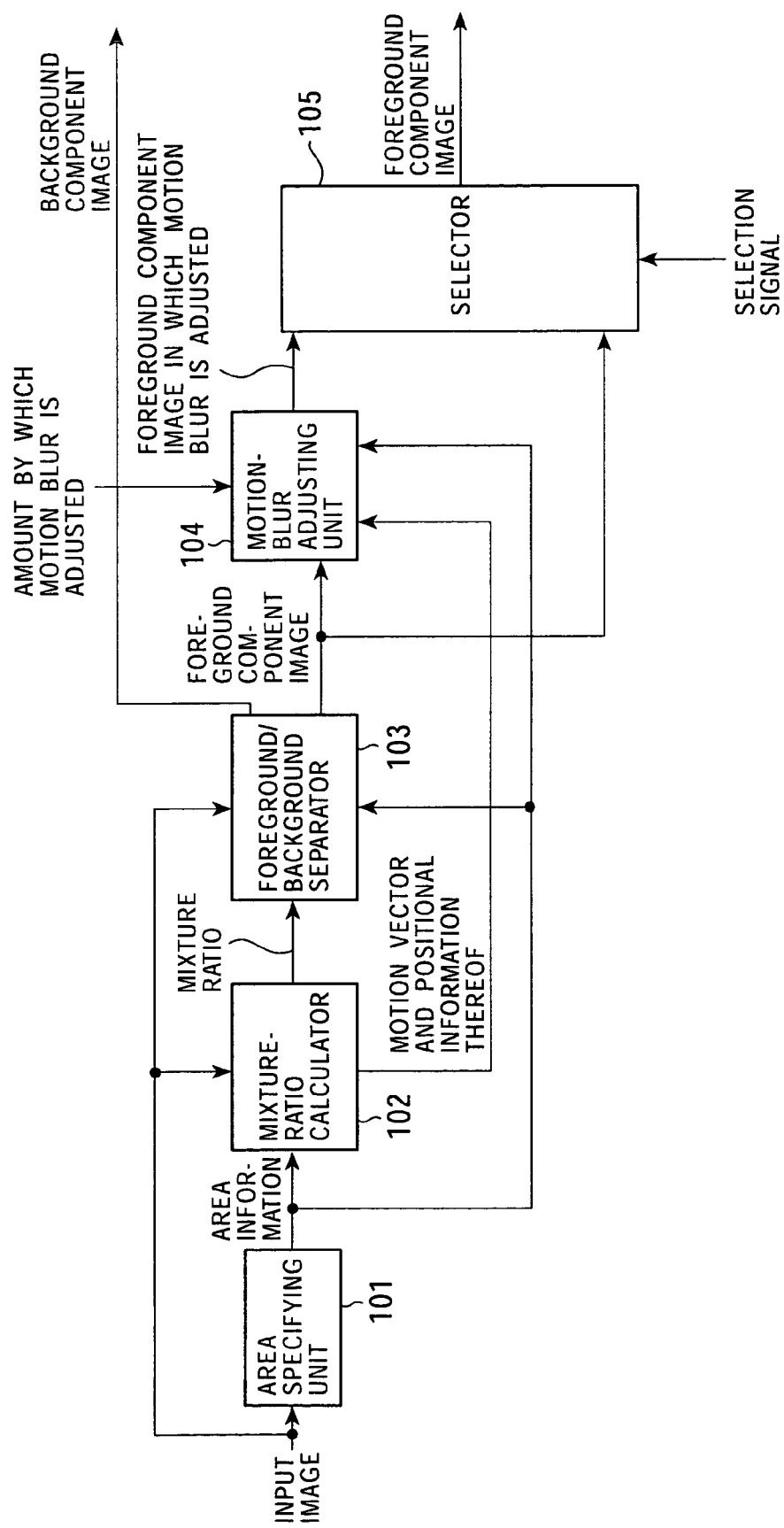
FIG. 2 is a block diagram illustrating the structure of the image processing apparatus.

FIG. 2 is a block diagram illustrating the image processing apparatus.

It does not matter whether the individual functions of the image processing apparatus are implemented by hardware or software. That means that block diagrams in this specification may be regarded as hardware block diagrams or as software functional block diagrams.

In this specification, an image to be captured corresponding to an object in the real world is referred to as an image object.

An input image sent to the image processing apparatus is sent to an area specifying unit 101, a mixture-ratio calculator 102, and a foreground/background separator 103.

The area specifying unit 101 determines to which of a foreground area, a background area, or a mixed area each pixel of the input image belongs, and sends information indicating to which area each pixel belongs (hereinafter referred to as "area information") to the mixture-ratio calculator 102, the foreground/background separator 103, and a motion-blur adjusting unit 104.

The mixture-ratio calculator 102 calculates the mixture ratio (hereinafter referred to as a "mixture ratio $\alpha$") corresponding to the pixels included in a mixed area according to the input image, and the area information sent from the area specifying unit 101, and sends the mixture ratio $\alpha$ to the foreground/background separator 103.

The mixture ratio $\alpha$ is a value indicating the ratio of the image components (hereinafter also referred to as "background components") corresponding to the background object to the pixel value, as expressed by equation (3), which is shown below.

The mixture-ratio calculator 102 generates a motion vector and positional information indicating a pixel or an image object corresponding to the motion vector according to the input image, and the area information sent from the area specifying unit 101, and sends the generated motion vector and the positional information to the motion-blur adjusting unit 104.

The motion vector output from the mixture-ratio calculator 102 includes information corresponding to the amount v of movement within the shutter time.

The amount v of movement within the shutter time is a value indicating a positional change of an image corresponding to a moving object in units of pixel pitches. For example, if one component of an object image corresponding to a foreground is moving such that it is included in four pixels in one frame, the amount v of movement within the shutter time of the object image corresponding to the foreground is four.

The foreground/background separator 103 separates the input image into a foreground component image formed of only the image components (hereinafter also referred to as "foreground components") corresponding to the foreground object and a background component image formed of only the background components according to the area information sent from the area specifying unit 101 and the mixture ratio $\alpha$ sent from the mixture-ratio calculator 102, and sends the foreground component image to the motion-blur adjusting unit 104 and a selector 105. The separated foreground component image may be used as the final output. A more precise foreground and background can be obtained compared to a method in which only a foreground and a background are specified without considering a mixed area and separated.

The motion-blur adjusting unit 104 determines the unit of processing indicating at least one pixel included in the foreground component image according to the area information and the amount v of movement within the shutter time, obtained from the motion vector. The unit of processing is data that specifies a group of pixels to be subjected to motion-blur adjustments.

Based on the amount by which the motion blur is to be adjusted, which is input into the image processing apparatus, the foreground component image sent from the foreground/background separator 103, the motion vector and the positional information thereof sent from the mixture-ratio calculator 102, and the unit of processing, the motion-blur adjusting unit 104 adjusts the amount of motion blur included in the foreground component image by removing, reducing, or increasing the motion blur included in the foreground component image. The motion-blur adjusting unit 104 then outputs the foreground component image in which the amount of motion blur has been adjusted to the selector 105. The motion vector and the positional information thereof may be unused.

Motion blur is a distortion included in an image corresponding to a moving object, caused by the movement of an object to be captured in the real world and the image-capturing characteristics of the sensor.

The selector 105 selects one of the foreground component image sent from the foreground/background separator 103 and the foreground component image in which the amount of motion blur has been adjusted, sent from the motion-blur adjusting unit 104 according to, for example, a selection signal reflecting a user's selection, and outputs the selected foreground component image.

An input image sent to the image processing apparatus is discussed below with reference to FIGS. 3 through 23.

FIG. 3 illustrates image capturing performed by the sensor. The sensor is formed of, for example, a CCD (Charge-Coupled Device) video camera provided with a CCD area sensor, which is a solid-state image-capturing device. An object 111 corresponding to a foreground in the real world moves, for example, horizontally from the left to the right, between an object 112 corresponding to a background and the sensor.

The sensor captures an image of the object 111 corresponding to the foreground together with an image of the object 112 corresponding to the background. The sensor outputs a captured image in units of frames. For example, the sensor outputs an image formed of 30 frames in a second.

In the present specification, the time interval of frames is called a frame interval time.

The exposure time of the sensor can be set to $\frac{1}{30}$ seconds. The exposure time is a period from when the sensor starts converting input light into electrical charges to when the conversion from the input light to the electrical charges is finished. Hereinafter, the exposure time is also referred to as a "shutter time".

Figure 4:
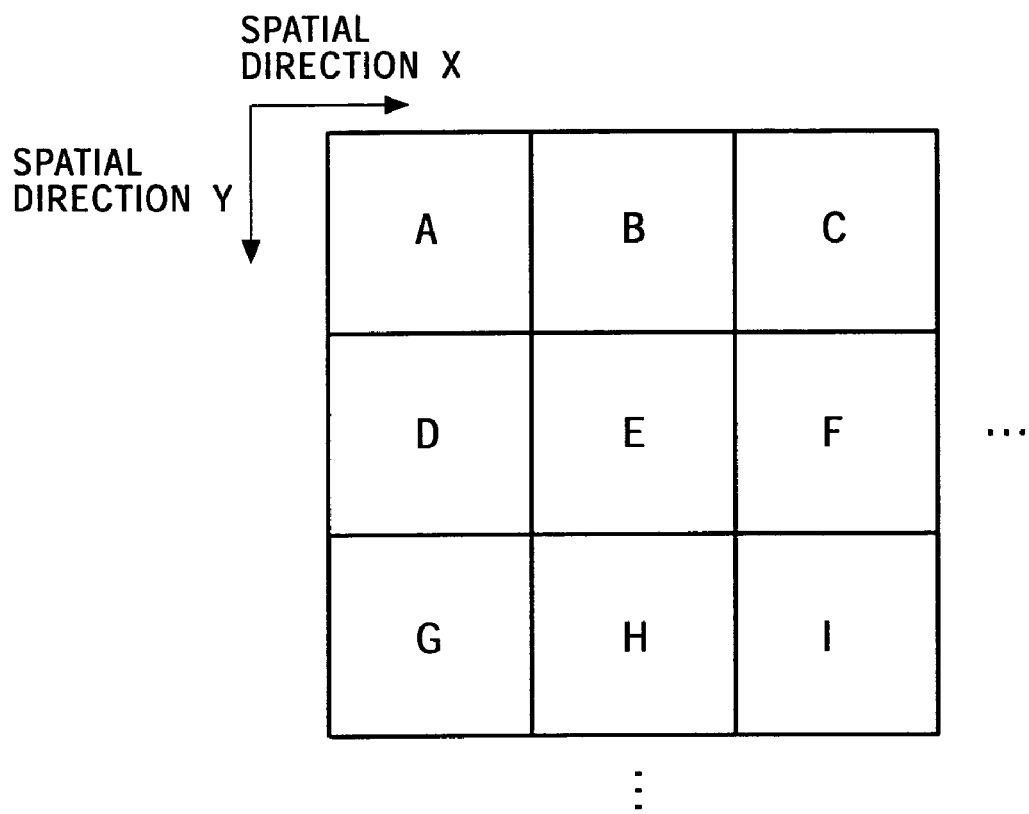
FIG. 4 illustrates the arrangement of pixels.

FIG. 4 illustrates the arrangement of pixels. In FIG. 4, A through I indicate individual pixels. The pixels are disposed on a plane corresponding to an image. One detection device corresponding to each pixel is disposed on the sensor. When the sensor performs image capturing, each detection device outputs a pixel value of the corresponding pixel forming the image. For example, the position of a detection device in the X direction corresponds to the position in the horizontal direction on the image, while the position of the detection device in the Y direction corresponds to the position in the vertical direction on the image.

Figure 5:
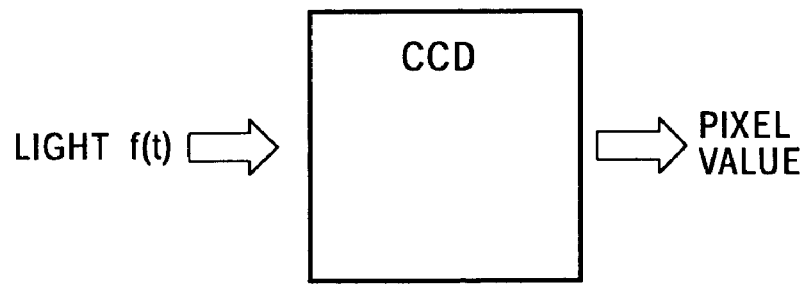
FIG. 5 illustrates the operation of a detection device.

As shown in FIG. 5, a detection device, which is, for example, a CCD, converts input light into electrical charges during a period corresponding to the shutter time, and accumulates the converted electrical charges. The amount of the electrical charges is almost proportional to the intensity of the input light and the period for which the light is input. The detection device sequentially adds the electrical charges converted from the input light to the accumulated electrical charges during the period corresponding to the shutter time. In other words, the detection device integrates the input light during the period corresponding to the shutter time and accumulates electrical charges having an amount corresponding to the integrated light. It can be considered that the detection device has an integrating function with respect to time.

The electrical charges accumulated in the detection device is converted to a voltage value by a circuit (not shown), and the voltage value is further converted to a pixel value, such as digital data, and is output. Accordingly, each pixel value output from the sensor is a value obtained by projecting a certain three-dimensional portion of the object corresponding to the foreground or the background onto a one-dimensional space, the value being a result of integrating with respect to the shutter time.

The image processing apparatus extracts significant information, such as a mixture ratio $\alpha$, embedded in an output signal by the accumulating operation of the sensor. The image processing apparatus adjusts the amount of distortion, such as the amount of motion blur, caused by the mixture of the foreground image object itself. The image processing apparatus also adjusts the amount of distortion caused by the mixture of the foreground image object and the background image object.

Figure 6A:
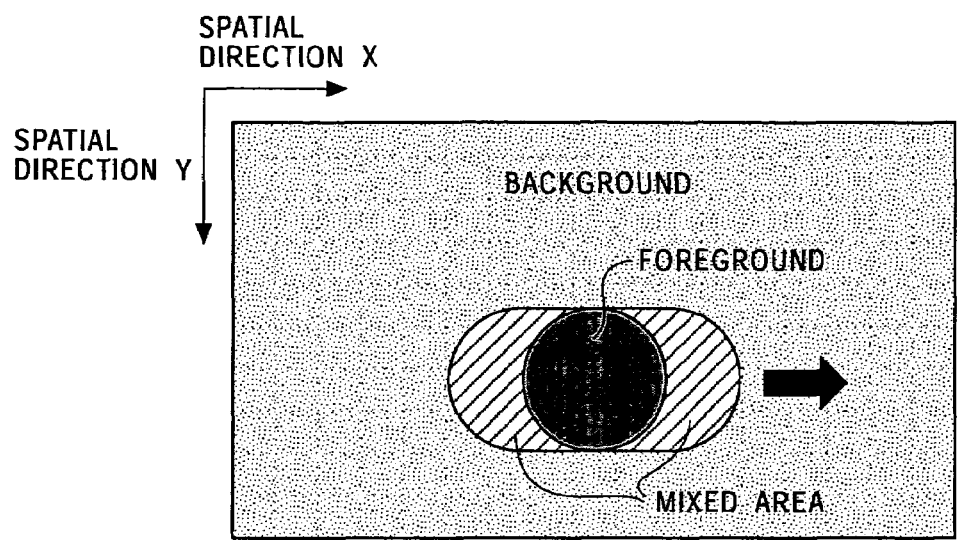
FIG. 6A illustrates an image obtained by image-capturing an object corresponding to a moving foreground and an object corresponding to a stationary background.
Figure 6B:
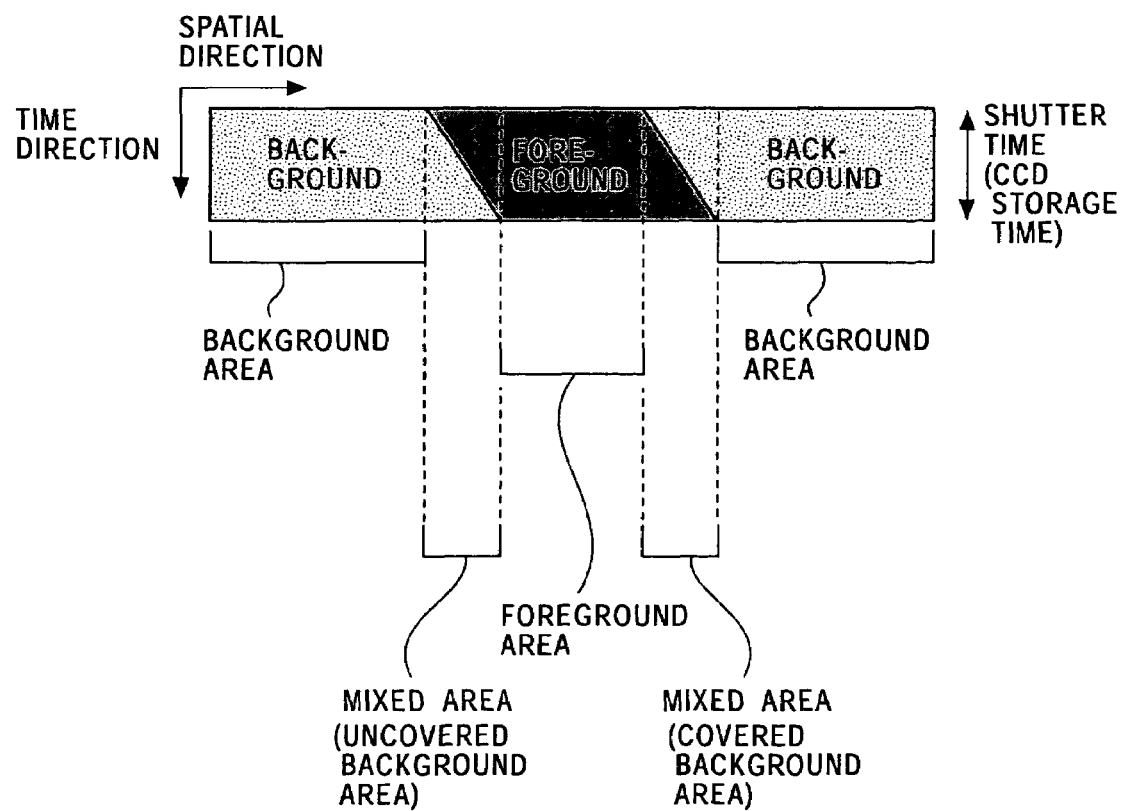
FIG. 6B illustrates a model of the image obtained by image-capturing the object corresponding to the moving foreground and the object corresponding to the stationary background.

FIG. 6A illustrates an image obtained by capturing an object corresponding to a moving foreground and an object corresponding to a stationary background. FIG. 6B illustrates a model of the image obtained by capturing the object corresponding to the moving foreground and the object corresponding to the stationary background.

FIG. 6A illustrates the image obtained by capturing the object corresponding to the foreground having movement and the object corresponding to the stationary background. In the example shown in FIG. 6A, the object corresponding to the foreground is moving horizontally from the left to the right with respect to a screen.

FIG. 6B illustrates a model obtained by developing in the time direction pixel values corresponding to one line of the image shown in FIG. 6A. The horizontal direction shown in FIG. 6B corresponds to a spatial direction X in FIG. 6A.

The values of pixels in the background area are formed of background components only, that is, the image components corresponding to the background object. The values of pixels in the foreground area are formed of foreground components only, that is, the image components corresponding to the foreground object.

The values of pixels in the mixed area are formed of background components and foreground components. Since the values of the pixels in the mixed area are formed of the background components and the foreground components, it may be referred to as a "distortion area". The mixed area is further classified into a covered background area and an uncovered background area.

The covered background area is a mixed area corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, an image which includes a foreground area, a background area, or a covered background area or an uncovered background area is input into the area specifying unit 101, the mixture-ratio calculator 102, and the foreground/background separator 103 as an input image.

Figures 7, 8:
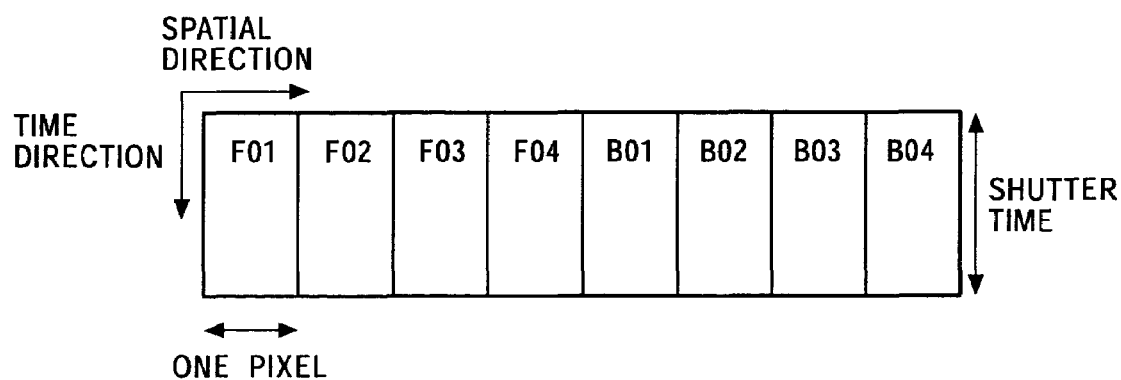
FIG. 7 illustrates a background area, a foreground area, a mixed area, a covered background area, and an uncovered background area.
FIG. 8 illustrates a model obtained by developing in the time direction the pixel values of pixels aligned side-by-side in an image obtained by image-capturing an object corresponding to a stationary foreground and an object corresponding to a stationary background.

FIG. 7 shows descriptions of the background area, the foreground area, the mixed area, the covered background area, and the uncovered background area, discussed above. When the image shown in FIG. 6A is taken as an example, the background area is a stationary portion, the foreground area is a moving portion, the covered background area of the mixed area is a portion that changes from the background to the foreground, and the uncovered background area of the mixed area is a portion that changes from the foreground to the background.

FIG. 8 illustrates a model obtained by developing in the time direction the pixel values of pixels aligned side-by-side in an image obtained when an object corresponding to a stationary foreground and an object corresponding to a stationary background are captured. For example, as the pixels aligned side-by-side, pixels arranged in one line on the screen can be selected.

Pixel values F01 through F04 shown in FIG. 8 are the values of pixels corresponding to the object of the stationary foreground. Pixel values B01 through B04 shown in FIG. 8 are the values of pixels corresponding to the object of the stationary background.

A vertical direction in FIG. 8 corresponds to time, and time elapses from the top to the bottom in FIG. 8. The position of the top sides of rectangles in FIG. 8 corresponds to the time at which the sensor starts converting input light to electrical charges, and the position of the bottom sides of the rectangles in FIG. 8 corresponds to the time at which the conversion from the input light into the electrical charges is finished. That is, the distance from the top sides to the bottom sides of the rectangles in FIG. 8 corresponds to the shutter time.

A horizontal direction in FIG. 8 corresponds to the spatial direction X described in FIG. 6A. More specifically, in the example shown in FIG. 8, the distance from the left side of the rectangle indicated by "F01" in FIG. 8 to the right side of the rectangle indicated by "B04" is eight times the pixel pitch, i.e., the length of eight consecutive pixels.

When the foreground object and the background object are stationary, the light input into the sensor does not change during the period corresponding to the shutter time.

The period corresponding to the shutter time is divided into two or more portions of equal periods. For example, if a virtual division number is set to four, the model shown in FIG. 8 can be represented by a model shown in FIG. 9. The virtual division number is set according to, for example, the amount v of movement within the shutter time, of an object corresponding to a foreground. For example, the virtual division number is set to four when the amount v of movement is four within the shutter time, and the period corresponding to the shutter time is divided into four portions.

The uppermost row in the figure corresponds to the first divided period from when the shutter has opened. The second row in the figure corresponds to the second divided period from when the shutter has opened. The third row in the figure corresponds to the third divided period from when the shutter has opened. The fourth row in the figure corresponds to the fourth divided period from when the shutter has opened.

The shutter time divided in accordance with the amount v of movement within the shutter time is also hereinafter referred to as the "shutter time/v".

When an object corresponding to a foreground is stationary, light input into the sensor does not change, and thus, a foreground component F01/v is equal to the value obtained by dividing the pixel value F01 by the virtual division number. Similarly, when the object corresponding to the foreground is stationary, a foreground component F02/v is equal to the value obtained by dividing the pixel value F02 by the virtual division number, a foreground component F03/v is equal to the value obtained by dividing the pixel value F03 by the virtual division number, and a foreground component F04/v is equal to the value obtained by dividing the pixel value F04 by the virtual division number.

When an object corresponding to a background is stationary, the light input into the sensor does not change, and thus, a background component B01/v is equal to the value obtained by dividing the pixel value B01 by the virtual division number. Similarly, when the object corresponding to the background is stationary, a background component B02/v is equal to the value obtained by dividing the pixel value B02 by the virtual division number, a background component B03/v is equal to the value obtained by dividing the pixel value B03 by the virtual division number, and a background component B04/v is equal to the value obtained by dividing the pixel value B04 by the virtual division number.

More specifically, when the object corresponding to the foreground is stationary, the light corresponding to the foreground object, input into the sensor does not change during the period corresponding to the shutter time. Accordingly, the foreground component F01/v corresponding to the first shutter time/v from when the shutter has opened, the foreground component F01/v corresponding to the second shutter time/v from when the shutter has opened, the foreground component F01/v corresponding to the third shutter time/v from when the shutter has opened, and the foreground component F01/v corresponding to the fourth shutter time/v from when the shutter has opened have the same value. The same applies to F02/v through F04/v, as in the case of F01/v.

When the object corresponding to the background is stationary, the light corresponding to the background object, input into the sensor does not change during the period corresponding to the shutter time. Accordingly, the background component B01/v corresponding to the first shutter time/v from when the shutter has opened, the background component B01/v corresponding to the second shutter time/v from when the shutter has opened, the background component B01/v corresponding to the third shutter time/v from when the shutter has opened, and the background component B01/v corresponding to the fourth shutter time/v from when the shutter has opened have the same value. The same applies to B02/v through B04/v.

A description is given next of a case in which an object corresponding to a foreground is moving and an object corresponding to a background is stationary.

FIG. 10 illustrates a model obtained by developing in the time direction the pixel values of pixels in one line, including a covered background area, when an object corresponding to a foreground is moving to the right in the figure.

Since one frame is a short period, it can be assumed that the object corresponding to the foreground is a rigid body and moves at a constant speed. In FIG. 10, one component of the object image corresponding to the foreground is moving such that it is included in four pixels.

For example, a foreground component F04/v is included in the leftmost pixel to the fourth pixel from the left.

In FIG. 10, the amount v of movement within the shutter time is four.

In FIG. 10, the pixels from the leftmost pixel to the fourth pixel from the left belong to a foreground area. In FIG. 10, the pixels from the fifth pixel to the seventh pixel from the left belong to a mixed area which is a covered background area. In FIG. 10, the rightmost pixel belongs to a background area.

The object corresponding to the foreground is moving such that it gradually covers the object corresponding to the background over time. Accordingly, the components included in the pixel values of the pixels belonging to the covered background area change from background components to foreground components at certain timing during the period corresponding to the shutter time.

For example, a pixel value M enclosed by a thick frame in FIG. 10 is expressed by equation (1) below.

$$M=B02/v+B02/v+F07/v+F06/v \qquad (1)$$

For example, the fifth pixel from the left includes a background component corresponding to one shutter time/v and foreground components corresponding to three times the shutter time/v, and thus, the mixture ratio $\alpha$ of the fifth pixel from the left is ¼. The sixth pixel from the left includes background components corresponding to twice the shutter time/v and foreground components corresponding to twice the shutter time/v, and thus, the mixture ratio $\alpha$ of the sixth pixel from the left is ½. The seventh pixel from the left includes background components corresponding to three times the shutter time/v and a foreground component corresponding to one shutter time/v, and thus, the mixture ratio $\alpha$ of the seventh pixel from the left is ¾.

It can be assumed that the object corresponding to the foreground is a rigid body, and any foreground component moves at a constant speed such that it is included in four pixels. Accordingly, for example, a foreground component F07/v in the fourth pixel from the left in FIG. 10, corresponding to the first shutter time/v from when the shutter has opened is equal to a foreground component of the fifth pixel from the left in FIG. 10, corresponding to the second shutter time/v from when the shutter has opened. Similarly, the foreground component F07/v is equal to a foreground component of the sixth pixel from the left in FIG. 10, corresponding to the third shutter time/v from when the shutter has opened, and a foreground component of the seventh pixel from the left in FIG. 10, corresponding to the fourth shutter time/v from when the shutter has opened.

It can be assumed that the object corresponding to the foreground is a rigid body, and any foreground component moves at a constant speed such that it is included in four pixels. Accordingly, for example, a foreground component F06/v of the third pixel from the left in FIG. 10, corresponding to the first shutter time/v from when the shutter has opened is equal to a foreground component of the fourth pixel from the left in FIG. 10, corresponding to the second shutter time/v from when the shutter has opened. Similarly, the foreground component F06/v is equal to a foreground component of the fifth pixel from the left in FIG. 10, corresponding to the third shutter time/v from when the shutter has opened, and a foreground component of the sixth pixel from the left in FIG. 10, corresponding to the fourth shutter time/v from when the shutter has opened.

It can be assumed that the object corresponding to the foreground is a rigid body, and any foreground component moves at a constant speed such that it is included in four pixels. Accordingly, for example, a foreground component F05/v of the second pixel from the left in FIG. 10, corresponding to the first shutter time/v from when the shutter has opened is equal to a foreground component of the third pixel from the left in FIG. 10, corresponding to the second shutter time/v from when the shutter has opened. Similarly, the foreground component F05/v is equal to a foreground component of the fourth pixel from the left in FIG. 10, corresponding to the third shutter time/v from when the shutter has opened, and a foreground component of the fifth pixel from the left in FIG. 10, corresponding to the fourth shutter time/v from when the shutter has opened.

It can be assumed that the object corresponding to the foreground is a rigid body, and any foreground component moves at a constant speed such that it is included in four pixels. Accordingly, for example, a foreground component F04/v of the leftmost pixel in FIG. 10, corresponding to the first shutter time/v from when the shutter has opened is equal to a foreground component of the second pixel from the left in FIG. 10, corresponding to the second shutter time/v from when the shutter has opened. Similarly, the foreground component F04/v is equal to a foreground component of the third pixel from the left in FIG. 10, corresponding to the third shutter time/v from when the shutter has opened, and the foreground component of the fourth pixel from the left in FIG. 10, corresponding to the fourth shutter time/v from when the shutter has opened.

Since the foreground area corresponding to the moving object includes motion blur as discussed above, it can also be referred to as a "distortion area".

Figure 11:
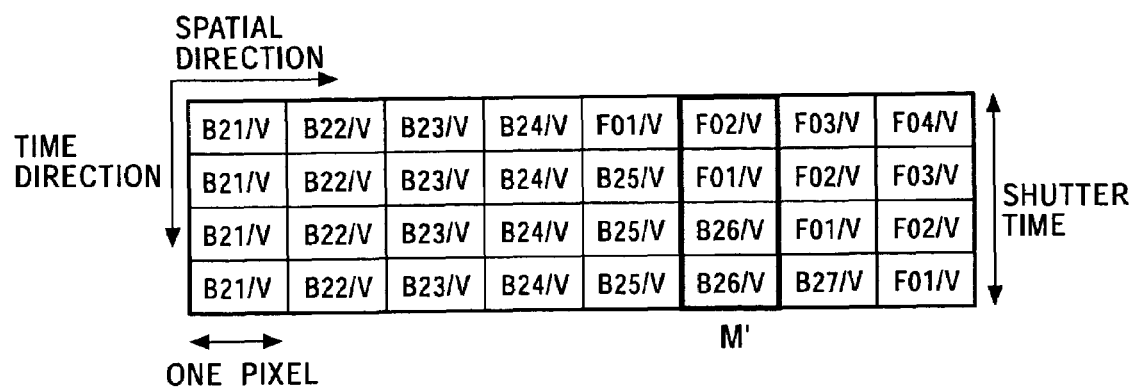
FIG. 11 illustrates a model in which pixel values are developed in the time direction and the period corresponding to the shutter time is divided.

FIG. 11 illustrates a model obtained by developing in the time direction the pixel values of pixels in one line, including an uncovered background area, when the foreground is moving to the right in the figure. In FIG. 11, the amount v of movement is four.

Since one frame is a short period, it can be assumed that the object corresponding to the foreground is a rigid body and moves at a constant speed. In FIG. 11, any component of the object image corresponding to the foreground moves such that it is included in four pixels.

For example, a foreground component F01/v moves such that it is included in the fifth to eighth pixels from the left.

In FIG. 11, the amount v of movement of the foreground within the shutter time is four.

In FIG. 11, the pixels from the leftmost pixel to the fourth pixel from the left belong to a background area. In FIG. 11, the pixels from the fifth pixel to the seventh pixel from the left belong to a mixed area serving as an uncovered background area. In FIG. 11, the rightmost pixel belongs to a foreground area.

The object corresponding to the foreground which covers the object corresponding to the background is moving such that it is gradually removed from the object corresponding to the background over time. Accordingly, the components included in the pixel values of the pixels belonging to the uncovered background area change from foreground components to background components at certain timing in the period corresponding to the shutter time.

For example, the pixel value M' enclosed by a thick frame in FIG. 11 is expressed by equation (2).

$$M'=F02/v+F01/v+B26/v+B26/v \qquad (2)$$

For example, the fifth pixel from the left includes background components corresponding to three times the shutter time/v and a foreground component corresponding to one shutter time/v, and thus, the mixture ratio α of the fifth pixel from the left is 3/4. The sixth pixel from the left includes background components corresponding to twice the shutter time/v and foreground components corresponding to twice the shutter time/v, and thus, the mixture ratio α of the sixth pixel from the left is 1/2. The seventh pixel from the left includes a background component corresponding to one shutter time/v and foreground components corresponding to three times the shutter time/v, and thus, the mixture ratio α of the seventh pixel from the left is 1/4.

When equations (1) and (2) are generalized, the pixel value M can be expressed by equation (3):

$$M = \alpha \cdot B + \sum_i F_i/v \qquad (3)$$

where α is the mixture ratio, B indicates a pixel value of the background, and Fi/v designates a foreground component.

It can be assumed that the object corresponding to the foreground is a rigid body and moves at a constant speed. In addition, the amount v of movement within the shutter time is four. Accordingly, for example, a foreground component F01/v of the fifth pixel from the left in FIG. 11, corresponding to the first shutter time/v from when the shutter has opened is equal to a foreground component of the sixth pixel from the left in FIG. 11, corresponding to the second shutter time/v from when the shutter has opened. Similarly, the foreground component F01/v is equal to a foreground component of the seventh pixel from the left in FIG. 11, corresponding to the third shutter time/v from when the shutter has opened, and a foreground component of the eighth pixel from the left in FIG. 11 corresponding to the fourth shutter time/v from when the shutter has opened.

It can be assumed that the object corresponding to the foreground is a rigid body and moves at a constant speed. In addition, a virtual division number is four. Accordingly, for example, a foreground component F02/v of the sixth pixel from the left in FIG. 11, corresponding to the first shutter time/v from when the shutter has opened is equal to a foreground component of the seventh pixel from the left in FIG. 11, corresponding to the second shutter time/v from when the shutter has opened. Similarly, the foreground component F02/v is equal to a foreground component of the eighth pixel from the left in FIG. 11, corresponding to the third shutter time/v from when the shutter has opened.

It can be assumed that the object corresponding to the foreground is a rigid body and moves at a constant speed. In addition, the amount v of movement is four. Accordingly, for example, a foreground component F03/v of the seventh pixel from the left in FIG. 11, corresponding to the first shutter time/v from when the shutter has opened is equal to a foreground component of the eighth pixel from the left in FIG. 11, corresponding to the second shutter time/v from when the shutter has opened.

It has been described with reference to FIGS. 9 through 11 that the virtual division number is four. The virtual division number corresponds to the amount v of movement within the shutter time. Generally, the amount v of movement within the shutter time corresponds to the moving speed of the object corresponding to the foreground. For example, if a component of the foreground moves such that it is included in four pixels in one frame, the amount v of movement within the shutter time is set to four. The virtual division number is set to four in accordance with the amount v of movement within the shutter time.

Similarly, when a component of the foreground moves such that it is included in six pixels in one frame, for example, the amount v of movement within the shutter time is set to six, and the virtual division number is set to six.

Figure 12:
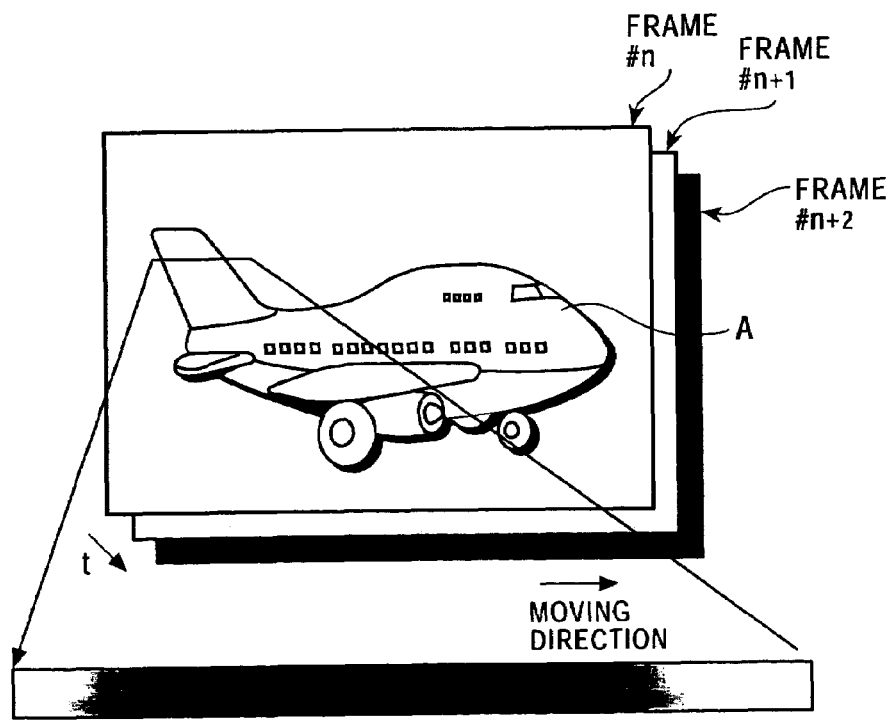
FIG. 12 illustrates an example in which pixels in a foreground area, a background area, and a mixed area are extracted.
Figure 13:
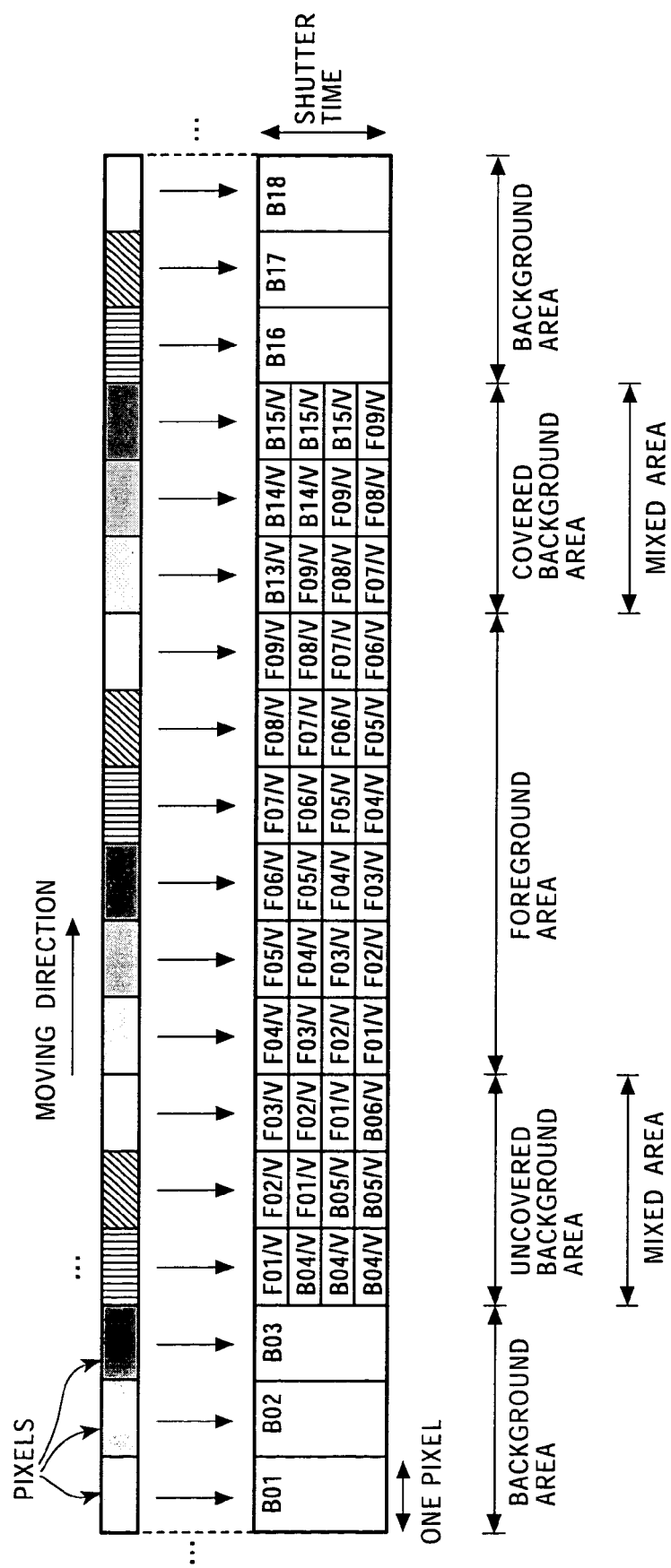
FIG. 13 illustrates the relationships between pixels and a model obtained by developing their pixel values in the time direction.

FIGS. 12 and 13 illustrate the relationship among the foreground area, the background area, and the mixed area formed of the covered background area or the uncovered background area, all of which have been discussed above, and foreground components and background components corresponding to divided shutter time.

FIG. 12 illustrates an example in which pixels in the foreground area, the background area, and the mixed area are extracted from an image including a foreground corresponding to an object moving in front of a stationary background. In the example shown in FIG. 12, the object corresponding to the foreground, indicated by A, is moving horizontally with respect to the screen.

Frame #n+1 is the frame following frame #n, and frame #n+2 is the frame following frame #n+1.

Pixels in the foreground area, the background area, and the mixed area are extracted from one of frames #n through #n+2, and the amount v of movement within the shutter time is set to four. A model obtained by developing the pixel values of the extracted pixels in the time direction is shown in FIG. 13.

Since the object corresponding to the foreground moves, pixel values in the foreground area are formed of four different foreground components each corresponding to a shutter time/v. For example, the leftmost pixel of pixels in the foreground area shown in FIG. 13 consists of F01/v, F02/v, F03/v, and F04/v. In other words, the pixels in the foreground area include motion blur.

Since the object corresponding to the background is stationary, light input into the sensor, corresponding to the background during the shutter time does not change. In this case, pixel values in the background area do not include motion blur.

The pixel values of pixels belonging to the mixed area consisting of a covered background area or an uncovered background area are formed of foreground components and background components.

A description is given below of a model obtained by developing in the time direction the pixel values of pixels which are aligned side-by-side and which are located at the same positions in a plurality of frames when the image corresponding to the object is moving. For example, when the image corresponding to the object is moving horizontally with respect to the screen, pixels disposed on one line on the screen can be selected as the pixels aligned side-by-side.

Figure 14:
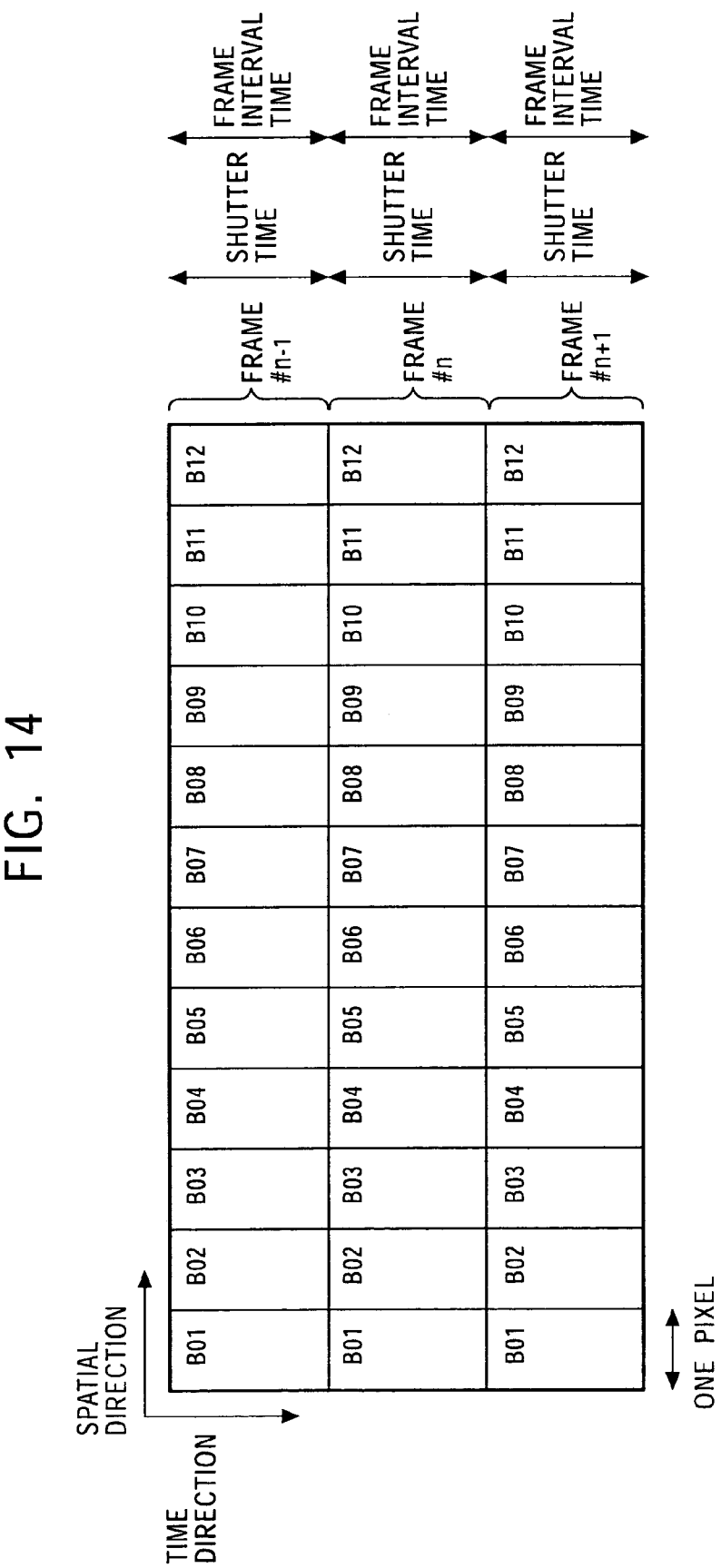
FIG. 14 illustrates a model in which pixel values are developed in the time direction and the period corresponding to the shutter time is divided.

FIG. 14 illustrates a model obtained by developing in the time direction the pixel values of pixels which are aligned side-by-side and which are located at the same positions in three frames of an image obtained by capturing an object corresponding to a stationary background. In FIG. 14, a shutter time has the same length as a frame interval time.

Frame #n is the frame following frame #n−1, and frame #n+1 is the frame following frame #n. The same applies to the other frames.

Pixel values B01 through B12 shown in FIG. 14 are the pixel values of pixels corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having a pixel value B05 in frame #n−1 have the pixel value B05.

An image captured when a shutter time is equal to a frame interval time and which includes a covered background area will be described below by referring to FIG. 15 and FIG. 16.

Figure 15:
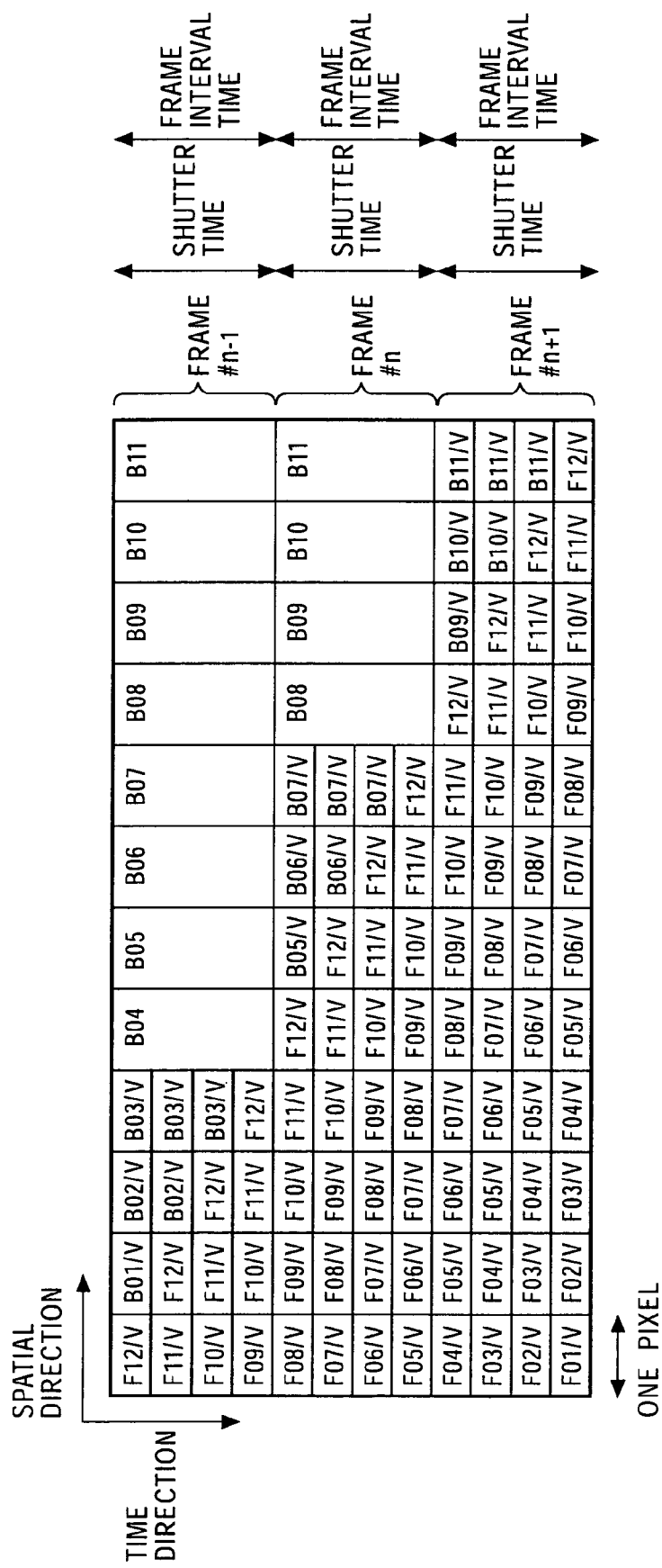
FIG. 15 illustrates a model in which pixel values are developed in the time direction and the period corresponding to the shutter time is divided.

FIG. 15 illustrates a model obtained by developing in the time direction the pixel values of pixels which are aligned side-by-side and which are located at the same positions in three frames of an image obtained by capturing an object corresponding to a foreground that moves to the right in the figure, together with an object corresponding to a stationary background.

In FIG. 15, it can be assumed that the object corresponding to the foreground is a rigid body and moves at a constant speed. In addition, any foreground component moves such that it is included in four pixels in one frame. Accordingly, the amount v of movement within the shutter time is four, and a virtual division number is set to four.

For example, a foreground component of the leftmost pixel in frame #n−1 shown in FIG. 15, corresponding to the first shutter time/v from when the shutter has opened is F12/v, and a foreground component of the second pixel from the left in FIG. 15, corresponding to the second shutter time/v from when the shutter has opened is also F12/v. A foreground component of the third pixel from the left in FIG. 15, corresponding to the third shutter time/v from when the shutter has opened and a foreground component of the fourth pixel from the left in FIG. 15, corresponding to the fourth shutter time/v from when the shutter has opened are F12/v.

A foreground component of the leftmost pixel in frame #n−1 shown in FIG. 15, corresponding to the second shutter time/v from when the shutter has opened is F11/v. A foreground component of the second pixel from the left in FIG. 15, corresponding to the third shutter time/v from when the shutter has opened is also F11/v. A foreground component of the third pixel from the left in FIG. 15, corresponding to the fourth shutter time/v from when the shutter has opened is F11/v.

A foreground component of the leftmost pixel in frame #n−1 shown in FIG. 15, corresponding to the third shutter time/v from when the shutter has opened is F10/v. A foreground component of the second pixel from the left in FIG. 15, corresponding to the fourth shutter time/v from when the shutter has opened is also F10/v. A foreground component of the leftmost pixel in frame #n−1 shown in FIG. 15, corresponding to the fourth shutter time/v from when the shutter has opened is F09/v.

Since the object corresponding to the background is stationary, a background component of the second pixel from the left in frame #n−1 shown in FIG. 15, corresponding to the first shutter time/v from when the shutter has opened is B01/v. Background components of the third pixel from the left in frame #n−1 shown in FIG. 15, corresponding to the first and second shutter time/v from when the shutter has opened are B02/v. Background components of the fourth pixel from the left in frame #n−1 shown in FIG. 15, corresponding to the first through third shutter time/v from when the shutter has opened are B03/v.

In frame #n−1 in FIG. 15, the leftmost pixel from the left belongs to the foreground area, and the second through fourth pixels from the left belong to the mixed area serving as a covered background area.

The fifth through twelfth pixels from the left in frame #n−1 in FIG. 15 belong to the background area, and the pixel values thereof are B04 through B11, respectively.

The first through fifth pixels from the left in frame #n in FIG. 15 belong to the foreground area. Foreground components corresponding to the shutter time/v in the foreground area of frame #n are any one of F05/v through F12/v.

It can be assumed that the object corresponding to the foreground is a rigid body and moves at a constant speed. In addition, the amount v of movement within a shutter time is four, and the shutter time is equal to a frame interval time, the foreground image is shifted by four pixels to the right and displayed in the next frame.

A foreground component of the fifth pixel from the left in frame #n shown in FIG. 15, corresponding to the first shutter time/v from when the shutter has opened is F12/v, and a foreground component of the sixth pixel from the left in FIG. 15, corresponding to the second shutter time/v from when the shutter has opened is also F12/v. A foreground component of the seventh pixel from the left in FIG. 15, corresponding to the third shutter time/v from when the shutter has opened and a foreground component of the eighth pixel from the left in FIG. 15, corresponding to the fourth shutter time/v from when the shutter has opened are F12/v.

A foreground component of the fifth pixel from the left in frame #n shown in FIG. 15, corresponding to the second shutter time/v from when the shutter has opened is F11/v. A foreground component of the sixth pixel from the left in FIG. 15, corresponding to the third shutter time/v from when the shutter has opened is also F11/v. A foreground component of the seventh pixel from the left in FIG. 15, corresponding to the fourth shutter time/v from when the shutter has opened is F11/v.

A foreground component of the fifth pixel from the left in frame #n shown in FIG. 15, corresponding to the third shutter time/v from when the shutter has opened is F10/v. A foreground component of the sixth pixel from the left in FIG. 15, corresponding to the fourth shutter time/v from when the shutter has opened is also F10/v. A foreground component of the fifth pixel from the left in frame #n shown in FIG. 15, corresponding to the fourth shutter time/v from when the shutter has opened is F09/v.

Since the object corresponding to the background is stationary, a background component of the sixth pixel from the left in frame #n shown in FIG. 15, corresponding to the first shutter time/v from when the shutter has opened is B05/v. Background components of the seventh pixel from the left in frame #n shown in FIG. 15, corresponding to the first and second shutter time/v from when the shutter has opened are B06/v. Background components of the eighth pixel from the left in frame #n shown in FIG. 15, corresponding to the first through third shutter time/v from when the shutter has opened are B07/v.

In frame #n shown in FIG. 15, the sixth through eighth pixels from the left belong to a mixed area serving as a covered background area.

The ninth through twelfth pixels from the left in frame #n shown in FIG. 15 belong to a background area, and the pixel values thereof are B08 through B11, respectively.

The first through ninth pixels from the left in frame #n+1 shown in FIG. 15 belong to a foreground area. Foreground components corresponding to the shutter time/v in the foreground area of frame #n+1 are any one of F01/v through F12/v.

It can be assumed that the object corresponding to the foreground is a rigid body and moves at a constant speed. In addition, the amount v of movement within a shutter time is four, and the shutter time is equal to the frame interval time. Accordingly, a foreground component of the ninth pixel from the left in frame #n+1 shown in FIG. 15, corresponding to the first shutter time/v from when the shutter has opened is F12/v, and a foreground component of the tenth pixel from the left in FIG. 15, corresponding to the second shutter time/v from when the shutter has opened is also F12/v. A foreground component of the eleventh pixel from the left in FIG. 15, corresponding to the third shutter time/v from when the shutter has opened and a foreground component of the twelfth pixel from the left in FIG. 15, corresponding to the fourth shutter time/v from when the shutter has opened are F12/v.

A foreground component of the ninth pixel from the left in frame #n+1 shown in FIG. 15, corresponding to the second shutter time/v from when the shutter has opened is F11/v. A foreground component of the tenth pixel from the left in FIG. 15, corresponding to the third shutter time/v from when the shutter has opened is also F11/v. A foreground component of the eleventh pixel from the left in FIG. 15, corresponding to the fourth shutter time/v from when the shutter has opened is F11/v.

A foreground component of the ninth pixel from the left in frame #n+1 shown in FIG. 15, corresponding to the third shutter time/v from when the shutter has opened is F10/v. A foreground component of the tenth pixel from the left in FIG. 15, corresponding to the fourth shutter time/v from when the shutter has opened is also F10/v. A foreground component of the ninth pixel from the left in frame #n+1 shown in FIG. 15, corresponding to the fourth shutter time/v from when the shutter has opened is F09/v.

Since the object corresponding to the background is stationary, a background component of the tenth pixel from the left in frame #n+1 shown in FIG. 15, corresponding to the first shutter time/v from when the shutter has opened is B09/v. Background components of the eleventh pixel from the left in frame #n+1 shown in FIG. 15, corresponding to the first and second shutter time/v from when the shutter has opened are B10/v. Background components of the twelfth pixel from the left in frame #n+1 shown in FIG. 15, corresponding to the first through third shutter time/v from when the shutter has opened are B11/v.

In frame #n+1 in FIG. 15, the tenth through twelfth pixels from the left belong to a mixed area serving as a covered background area.

Figure 16:
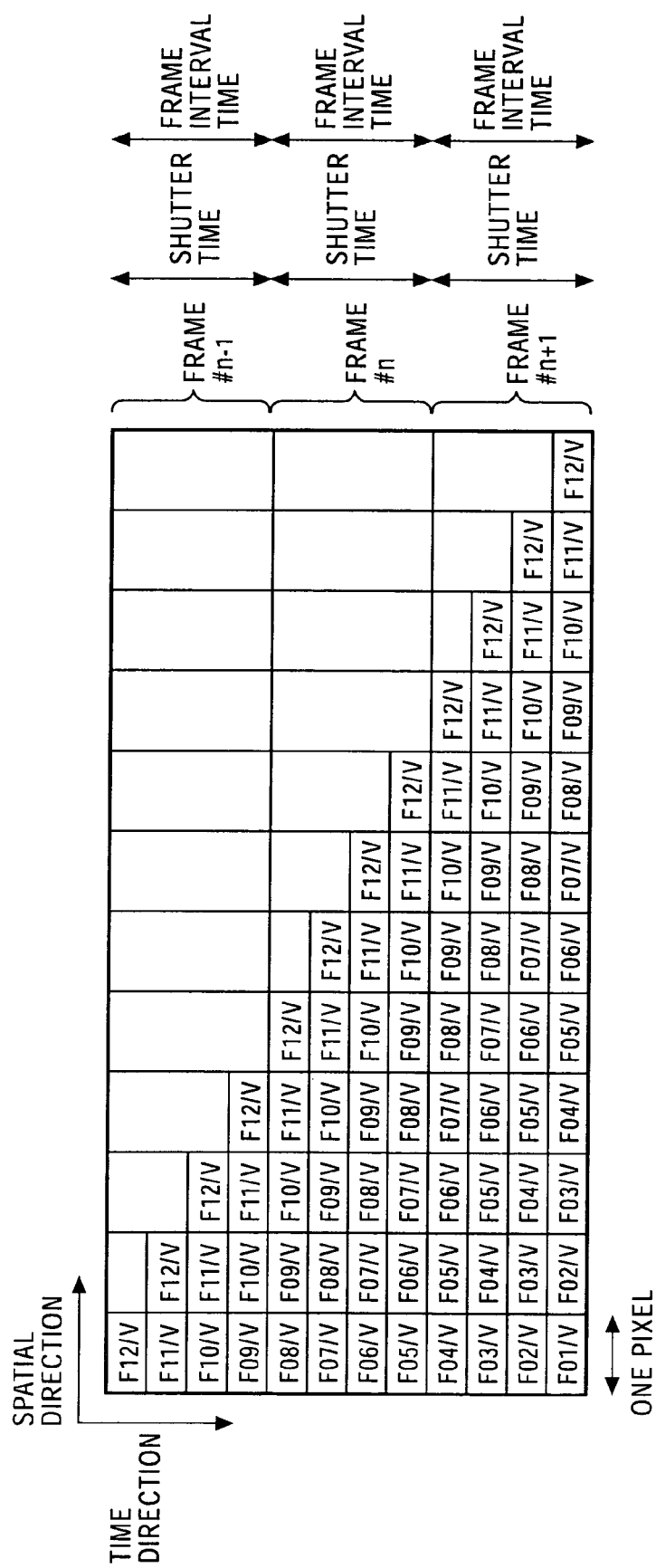
FIG. 16 illustrates a model in which pixel values are developed in the time direction and the period corresponding to the shutter time is divided.

FIG. 16 illustrates a model of an image obtained by extracting the foreground components from the pixel values shown in FIG. 15.

Figure 17:
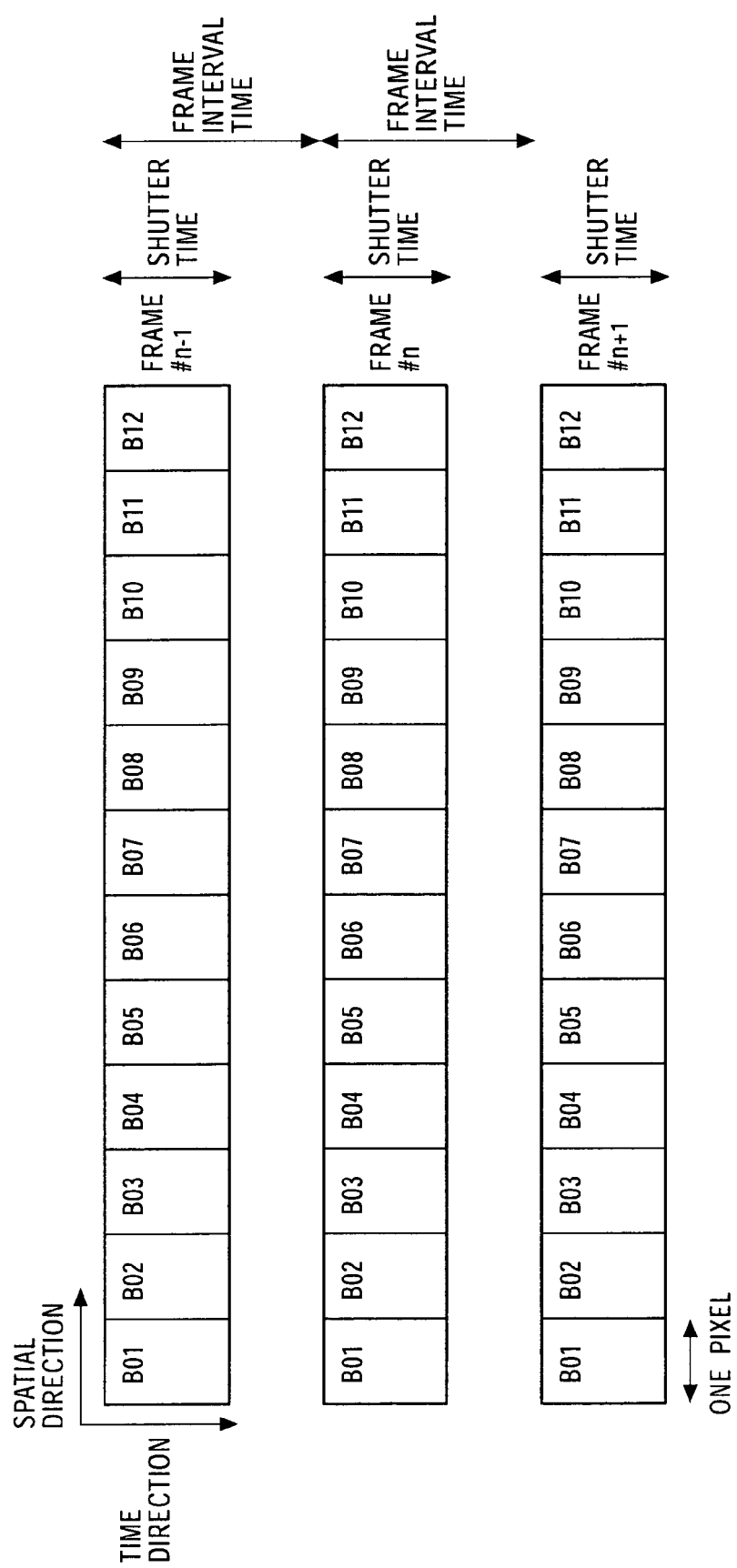
FIG. 17 illustrates a model in which pixel values are developed in the time direction and the period corresponding to the shutter time is divided.

FIG. 17 illustrates a model obtained by developing in the time direction the pixel values of pixels which are aligned side-by-side and which are located at the same positions in three frames of an image obtained by capturing an object corresponding to a stationary background. In FIG. 17, a frame interval time is twice a shutter time.

Pixel values B01 through B12 shown in FIG. 17 are the pixel values of pixels corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

In this way, the image components included in an image obtained by capturing only a stationary object are the same even when the relationship between the shutter time and the frame interval time is changed.

An image captured when a shutter time is half a frame interval time and which includes a covered background area will be described below by referring to FIG. 18 and FIG. 19.

Figure 18:
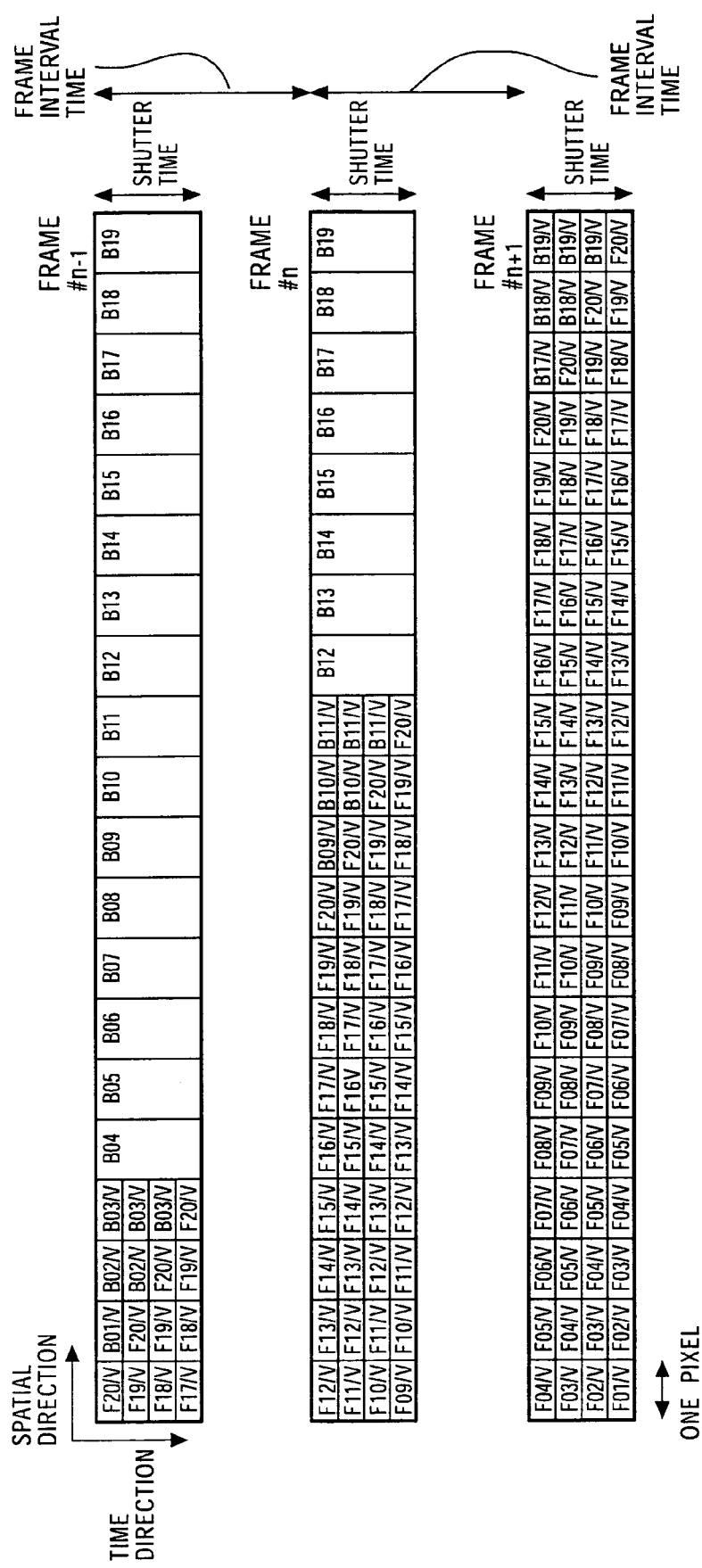
FIG. 18 illustrates a model in which pixel values are developed in the time direction and the period corresponding to the shutter time is divided.

FIG. 18 illustrates a model obtained by developing in the time direction the pixel values of pixels which are aligned side-by-side and which are located at the same positions in three frames of an image obtained by capturing an object corresponding to a foreground that moves to the right in the figure together with an object corresponding to a stationary background.

In FIG. 18, it can be assumed that the object corresponding to the foreground is a rigid body and moves at a constant speed. In addition, any foreground component moves such that it is included in four pixels in one frame. Accordingly, the amount v of movement within the shutter time is four, and a virtual division number is set to four.

For example, a foreground component of the leftmost pixel in frame #n−1 shown in FIG. 18, corresponding to the first shutter time/v from when the shutter has opened is F20/v, and a foreground component of the second pixel from the left in FIG. 18, corresponding to the second shutter time/v from when the shutter has opened is also F20/v. A foreground component of the third pixel from the left in FIG. 18, corresponding to the third shutter time/v from when the shutter has opened and a foreground component of the fourth pixel from the left in FIG. 18, corresponding to the fourth shutter time/v from when the shutter has opened are F20/v.

A foreground component of the leftmost pixel in frame #n−1 shown in FIG. 18, corresponding to the second shutter time/v from when the shutter has opened is F19/v. A foreground component of the second pixel from the left in FIG. 18, corresponding to the third shutter time/v from when the shutter has opened is also F19/v. A foreground component of the third pixel from the left in FIG. 18, corresponding to the fourth shutter time/v from when the shutter has opened is F19/v.

A foreground component of the leftmost pixel in frame #n−1 shown in FIG. 18, corresponding to the third shutter time/v from when the shutter has opened is F18/v. A foreground component of the second pixel from the left in FIG. 18, corresponding to the fourth shutter time/v from when the shutter has opened is also F18/v. A foreground component of the leftmost pixel in frame #n−1 shown in FIG. 18, corresponding to the fourth shutter time/v from when the shutter has opened is F17/v.

Since the object corresponding to the background is stationary, a background component of the second pixel from the left in frame #n−1 shown in FIG. 18, corresponding to the first shutter time/v from when the shutter has opened is B01/v. Background components of the third pixel from the left in frame #n−1 shown in FIG. 18, corresponding to the first and second shutter time/v from when the shutter has opened are B02/v. Background components of the fourth pixel from the left in frame #n−1 shown in FIG. 18, corresponding to the first through third shutter time/v from when the shutter has opened are B03/v.

In frame #n−1 in FIG. 18, the leftmost pixel from the left belongs to the foreground area, and the second through fourth pixels from the left belong to the mixed area serving as a covered background area.

The fifth through twentieth pixels from the left in frame #n−1 in FIG. 18 belong to the background area, and the pixel values thereof are B04 through B19, respectively.

The first through ninth pixels from the left in frame #n in FIG. 18 belong to the foreground area. Foreground components corresponding to the shutter time/v in the foreground area of frame #n are any one of F09/v through F20/v.

It can be assumed that the object corresponding to the foreground is a rigid body and moves at a constant speed. In addition, the amount v of movement within the shutter time is four, and the frame interval time is twice the shutter time, the foreground image is shifted by eight pixels to the right and displayed in the next frame.

A foreground component of the ninth pixel from the left in frame #n shown in FIG. 18, corresponding to the first shutter time/v from when the shutter has opened is F20/v, and a foreground component of the tenth pixel from the left in FIG. 18, corresponding to the second shutter time/v from when the shutter has opened is also F20/v. A foreground component of the eleventh pixel from the left in FIG. 18, corresponding to the third shutter time/v from when the shutter has opened and a foreground component of the twelfth pixel from the left in FIG. 18, corresponding to the fourth shutter time/v from when the shutter has opened are F20/v.

A foreground component of the ninth pixel from the left in frame #n shown in FIG. 18, corresponding to the second shutter time/v from when the shutter has opened is F19/v. A foreground component of the tenth pixel from the left in FIG. 18, corresponding to the third shutter time/v from when the shutter has opened is also F19/v. A foreground component of the eleventh pixel from the left in FIG. 18, corresponding to the fourth shutter time/v from when the shutter has opened is F19/v.

A foreground component of the ninth pixel from the left in frame #n shown in FIG. 18, corresponding to the third shutter time/v from when the shutter has opened is F18/v. A foreground component of the tenth pixel from the left in FIG. 18, corresponding to the fourth shutter time/v from when the shutter has opened is also F18/v. A foreground component of the ninth pixel from the left in frame #n shown in FIG. 18, corresponding to the fourth shutter time/v from when the shutter has opened is F17/v.

Since the object corresponding to the background is stationary, a background component of the tenth pixel from the left in frame #n shown in FIG. 18, corresponding to the first shutter time/v from when the shutter has opened is B09/v. Background components of the eleventh pixel from the left in frame #n shown in FIG. 18, corresponding to the first and second shutter time/v from when the shutter has opened are B10/v. Background components of the twelfth pixel from the left in frame #n shown in FIG. 18, corresponding to the first through third shutter time/v from when the shutter has opened are B11/v.

In frame #n shown in FIG. 18, the tenth through twelfth pixels from the left belong to a mixed area serving as a covered background area.

The thirteenth through twentieth pixels from the left in frame #n shown in FIG. 18 belong to a background area, and the pixel values thereof are B12 through B19, respectively.

The first through seventeenth pixels from the left in frame #n+1 shown in FIG. 18 belong to a foreground area. Foreground components corresponding to the shutter time/v in the foreground area of frame #n+1 are any one of F01/v through F20/v.

It can be assumed that the object corresponding to the foreground is a rigid body and moves at a constant speed. In addition, the amount v of movement within the shutter time is four, and the frame interval time is twice the shutter time. Accordingly, a foreground component of the seventeenth pixel from the left in frame #n+1 shown in FIG. 18, corresponding to the first shutter time/v from when the shutter has opened is F20/v, and a foreground component of the eighteenth pixel from the left in FIG. 18, corresponding to the second shutter time/v from when the shutter has opened is also F20/v. A foreground component of the nineteenth pixel from the left in FIG. 18, corresponding to the third shutter time/v from when the shutter has opened and a foreground component of the twentieth pixel from the left in FIG. 18, corresponding to the fourth shutter time/v from when the shutter has opened are F20/v.

A foreground component of the seventeenth pixel from the left in frame #n+1 shown in FIG. 18, corresponding to the second shutter time/v from when the shutter has opened is F19/v. A foreground component of the eighteenth pixel from the left in FIG. 18, corresponding to the third shutter time/v from when the shutter has opened is also F19/v. A foreground component of the nineteenth pixel from the left in FIG. 18, corresponding to the fourth shutter time/v from when the shutter has opened is F19/v.

A foreground component of the seventeenth pixel from the left in frame #n+1 shown in FIG. 18, corresponding to the third shutter time/v from when the shutter has opened is F18/v. A foreground component of the eighteenth pixel from the left in FIG. 18, corresponding to the fourth shutter time/v from when the shutter has opened is also F18/v. A foreground component of the seventeenth pixel from the left in frame #n+1 shown in FIG. 18, corresponding to the fourth shutter time/v from when the shutter has opened is F17/v.

Since the object corresponding to the background is stationary, a background component of the eighteenth pixel from the left in frame #n+1 shown in FIG. 18, corresponding to the first shutter time/v from when the shutter has opened is B17/v. Background components of the nineteenth pixel from the left in frame #n+1 shown in FIG. 18, corresponding to the first and second shutter time/v from when the shutter has opened are B18/v. Background components of the twentieth pixel from the left in frame #n+1 shown in FIG. 18, corresponding to the first through third shutter time/v from when the shutter has opened are B19/v.

In frame #n+1 in FIG. 18, the eighteenth through twentieth pixels from the left belong to a mixed area serving as a covered background area.

Figure 19:
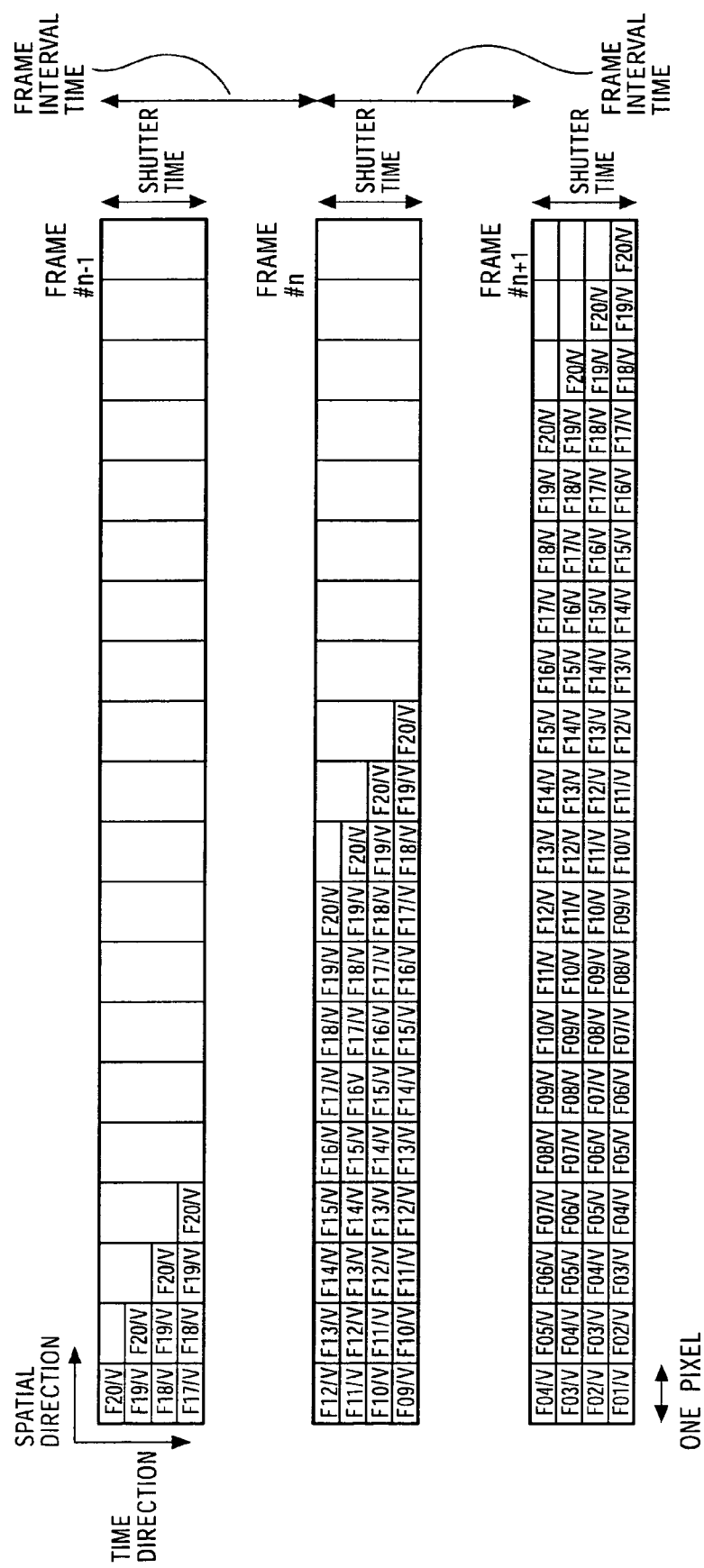
FIG. 19 illustrates a model in which pixel values are developed in the time direction and the period corresponding to the shutter time is divided.

FIG. 19 illustrates a model of an image obtained by extracting the foreground components from the pixel values shown in FIG. 18.

Next, an image captured when a shutter time is equal to a frame interval time and which includes an uncovered background area will be described below by referring to FIG. 20 and FIG. 21.

Figure 20:
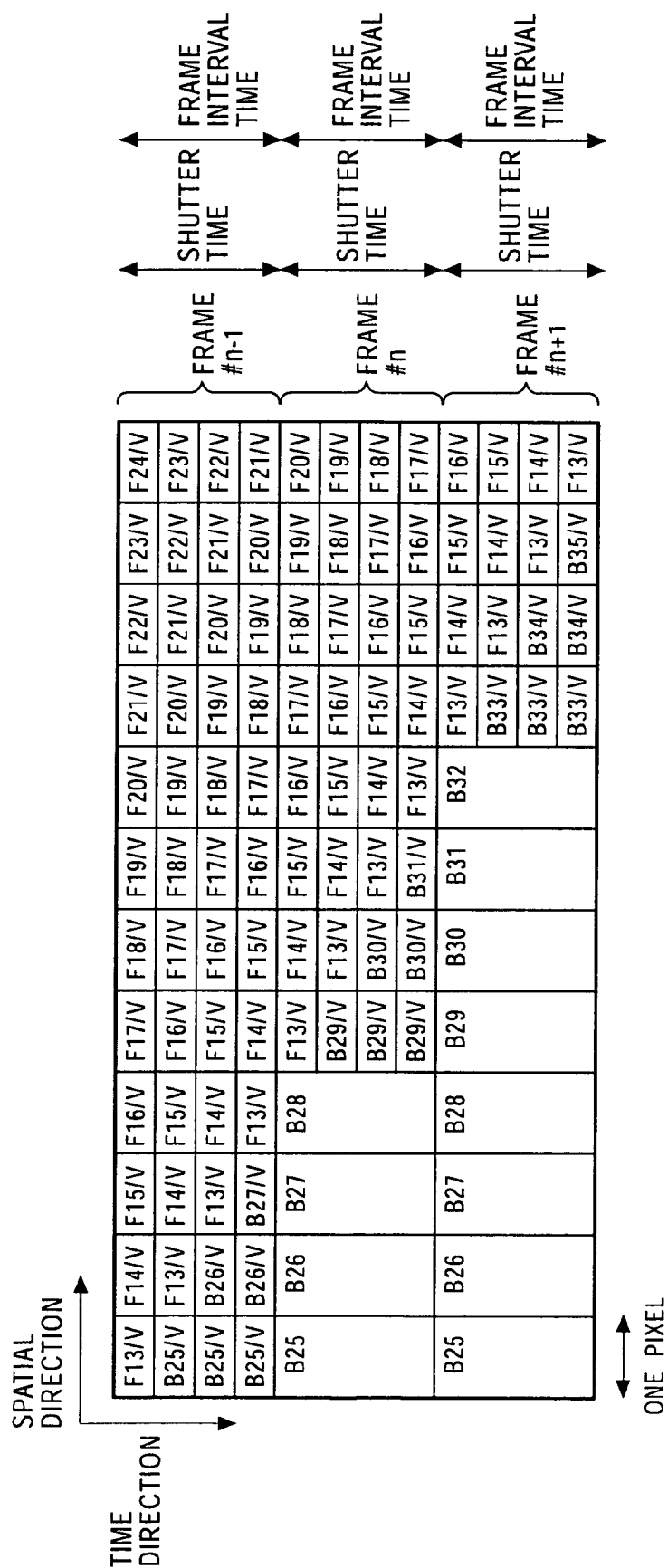
FIG. 20 illustrates a model in which pixel values are developed in the time direction and the period corresponding to the shutter time is divided.

FIG. 20 illustrates a model obtained by developing in the time direction the pixel values of pixels which are aligned side-by-side and which are located at the same positions in three frames of an image obtained by capturing a foreground corresponding to an object that moves to the right in the figure together with a stationary background.

In FIG. 20, it can be assumed that the object corresponding to the foreground is a rigid body and moves at a constant speed. In addition, any foreground component moves such that it is included in four pixels in one frame. Accordingly, the amount v of movement within the shutter time is four.

For example, a foreground component of the leftmost pixel in frame #n−1 shown in FIG. 20, corresponding to the first shutter time/v from when the shutter has opened is F13/v, and a foreground component of the second pixel from the left in FIG. 20, corresponding to the second shutter time/v from when the shutter has opened is also F13/v. A foreground component of the third pixel from the left in FIG. 20, corresponding to the third shutter time/v from when the shutter has opened and a foreground component of the fourth pixel from the left in FIG. 20, corresponding to the fourth shutter time/v from when the shutter has opened are F13/v.

A foreground component of the second pixel from the left in frame #n−1 shown in FIG. 20, corresponding to the first shutter time/v from when the shutter has opened is F14/v. A foreground component of the third pixel from the left in FIG. 20, corresponding to the second shutter time/v from when the shutter has opened is also F14/v. A foreground component of the third pixel from the left in FIG. 20, corresponding to the first shutter time/v from when the shutter has opened is F15/v.

Since the object corresponding to the background is stationary, background components of the leftmost pixel in frame #n−1 shown in FIG. 20, corresponding to the second to fourth shutter time/v from when the shutter has opened are B25/v. Background components of the second pixel from the left in frame #n−1 shown in FIG. 20, corresponding to the third and fourth shutter time/v from when the shutter has opened are B26/v. A background component of the third pixel from the left in frame #n−1 shown in FIG. 20, corresponding to the fourth shutter time/v from when the shutter has opened is B27/v.

In frame #n−1 in FIG. 20, the leftmost pixel to the third pixel from the left belong to a mixed area serving as an uncovered background area.

The fourth through twelfth pixels from the left in frame #n−1 in FIG. 20 belong to the foreground area. Foreground components of the frame are any one of F13/v through F24/v.

The first through fourth pixels from the left in frame #n in FIG. 20 belong to the background area, and the pixel values thereof are B25 through B28, respectively.

It can be assumed that the object corresponding to the foreground is a rigid body and moves at a constant speed. In addition, one foreground component moves such that it is included in four pixels in one frame. Therefore, a foreground component of the fifth pixel from the left in frame #n shown in FIG. 20, corresponding to the first shutter time/v from when the shutter has opened is F13/v, and a foreground component of the sixth pixel from the left in FIG. 20, corresponding to the second shutter time/v from when the shutter has opened is also F13/v. A foreground component of the seventh pixel from the left in FIG. 20, corresponding to the third shutter time/v from when the shutter has opened and a foreground component of the eighth pixel from the left in FIG. 20, corresponding to the fourth shutter time/v from when the shutter has opened are F13/v.

A foreground component of the sixth pixel from the left in frame #n shown in FIG. 20, corresponding to the first shutter time/v from when the shutter has opened is F14/v. A foreground component of the seventh pixel from the left in FIG. 20, corresponding to the second shutter time/v from when the shutter has opened is also F14/v. A foreground component of the eighth pixel from the left in FIG. 20, corresponding to the first shutter time/v from when the shutter has opened is F15/v.

Since the object corresponding to the background is stationary, background components of the fifth pixel from the left in frame #n shown in FIG. 20, corresponding to the second to fourth shutter time/v from when the shutter has opened are B29/v. Background components of the sixth pixel from the left in frame #n shown in FIG. 20, corresponding to the third and fourth shutter time/v from when the shutter has opened are B30/v. A background component of the seventh pixel from the left in frame #n shown in FIG. 20, corresponding to the fourth shutter time/v from when the shutter has opened is B31/v.

In frame #n shown in FIG. 20, the fifth through seventh pixels from the left belong to a mixed area serving as an uncovered background area.

The eighth through twelfth pixels from the left in frame #n shown in FIG. 20 belong to the foreground area. Values corresponding to the shutter time/v in the foreground area of frame #n are any one of F13/v through F20/v.

The leftmost through eighth pixels from the left in frame #n+1 shown in FIG. 20 belong to the background area, and the pixel values thereof are B25 through B32, respectively.

It can be assumed that the object corresponding to the foreground is a rigid body and moves at a constant speed. In addition, one foreground component moves such that it is included in four pixels in one frame. Accordingly, a foreground component of the ninth pixel from the left in frame #n+1 shown in FIG. 20, corresponding to the first shutter time/v from when the shutter has opened is F13/v, and a foreground component of the tenth pixel from the left in FIG. 20, corresponding to the second shutter time/v from when the shutter has opened is also F13/v. A foreground component of the eleventh pixel from the left in FIG. 20, corresponding to the third shutter time/v from when the shutter has opened and a foreground component of the twelfth pixel from the left in FIG. 20, corresponding to the fourth shutter time/v from when the shutter has opened are F13/v.

A foreground component of the tenth pixel from the left in frame #n+1 shown in FIG. 20, corresponding to the first shutter time/v from when the shutter has opened is F14/v. A foreground component of the eleventh pixel from the left in FIG. 20, corresponding to the second shutter time/v from when the shutter has opened is also F14/v. A foreground component of the twelfth pixel from the left in FIG. 20, corresponding to the first shutter time/v from when the shutter has opened is F15/v.

Since the object corresponding to the background is stationary, background components of the ninth pixel from the left in frame #n+1 shown in FIG. 20, corresponding to the second to fourth shutter time/v from when the shutter has opened are B33/v. Background components of the tenth pixel from the left in frame #n+1 shown in FIG. 20, corresponding to the third and fourth shutter time/v from when the shutter has opened are B34/v. A background component of the eleventh pixel from the left in frame #n+1 shown in FIG. 20, corresponding to the fourth shutter time/v from when the shutter has opened are B35/v.

In frame #n+1 in FIG. 20, the ninth through eleventh pixels from the left belong to a mixed area serving as an uncovered background area.

The twelfth pixel from the left in frame #n+1 shown in FIG. 20 belongs to the foreground area. Foreground components corresponding to the shutter time/v in the foreground area of frame #n+1 are any one of F13/v through F16/v.

Figure 21:
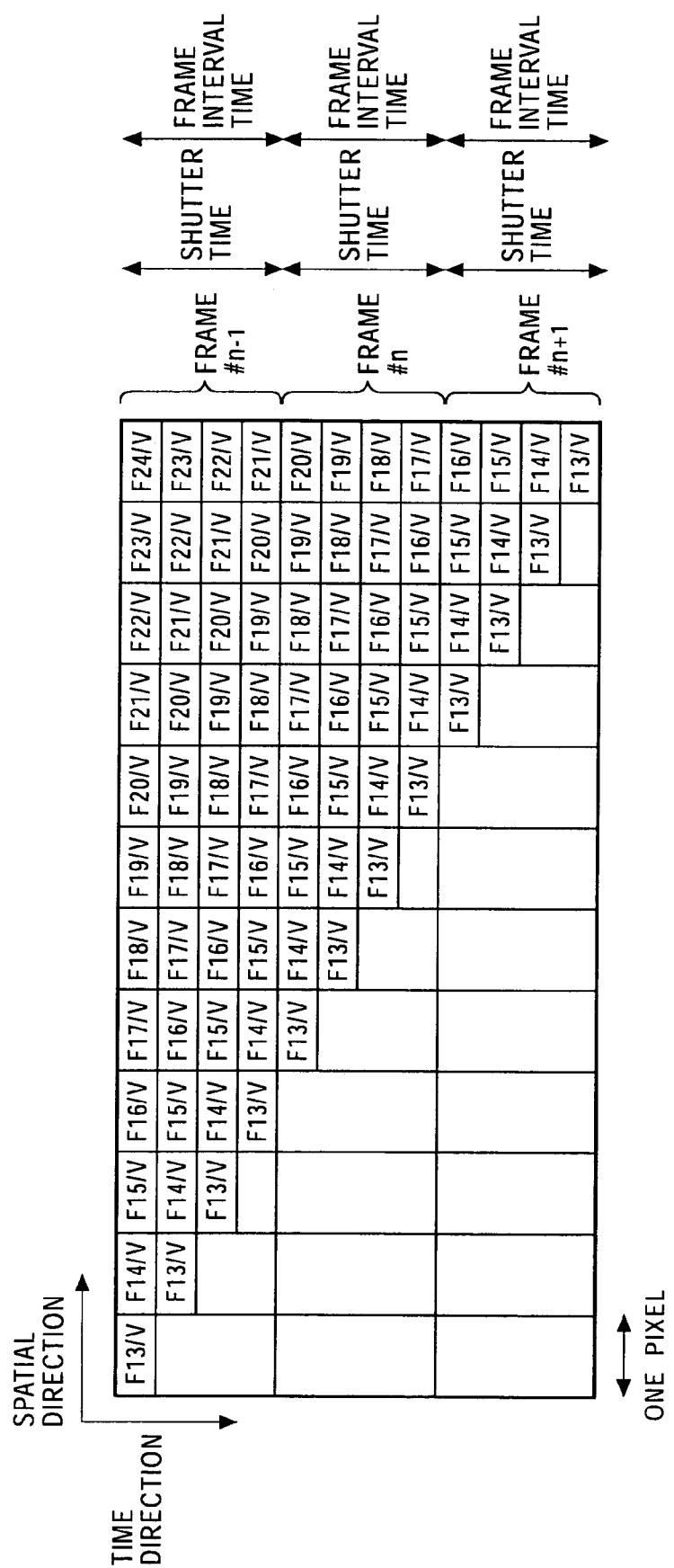
FIG. 21 illustrates a model in which pixel values are developed in the time direction and the period corresponding to the shutter time is divided.

FIG. 21 illustrates a model of an image obtained by extracting the foreground components from the pixel values shown in FIG. 20.

An image captured when a frame interval time is twice a shutter time and which includes an uncovered background area will be described below by referring to FIG. 22 and FIG. 23.

Figure 22:
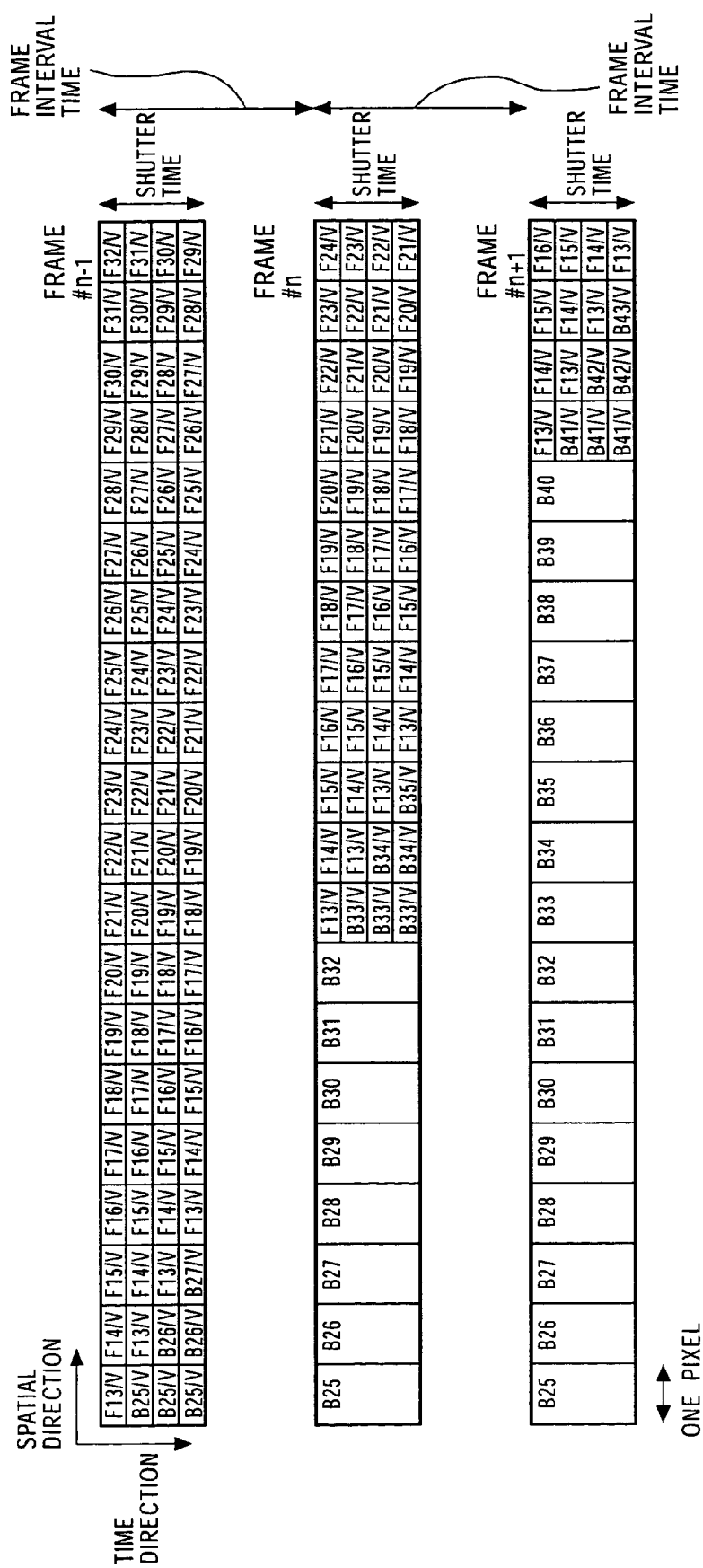
FIG. 22 illustrates a model in which pixel values are developed in the time direction and the period corresponding to the shutter time is divided.

FIG. 22 illustrates a model obtained by developing in the time direction the pixel values of pixels which are aligned side-by-side and which are located at the same positions in three frames of an image obtained by capturing a foreground corresponding to an object that moves to the right in the figure together with a stationary background.

In FIG. 22, it can be assumed that the object corresponding to the foreground is a rigid body and moves at a constant speed. In addition, any foreground component moves such that it is included in four pixels in one frame. Accordingly, the amount v of movement within the shutter time is four.

For example, a foreground component of the leftmost pixel in frame #n−1 shown in FIG. 22, corresponding to the first shutter time/v from when the shutter has opened is F13/v, and a foreground component of the second pixel from the left in FIG. 22, corresponding to the second shutter time/v from when the shutter has opened is also F13/v. A foreground component of the third pixel from the left in FIG. 22, corresponding to the third shutter time/v from when the shutter has opened and a foreground component of the fourth pixel from the left in FIG. 22, corresponding to the fourth shutter time/v from when the shutter has opened are F13/v.

A foreground component of the second pixel from the left in frame #n−1 shown in FIG. 22, corresponding to the first shutter time/v from when the shutter has opened is F14/v. A foreground component of the third pixel from the left in FIG. 22, corresponding to the second shutter time/v from when the shutter has opened is also F14/v. A foreground component of the third pixel from the left in FIG. 22, corresponding to the first shutter time/v from when the shutter has opened is F15/v.

Since the object corresponding to the background is stationary, background components of the leftmost pixel in frame #n−1 shown in FIG. 22, corresponding to the second to fourth shutter time/v from when the shutter has opened are B25/v. Background components of the second pixel from the left in frame #n−1 shown in FIG. 22, corresponding to the third and fourth shutter time/v from when the shutter has opened are B26/v. A background component of the third pixel from the left in frame #n−1 shown in FIG. 22, corresponding to the fourth shutter time/v from when the shutter has opened are B27/v.

In frame #n−1 in FIG. 22, the leftmost pixel to the third pixel from the left belong to a mixed area serving as an uncovered background area.

The fourth through twentieth pixels from the left in frame #n−1 in FIG. 22 belong to the foreground area. Foreground components of the frame are any one of F13/v through F32/v.

The leftmost pixel to the eighth pixels from the left in frame #n in FIG. 22 belong to the background area, and the pixel values thereof are B25 through B32, respectively.

It can be assumed that the object corresponding to the foreground is a rigid body and moves at a constant speed. In addition, the amount v of movement within the shutter time is four, and the frame interval time is twice the shutter time. Therefore, the foreground image is shifted by eight pixels to the right and displayed in the next frame.

A foreground component of the ninth pixel from the left in frame #n shown in FIG. 22, corresponding to the first shutter time/v from when the shutter has opened is F13/v, and a foreground component of the tenth pixel from the left in FIG. 22, corresponding to the second shutter time/v from when the shutter has opened is also F13/v. A foreground component of the eleventh pixel from the left in FIG. 22, corresponding to the third shutter time/v from when the shutter has opened and a foreground component of the twelfth pixel from the left in FIG. 22, corresponding to the fourth shutter time/v from when the shutter has opened are F13/v.

A foreground component of the tenth pixel from the left in frame #n shown in FIG. 22, corresponding to the first shutter time/v from when the shutter has opened is F14/v. A foreground component of the eleventh pixel from the left in FIG. 22, corresponding to the second shutter time/v from when the shutter has opened is also F14/v. A foreground component of the twelfth pixel from the left in FIG. 22, corresponding to the first shutter time/v from when the shutter has opened is F15/v.

Since the object corresponding to the background is stationary, background components of the ninth pixel from the left in frame #n shown in FIG. 22, corresponding to the second to fourth shutter time/v from when the shutter has opened are B33/v. Background components of the tenth pixel from the left in frame #n shown in FIG. 22, corresponding to the third and fourth shutter time/v from when the shutter has opened are B34/v. A background component of the eleventh pixel from the left in frame #n shown in FIG. 22, corresponding to the fourth shutter time/v from when the shutter has opened are B35/v.

In frame #n shown in FIG. 22, the ninth through eleventh pixels from the left belong to a mixed area serving as an uncovered background area.

The twelfth through twentieth pixels from the left in frame #n shown in FIG. 22 belong to the foreground area. Values corresponding to the shutter time/v in the foreground area of frame #n are any one of F13/v through F24/v.

The leftmost pixel to the sixteenth pixel from the left in frame #n+1 shown in FIG. 22 belong to the background area, and the pixel values thereof are B25 through B40, respectively.

It can be assumed that the object corresponding to the foreground is a rigid body and moves at a constant speed. In addition, one foreground component moves such that it is included in four pixels in one frame. Accordingly, a foreground component of the seventeenth pixel from the left in frame #n+1 shown in FIG. 22, corresponding to the first shutter time/v from when the shutter has opened is F13/v, and a foreground component of the eighteenth pixel from the left in FIG. 22, corresponding to the second shutter time/v from when the shutter has opened is also F13/v. A foreground component of the nineteenth pixel from the left in FIG. 22, corresponding to the third shutter time/v from when the shutter has opened and a foreground component of the twentieth pixel from the left in FIG. 22, corresponding to the fourth shutter time/v from when the shutter has opened are F13/v.

A foreground component of the eighteenth pixel from the left in frame #n+1 shown in FIG. 22, corresponding to the first shutter time/v from when the shutter has opened is F14/v. A foreground component of the nineteenth pixel from the left in FIG. 22, corresponding to the second shutter time/v from when the shutter has opened is also F14/v. A foreground component of the nineteenth pixel from the left in FIG. 22, corresponding to the first shutter time/v from when the shutter has opened is F15/v.

Since the object corresponding to the background is stationary, background components of the seventeenth pixel from the left in frame #n+1 shown in FIG. 22, corresponding to the second to fourth shutter time/v from when the shutter has opened is B41/v. Background components of the eighteenth pixel from the left in frame #n+1 shown in FIG. 22, corresponding to the third and fourth shutter time/v from when the shutter has opened are B42/v. A background component of the nineteenth pixel from the left in frame #n+1 shown in FIG. 22, corresponding to the fourth shutter time/v from when the shutter has opened are B43/v.

In frame #n+1 in FIG. 22, the seventeenth through nineteenth pixels from the left belong to a mixed area serving as an uncovered background area.

The twentieth pixel from the left in frame #n+1 shown in FIG. 22 belong to the foreground area. Foreground components corresponding to the shutter time/v in the foreground area of frame #n+1 are any one of F13/v through F16/v.

Figure 23:
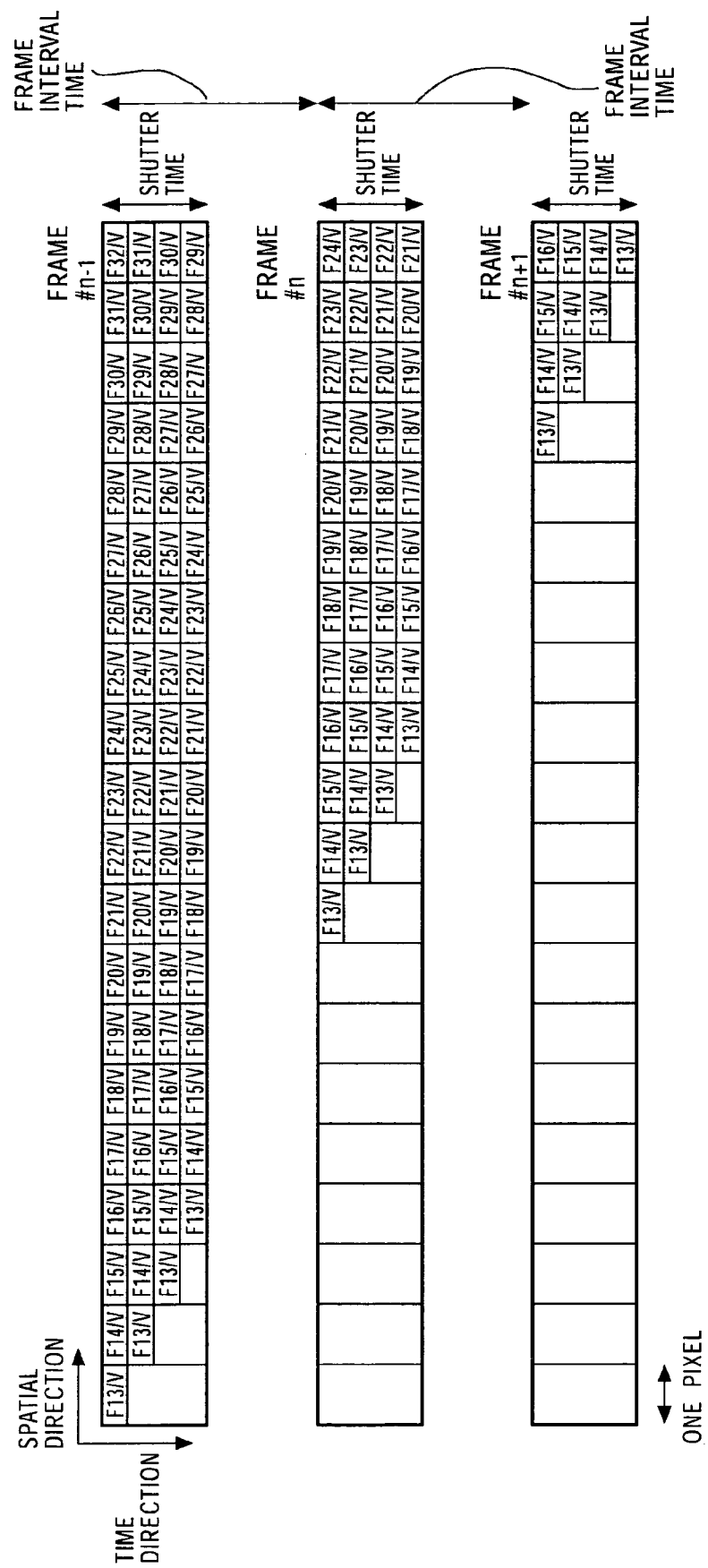
FIG. 23 illustrates a model in which pixel values are developed in the time direction and the period corresponding to the shutter time is divided.

FIG. 23 illustrates a model of an image obtained by extracting the foreground components from the pixel values shown in FIG. 22.

Referring back to FIG. 2, the area specifying unit 101 specifies flags indicating to which of a foreground area, a background area, a covered background area, or an uncovered background area the individual pixels of the input image belong by using the pixel values of a plurality of frames, and sends the flags to the mixture-ratio calculator 102 and the motion-blur adjusting unit 104 as the area information.

The mixture-ratio calculator 102 calculates the mixture ratio $\alpha$ for each pixel included in the mixed area based on the pixel values of a plurality of frames and the area information, and sends the calculated mixture ratio $\alpha$ to the foreground/background separator 103.

The mixture-ratio calculator 102 generates a motion vector and positional information indicating a pixel or an image object corresponding to the motion vector according to the input image, and the area information sent from the area specifying unit 101, and sends the generated motion vector and the positional information to the motion-blur adjusting unit 104. The size of the motion vector generated by the mixture-ratio calculator 102 indicates the amount v of movement within the shutter time.

The foreground/background separator 103 extracts the foreground component image consisting of only the foreground components based on the pixel values of a plurality of frames, the area information, and the mixture ratio $\alpha$, and sends the foreground component image to the motion-blur adjusting unit 104.

The motion-blur adjusting unit 104 adjusts the amount of motion blur included in the foreground component image based on the foreground component image sent from the foreground/background separator 103, the motion vector sent from the mixture-ratio calculator 102, and the area information sent from the area specifying unit 101, and then outputs the foreground component image in which motion blur is adjusted.

Figure 24:
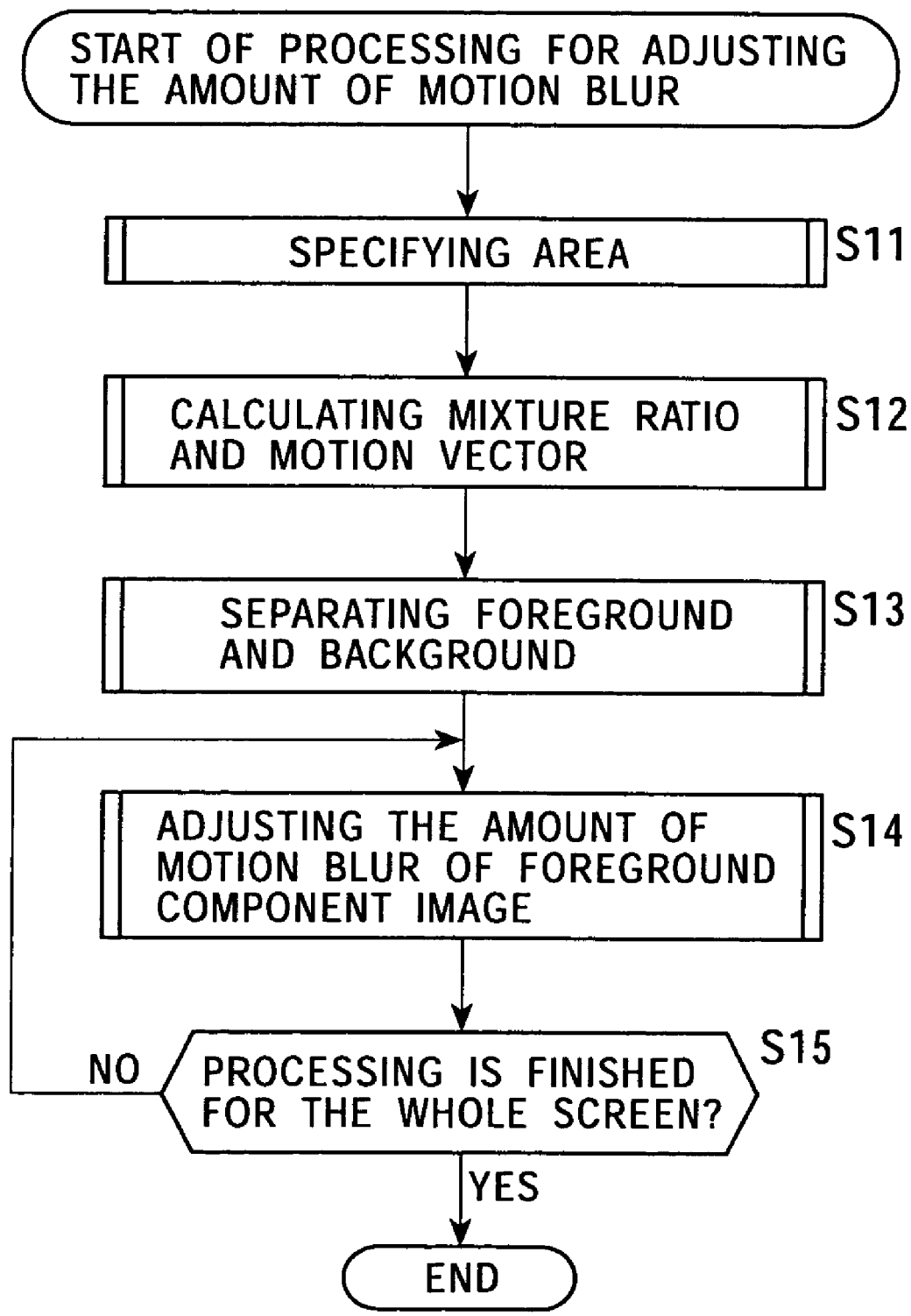
FIG. 24 is a flowchart illustrating processing for adjusting the amount of motion blur.

The processing for adjusting the amount of motion blur performed by the image processing apparatus is described below with reference to the flowchart of FIG. 24. In step S11, the area specifying unit 101 executes area specifying processing, based on an input image, for generating area information indicating to which of a foreground area, a background area, a covered background area, or an uncovered background area each pixel of the input image belongs. Details of the area specifying processing are given below. The area specifying unit 101 sends the generated area information to the mixture-ratio calculator 102.

In step S11, the area specifying unit 101 may generate, based on the input image, area information indicating to which of the foreground area, the background area, or the mixed area (regardless of whether each pixel belongs to a covered background area or an uncovered background area) each pixel of the input image belongs. In this case, the foreground/background separator 103 and the motion-blur adjusting unit 104 determine based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S12, the mixture-ratio calculator 102 calculates a mixture ratio α and a motion vector for each pixel included in the mixed area based on the input image and the area information. Details of processing for calculating the mixture ratio and the motion vector will be given below. The mixture-ratio calculator 102 sends the calculated mixture ratio α to the foreground/background separator 103, and the motion vector to the motion-blur adjusting unit 104.

In step S13, the foreground/background separator 103 extracts the foreground components from the input image based on the area information and the mixture ratio α, and sends the foreground components to the motion-blur adjusting unit 104 as the foreground component image.

In step S14, the motion-blur adjusting unit 104 generates, based on the motion vector and the area information, the unit of processing that indicates the positions of consecutive pixels disposed in the moving direction and belonging to any of the uncovered background area, the foreground area, and the covered background area, and adjusts the amount of motion blur included in the foreground components corresponding to the unit of processing. Details of the processing for adjusting the amount of motion blur are given below.

In step S15, the image processing apparatus determines whether the processing is finished for the whole screen. If it is determined that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the image processing apparatus is capable of adjusting the amount of motion blur included in the foreground by separating the foreground and the background. That is, the image processing apparatus is capable of adjusting the amount of motion blur included in sampled data indicating the pixel values of the foreground pixels.

The configuration of each of the area specifying unit 101, the mixture-ratio calculator 102, the foreground/background separator 103, and the motion-blur adjusting unit 104 is described below.

Figure 25:
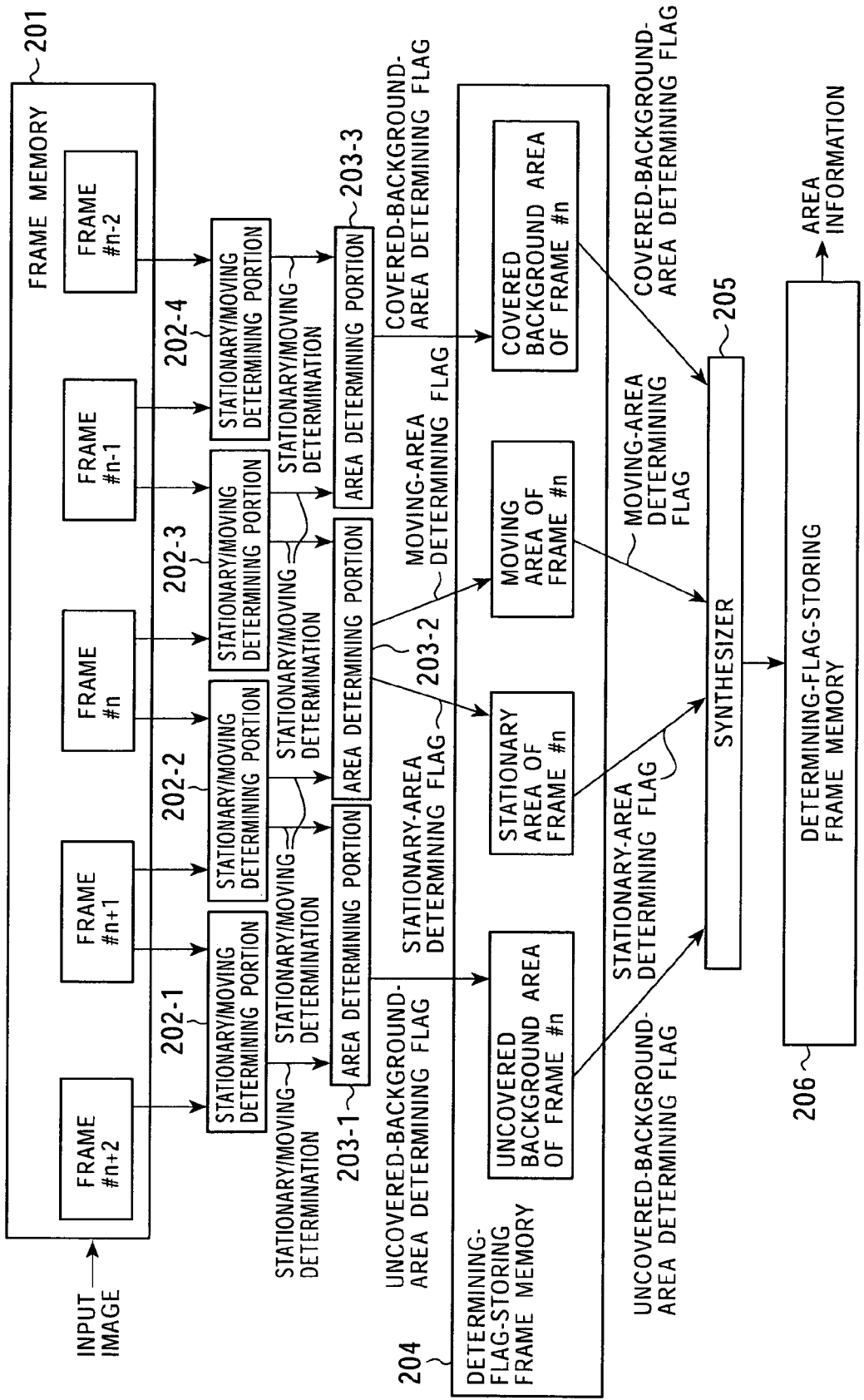
FIG. 25 is a block diagram illustrating an example of the configuration of an area specifying unit 101.

FIG. 25 is a block diagram illustrating an example of the configuration of the area specifying unit 101. The area specifying unit 101 shown in FIG. 25 does not use a motion vector. A frame memory 201 stores an input image in units of frames. When the image to be processed is frame #n, the frame memory 201 stores frame #n−2, which is the frame two frames before frame #n, frame #n−1, which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel of frame #n+2 located at the same position as a designated pixel of frame #n in which the area to which the pixel belongs is determined, and reads the pixel value of the pixel of frame #n+1 located at the same position of the designated pixel of frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is sent to an area determining portion 203-1. If it is determined that the absolute value of the difference between the pixel value of the pixel of frame #n+2 and the pixel value of the pixel of frame #n+1 is smaller than or equal to the threshold Th, the stationary/moving determining portion 202-1 sends a stationary/moving determination indicating "stationary" to the area determining portion 203-1.

A stationary/moving determining portion 202-2 reads the pixel value of a designated pixel of frame #n in which the area to which the pixel belongs is determined, and reads the pixel value of the pixel of frame #n+1 located at the same position as the designated pixel of frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than a preset threshold Th. If it is determined that the absolute value of the difference between the pixel values is greater than the threshold Th, a stationary/moving determination indicating "moving" is sent to the area determining portion 203-1 and an area determining portion 203-2. If it is determined that the absolute value of the difference between the pixel value of the pixel of frame #n+1 and the pixel value of the pixel of frame #n is smaller than or equal to the threshold Th, the stationary/moving determining portion 202-2 sends a stationary/moving determination indicating "stationary" to the area determining portion 203-1 and the area determining portion 203-2.

A stationary/moving determining portion 202-3 reads the pixel value of a designated pixel of frame #n in which the area to which the pixel belongs is determined, and reads the pixel value of the pixel of frame #n−1 located at the same position as the designated pixel of frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than a preset threshold Th. If it is determined that the absolute value of the difference between the pixel values is greater than the threshold Th, a stationary/moving determination indicating "moving" is sent to the area determining portion 203-2 and an area determining portion 203-3. If it is determined that the absolute value of the difference between the pixel value of the pixel of frame #n and the pixel value of the pixel of frame #n−1 is smaller than or equal to the threshold Th, the stationary/moving determining portion 202-3 sends a stationary/moving determination indicating "stationary" to the area determining portion 203-2 and the area determining portion 203-3.

A stationary/moving determining portion 202-4 reads the pixel value of the pixel of frame #n−1 located at the same position as a designated pixel of frame #n in which the area to which the pixel belongs is determined, and reads the pixel value of the pixel of frame #n−2 located at the same position as the designated pixel of frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than a preset threshold Th. If it is determined that the absolute value of the difference between the pixel values is greater than the threshold Th, a stationary/moving determination indicating "moving" is sent to the area determining portion 203-3. If it is determined that the absolute value of the difference between the pixel value of the pixel of frame #n−1 and the pixel value of the pixel of frame #n−2 is smaller than or equal to the threshold Th, the stationary/moving determining portion 202-4 sends a stationary/moving determination indicating "stationary" to the area determining portion 203-3.

When the stationary/moving determination sent from the stationary/moving determining portion 202-1 indicates "stationary" and when the stationary/moving determination sent from the stationary/moving determining portion 202-2 indicates "moving", the area determining portion 203-1 determines that the designated pixel of frame #n belongs to an uncovered background area, and sets "1", which indicates that the designated pixel belongs to an uncovered background area, in an uncovered-background-area determining flag associated with the designated pixel.

When the stationary/moving determination sent from the stationary/moving determining portion 202-1 indicates "moving" or when the stationary/moving determination sent from the stationary/moving determining portion 202-2 indicates "stationary", the area specifying unit 203-1 determines that the designated pixel of frame #n does not belong to an uncovered background area, and sets "0", which indicates that the designated pixel does not belong to an uncovered background area, in the uncovered-background-area determining flag associated with the designated pixel.

The area determining portion 203-1 sends the uncovered-background-area determining flag in which "1" or "0" is set as discussed above to a determining-flag-storing frame memory 204.

When the stationary/moving determination sent from the stationary/moving determining portion 202-2 indicates "stationary" and when the stationary/moving determination sent from the stationary/moving determining portion 202-3 indicate "stationary", the area determining portion 203-2 determines that the designated pixel of frame #n belongs to the stationary area, and sets "1", which indicates that the pixel belongs to the stationary area, in a stationary-area determining flag associated with the designated pixel.

When the stationary/moving determination sent from the stationary/moving determining portion 202-2 indicates "moving" or when the stationary/moving determination sent from the stationary/moving determining portion 202-3 indicate "moving", the area determining portion 203-2 determines that the designated pixel of frame #n does not belong to the stationary area, and sets "0", which indicates that the pixel does not belong to the stationary area, in the stationary-area determining flag associated with the designated pixel.

The area determining portion 203-2 sends the stationary-area determining flag in which "1" or "0" is set as discussed above to the determining-flag-storing frame memory 204.

When the stationary/moving determination sent from the stationary/moving determining portion 202-2 indicates "moving" and when the stationary/moving determination sent from the stationary/moving determining portion 202-3 indicate "moving", the area determining portion 203-2 determines that the designated pixel of frame #n belongs to the moving area, and sets "1", which indicates that the designated pixel belongs to the moving area, in a moving-area determining flag associated with the designated pixel.

When the stationary/moving determination sent from the stationary/moving determining portion 202-2 indicates "stationary" or when the stationary/moving determination sent from the stationary/moving determining portion 202-3 indicate "stationary", the area determining portion 203-2 determines that the designated pixel of frame #n does not belong to the moving area, and sets "0", which indicates that the pixel does not belong to the moving area, in the moving-area determining flag associated with the designated pixel.

The area determining portion 203-2 sends the moving-area determining flag in which "1" or "0" is set as discussed above to the determining-flag-storing frame memory 204.

When the stationary/moving determination sent from the stationary/moving determining portion 202-3 indicates "moving" and when the stationary/moving determination sent from the stationary/moving determining portion 202-4 indicate "stationary", the area determining portion 203-3 determines that the designated pixel of frame #n belongs to a covered background area, and sets "1", which indicates that the designated pixel belongs to the covered background area, in a covered-background-area determining flag associated with the designated pixel.

When the stationary/moving determination sent from the stationary/moving determining portion 202-3 indicates "stationary" or when the stationary/moving determination sent from the stationary/moving determining portion 202-4 indicate "moving", the area determining portion 203-3 determines that the designated pixel of frame #n does not belong to a covered background area, and sets "0", which indicates that the designated pixel does not belong to a covered background area, in the covered-background-area determining flag associated with the designated pixel.

The area determining portion 203-3 sends the covered-background-area determining flag in which "1" or "0" is set as discussed above to the determining-flag-storing frame memory 204.

The determining-flag-storing frame memory 204 thus stores the uncovered-background-area determining flag sent from the area determining portion 203-1, the stationary-area determining flag sent from the area determining portion 203-2, the moving-area determining flag sent from the area determining portion 203-2, and the covered-background-area determining flag sent from the area determining portion 203-3.

The determining-flag-storing frame memory 204 sends the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag sent from the determining-flag-storing frame memory 204, and sends the area information to a determining-flag-storing frame memory 206.

The determining-flag-storing frame memory 206 stores the area information sent from the synthesizer 205, and also outputs the area information stored therein.

Next, An example of the processing performed by the area specifying unit 101 when a frame interval time has the same length as a shutter time will be described below with reference to FIGS. 26 through 30.

Figure 26:
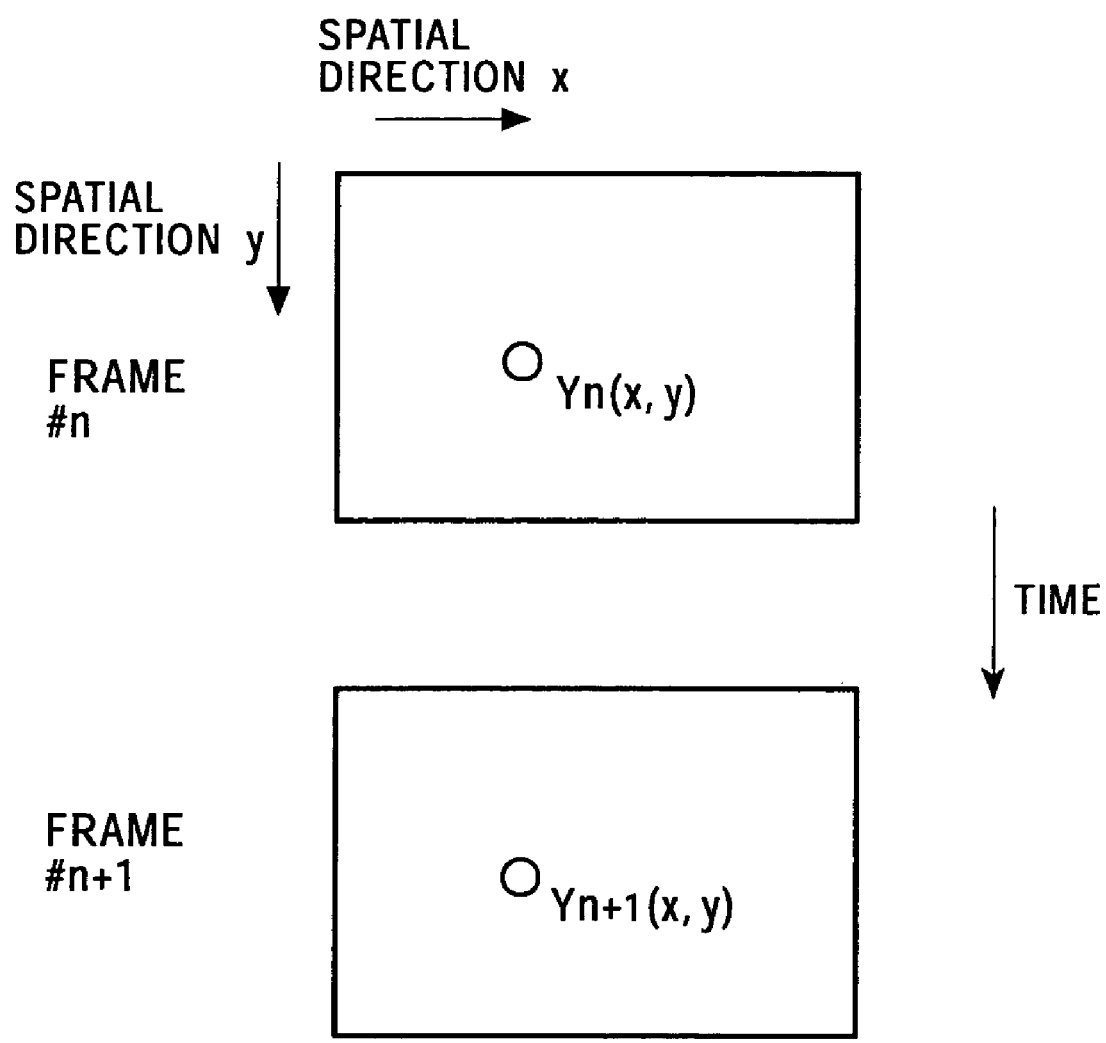
FIG. 26 illustrates an image obtained when an object corresponding to a foreground is moving.

When the object corresponding to the foreground is moving, the position of the image corresponding to the object on the screen changes in every frame. As shown in FIG. 26, the image corresponding to the object located at the position indicated by $Y_n(x,y)$ in frame #n is positioned at $Y_{n+1}(x,y)$ in frame #n+1, which is subsequent to frame #n.

A model obtained by developing in the time direction the pixel values of the pixels aligned side-by-side in the moving direction of the image corresponding to the foreground object is shown in FIG. 22. For example, if the moving direction of the image corresponding to the foreground object is horizontal with respect to the screen, the model shown in FIG. 27 is a model obtained by developing in the time direction the pixel values of the pixels disposed on a line side-by-side.

Figure 27:
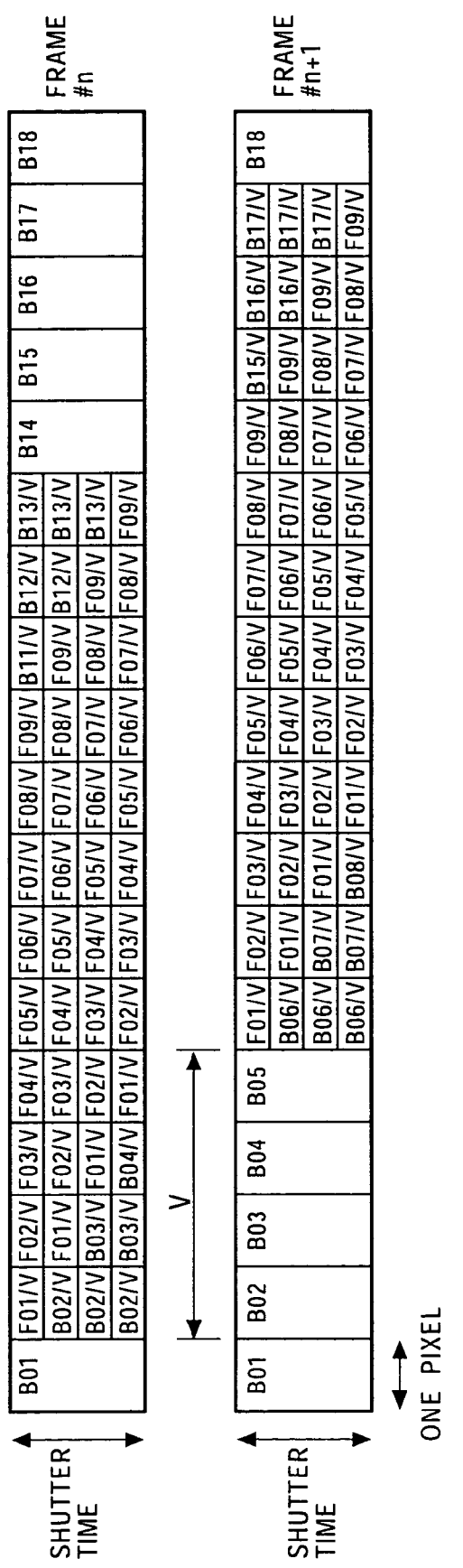
FIG. 27 illustrates a model in which pixel values are developed in the time direction and the period corresponding to the shutter time is divided.

In FIG. 27, the line in frame #n is equal to the line in frame #n+1.

The foreground components corresponding to the object included in the second pixel to the thirteenth pixel from the left in frame #n are included in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 27, since the foreground components included in frame #n are moved such that they are included in four pixels, the amount v of movement is four. A virtual division number is four in accordance with the amount v of movement.

A description is now given of a change in pixel values of the pixels belonging to the mixed area in the frames before and after a designated frame.

Figure 28:
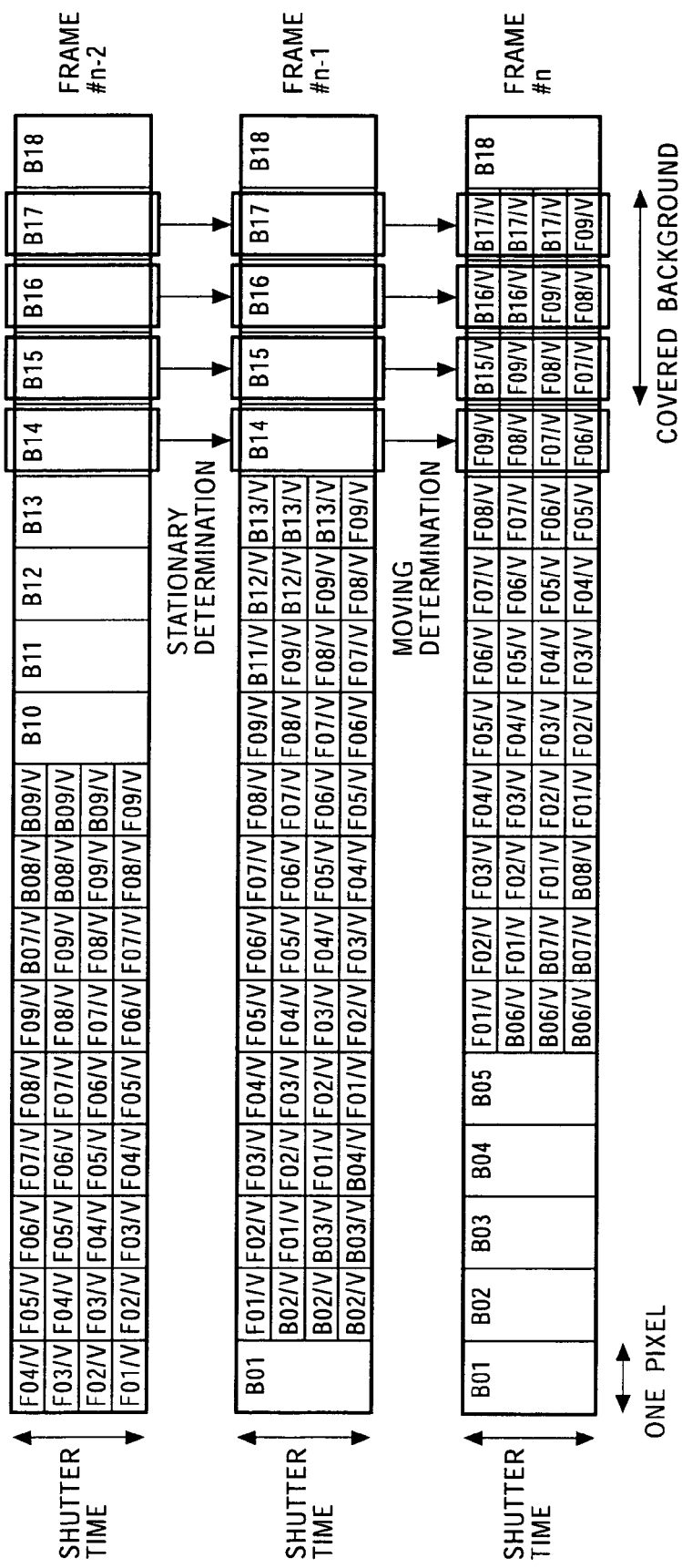
FIG. 28 illustrates a model in which pixel values are developed in the time direction and the period corresponding to the shutter time is divided.

In FIG. 28, the pixels belonging to a covered background area in frame #n in which the background is stationary and the amount v of movement within the shutter time in the foreground is four are the fifteenth through seventeenth pixels from the left. Since the amount v of movement within the shutter time is four, the fifteenth through seventeenth pixels from the left in the previous frame #n−1 include only background components and belong to the background area. The fifteenth through seventeenth pixels from the left in frame #n−2, which is one frame before frame #n−1, include only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

In other words, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n include foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is sent from the stationary/moving determining portion 202-3, and when the stationary/moving determination result indicating "stationary" is sent from the stationary/moving determining portion 202-4, as discussed above, the area determining portion 203-3 determines that the corresponding pixels belong to a covered background area.

In FIG. 29, in frame #n in which the background is stationary and the amount v of movement within the shutter time in the foreground is four, the pixels included in an uncovered background area are the second through fourth pixels from the left. Since the frame interval time has the same length as the shutter time and the amount v of movement is four, the second through fourth pixels from the left in the subsequent frame #n+1 include only background components and belong to the background area. In frame #n+2, which is subsequent to frame #n+1, the second through fourth pixels from the left include only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

In other words, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame #n+2 corresponding to the pixels belonging to the mixed area in frame #n by the stationary/moving determining portion 202-1 is "stationary".

Since the pixels belonging to the uncovered background area in frame #n include foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is sent from the stationary/moving determining portion 202-2, and when the stationary/moving determination result indicating "stationary" is sent from the stationary/moving determining portion 202-1, as discussed above, the area determining portion 203-1 determines that the corresponding pixels belong to an uncovered background area.

FIG. 30 illustrates determination conditions for frame #n made by the area specifying unit 101. When the determination result for the pixel in frame #n−2 located at the same image position as a pixel in frame #n to be processed and for the pixel in frame #n−1 located at the same position as the pixel in frame #n is stationary, and when the determination result for the pixel in frame #n and the pixel in frame #n−1 located at the same image position as the pixel in frame #n is moving, the area specifying unit 101 determines that the pixel in frame #n belongs to a covered background area.

When the determination result for the pixel in frame #n and the pixel in frame #n−1 located at the same image position as the pixel in frame #n is stationary, and when the determination result for the pixel in frame #n and the pixel in frame #n+1 located at the same image position as the pixel in frame #n is stationary, the area specifying unit 101 determines that the pixel in frame #n belongs to the stationary area.

When the determination result for the pixel in frame #n and the pixel in frame #n−1 located at the same image position as the pixel in frame #n is moving, and when the determination result for the pixel in frame #n and the pixel in frame #n+1 located at the same image position as the pixel in frame #n is moving, the area specifying unit 101 determines that the pixel in frame #n belongs to the moving area.

When the determination result for the pixel in frame #n and the pixel in frame #n+1 located at the same image position as the pixel in frame #n is moving, and when the determination result for the pixel in frame #n+1 located at the same image position as the pixel in frame #n and the pixel in frame #n+2 located at the same image position as the pixel in frame #n is stationary, the area specifying unit 101 determines that the pixel in frame #n belongs to an uncovered background area.

Figure 31A:
FIG. 31A illustrates an example result obtained by specifying an area by the area specifying unit 101.
Figure 31B:
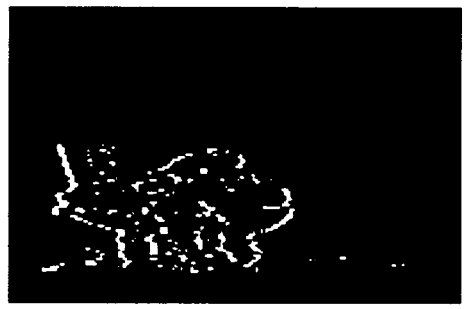
FIG. 31B illustrates an example result obtained by specifying an area by the area specifying unit 101.

FIGS. 31A through 31D illustrate examples of the area determination results obtained by the area specifying unit 101. In FIG. 31A, the pixels which are determined to belong to a covered background area are indicated in white. In FIG. 31B, the pixels which are determined to belong to an uncovered background area are indicated in white.

Figure 31C:
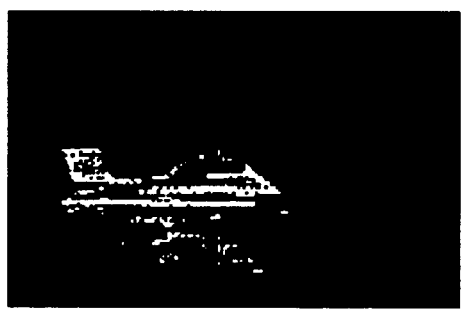
FIG. 31C illustrates an example result obtained by specifying an area by the area specifying unit 101.
Figure 31D:
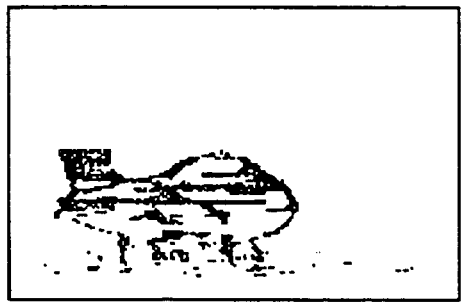
FIG. 31D illustrates an example result obtained by specifying an area by the area specifying unit 101.

In FIG. 31C, the pixels which are determined to belong to a moving area are indicated in white. In FIG. 31D, the pixels which are determined to belong to a stationary area are indicated in white.

Figure 32:
FIG. 32 illustrates an example result obtained by specifying an area by the area specifying unit 101.

FIG. 32 illustrates the area information indicating the mixed area, in the form of an image, selected from the area information output from the determining-flag-storing frame memory 206. In FIG. 32, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 33:
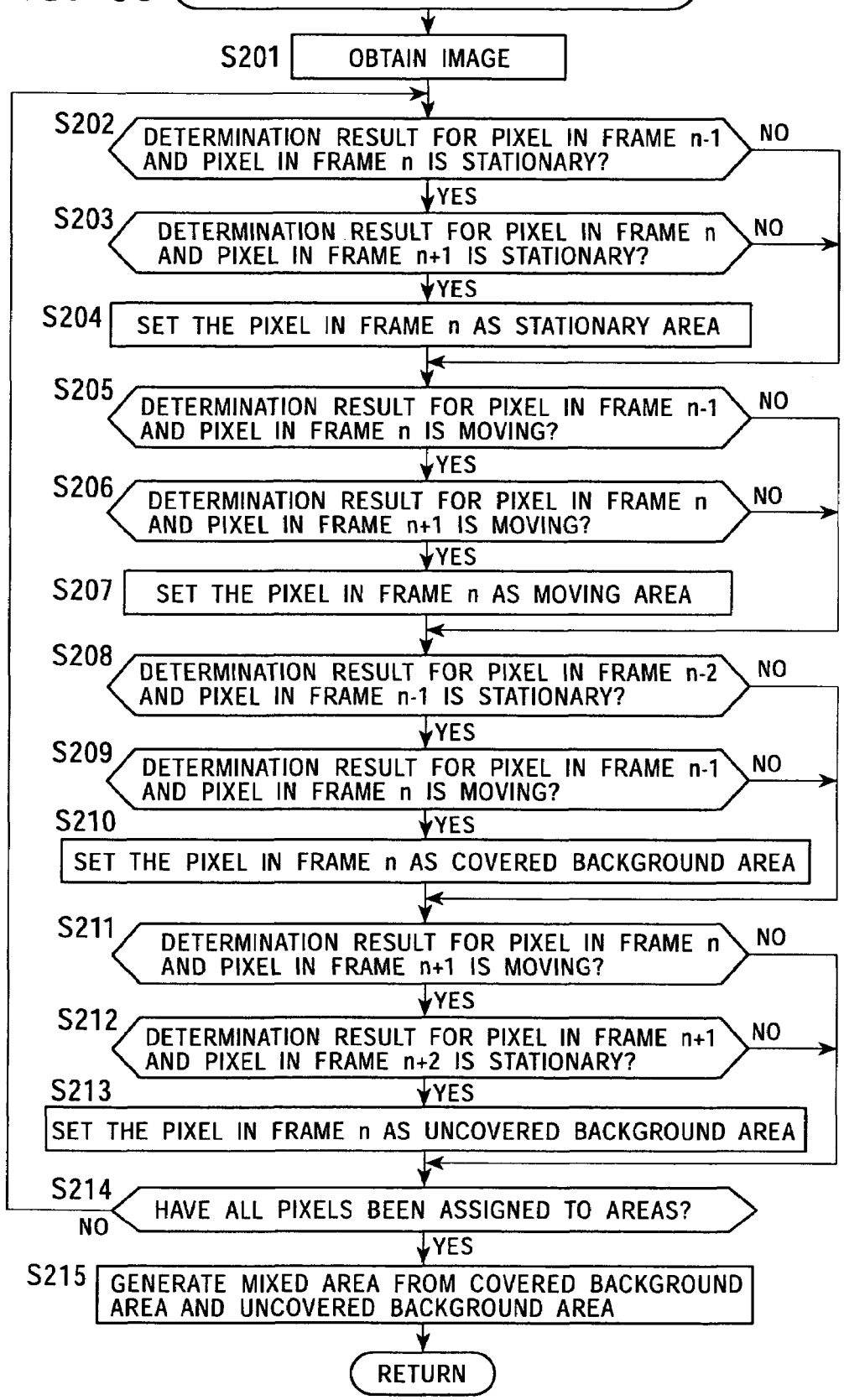
FIG. 33 is a flowchart illustrating area specifying processing.

The area specifying processing performed by the area specifying unit 101 is described below with reference to the flowchart of FIG. 33. In step S201, the frame memory 201 obtains an image of frame #n−2 through frame #n+2 including frame #n.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 sends the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 sends the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 sends the covered-background-area determining flag to the determining-flag-storing frame memory 204, and the process proceeds to step S211. The area determining portion 203-3 sends the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 sends the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 101 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 215 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 101 is capable of generating area information indicating to which of the moving area, the stationary area, the uncovered background area, or the covered background area each of the pixels included in a frame belongs.

The area specifying unit 101 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels included in the frame belong.

When the object corresponding to the foreground has a texture, the area specifying unit 101 is able to specify the moving area more precisely.

The area specifying unit 101 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area includes motion. For example, if the image corresponding to the background area is uniformly moving, the area specifying unit 101 shifts the overall image in accordance with this motion, and performs processing in a manner similar to the case in which the object corresponding to the background is stationary. If the image corresponding to the background area includes locally different motions, the area specifying unit 101 selects the pixels corresponding to the motions, and executes the above-described processing.

Figure 34:
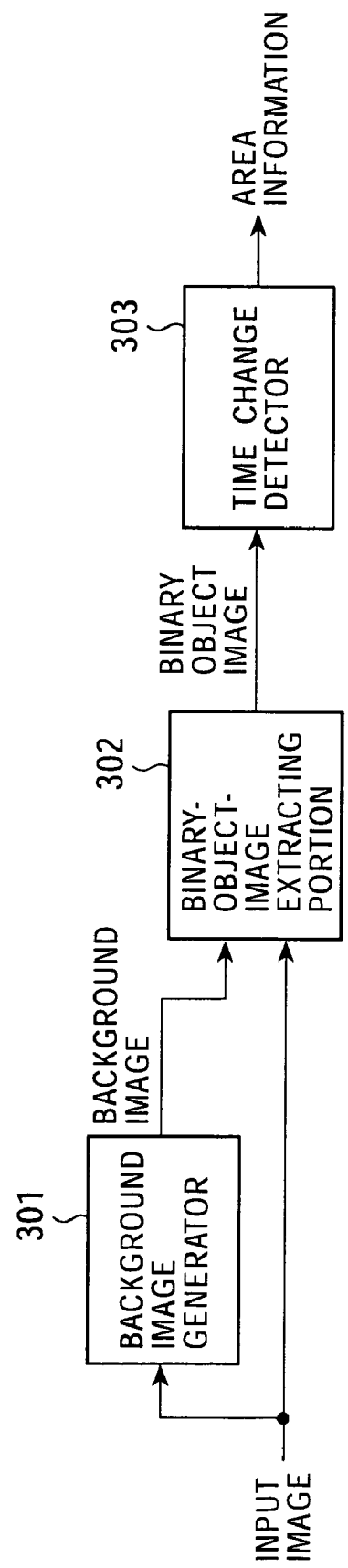
FIG. 34 is a block diagram illustrating another example configuration of the area specifying unit 101.

FIG. 34 is a block diagram illustrating another example of the configuration of the area specifying unit 101. A background image generator 301 generates a background image corresponding to an input image, and sends the generated background image to a binary-object-image extracting portion 302. The background image generator 301 extracts, for example, an image object corresponding to a background object included in the input image, and generates the background image.

Figure 35:
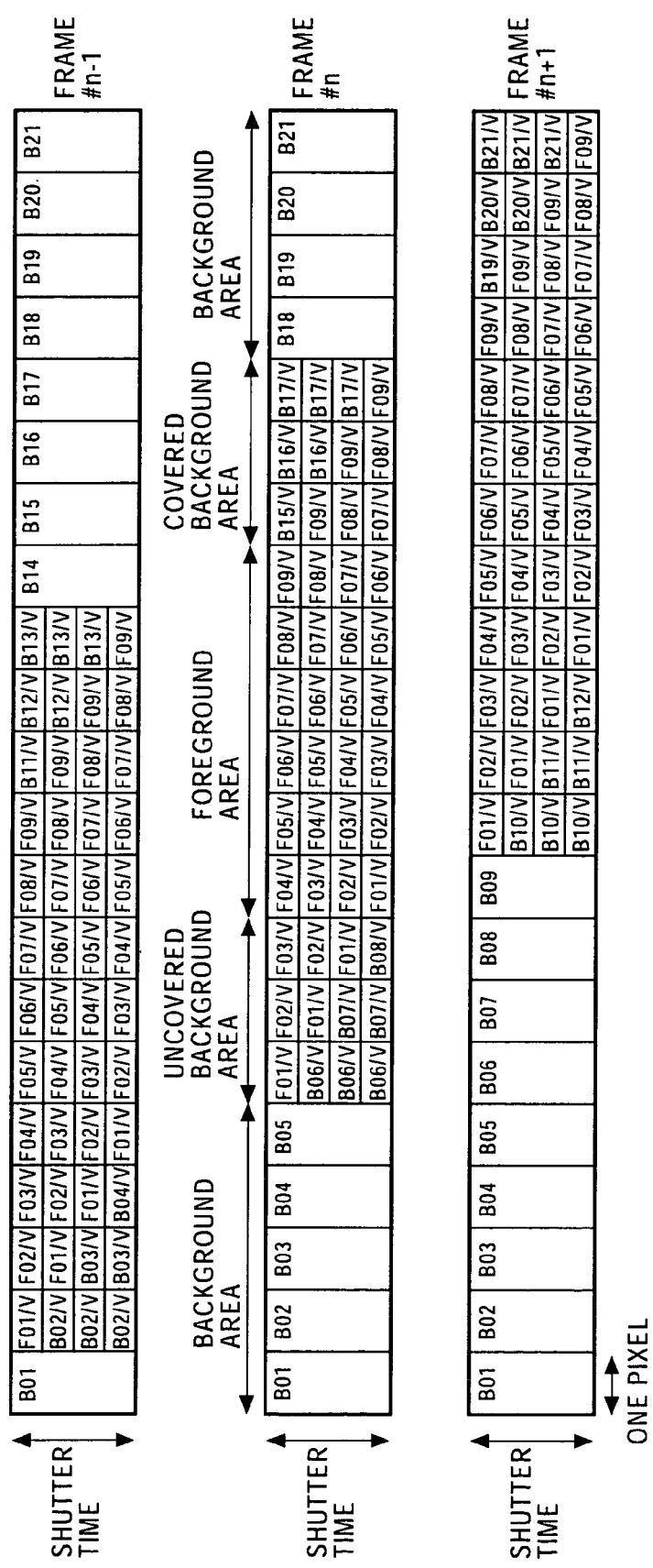
FIG. 35 illustrates a model in which pixel values are developed in the time direction and the period corresponding to the shutter time is divided.

An example of a model obtained by developing in the time direction the pixel values of pixels aligned side-by-side in the moving direction of an image corresponding to a foreground object is shown in FIG. 35. For example, if the moving direction of the image corresponding to the foreground object is horizontal with respect to the screen, the model shown in FIG. 35 is a model obtained by developing the pixel values of pixels disposed side-by-side on a single line in the time domain.

In FIG. 35, the line in frame #n is the same as the line in frame #n−1 and the line in frame #n+1.

In frame #n, the foreground components corresponding to the object included in the sixth through seventeenth pixels from the left are included in the second through thirteenth pixels from the left in frame #n−1 and are also included in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels belonging to the background area are the first through ninth pixels from the left.

Figure 36:
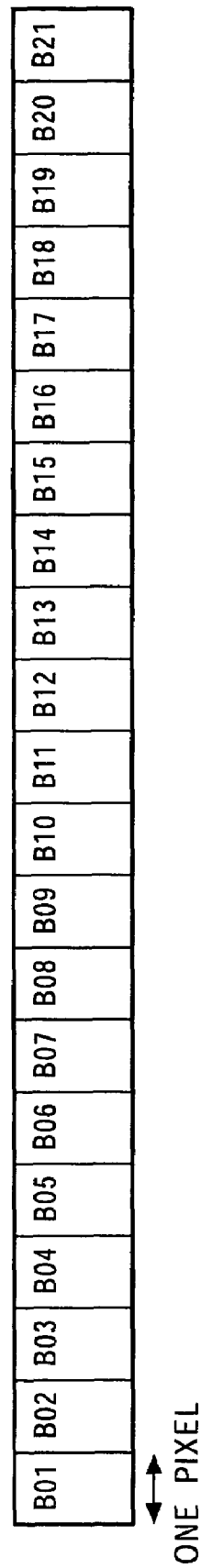
FIG. 36 illustrates an example of a background image.

An example of the background image corresponding to the example shown in FIG. 35 generated by the background image generator 301 is shown in FIG. 36. The background image consists of the pixels corresponding to the background object, and does not include image components corresponding to the foreground object.

The binary-object-image extracting portion 302 generates a binary object image based on the correlation between the background image and the input image, and sends the generated binary object image to a time change detector 303.

Figure 37:
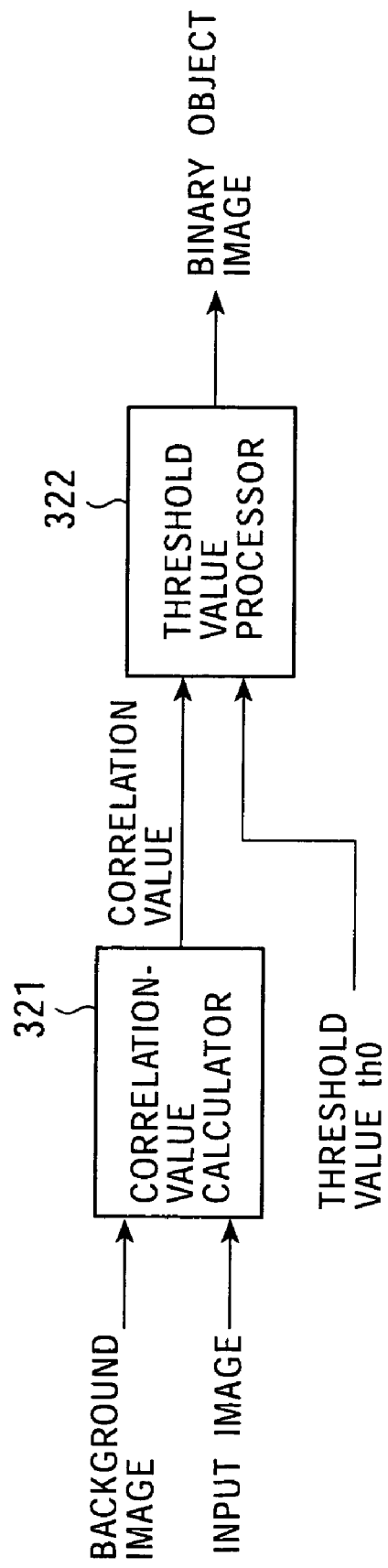
FIG. 37 is a block diagram illustrating the configuration of a binary-object-image extracting portion 302.

FIG. 37 is a block diagram illustrating the configuration of the binary-object-image extracting portion 302. A correlation-value calculator 321 calculates the correlation between the background image sent from the background image generator 301 and the input image so as to generate a correlation value, and sends the generated correlation value to a threshold-value processor 322.

The correlation-value calculator 321 applies equation (4) to, for example, 3×3-background image blocks having $X_4$ at the center, as shown in FIG. 38A, and to, for example, 3×3-background image blocks having $Y_4$ at the center which corresponds to the background image blocks, as shown in FIG. 38B, thereby calculating a correlation value corresponding to $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation-value calculator 321 sends the correlation value calculated for each pixel as discussed above to the threshold-value processor 322.

Alternatively, the correlation-value calculator 321 may apply equation (7) to, for example, 3×3-background image blocks having $X_4$ at the center, as shown in FIG. 39A, and to, for example, 3×3-background image blocks having $Y_4$ at the center which corresponds to the background image blocks, as shown in FIG. 39B, thereby calculating the sum of absolute values of differences corresponding to $Y_4$.

$$\text{Sum of absolute values of differences} = \sum_{i=0}^{8}|(Xi-Yi)| \quad (7)$$

The correlation-value calculator 321 sends the absolute value of the differences calculated as described above to the threshold-value processor 322 as the correlation value.

The threshold-value processor 322 compares the pixel value of the correlation image with a threshold value th0. If the correlation value is smaller than or equal to the threshold value th0, 1 is set in the pixel value of the binary object image. If the correlation value is greater than the threshold value th0, 0 is set in the pixel value of the binary object image. The threshold-value processor 322 then outputs the binary object image whose pixel value is set to 0 or 1. The threshold-value processor 322 may store the threshold value th0 therein in advance, or may use the threshold value th0 input from an external source.

Figure 40:
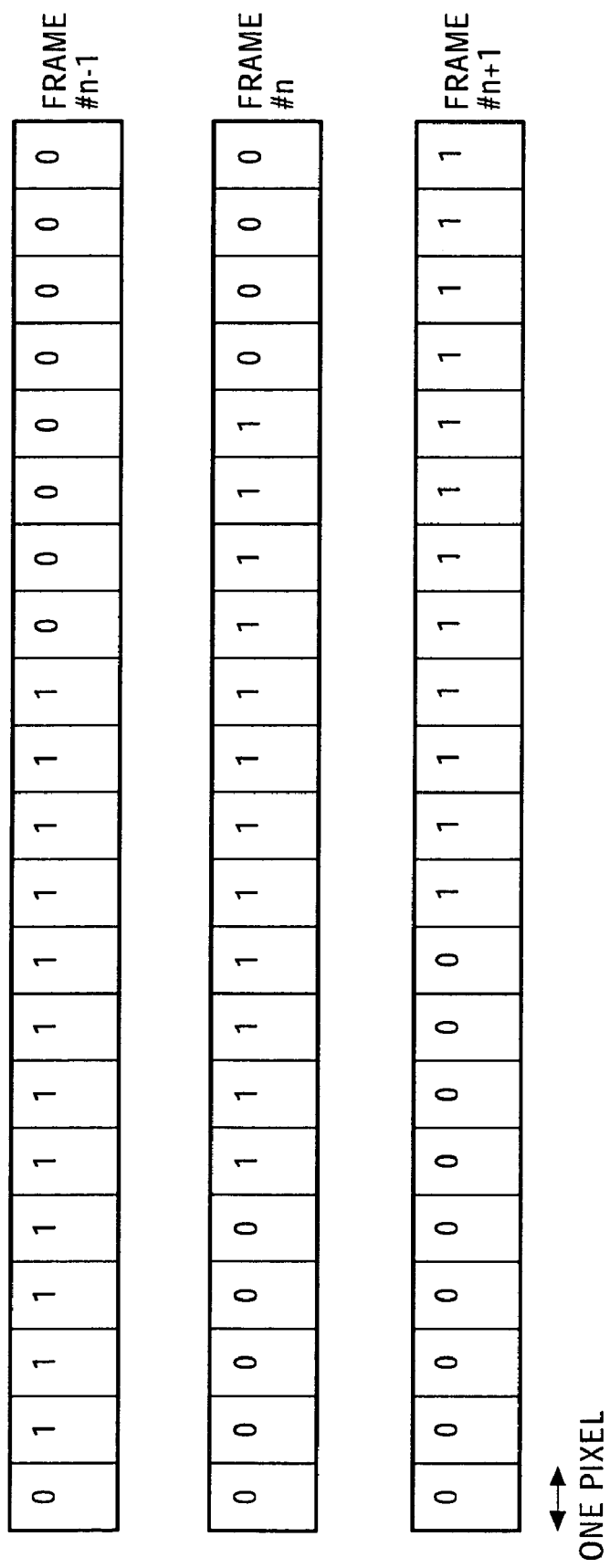
FIG. 40 illustrates an example binary object image.

FIG. 40 illustrates an example of the binary object image corresponding to the model of the input image shown in FIG. 35. In the binary object image, 0 is set in the pixel values of the pixels having a higher correlation with the background image.

Figure 41:
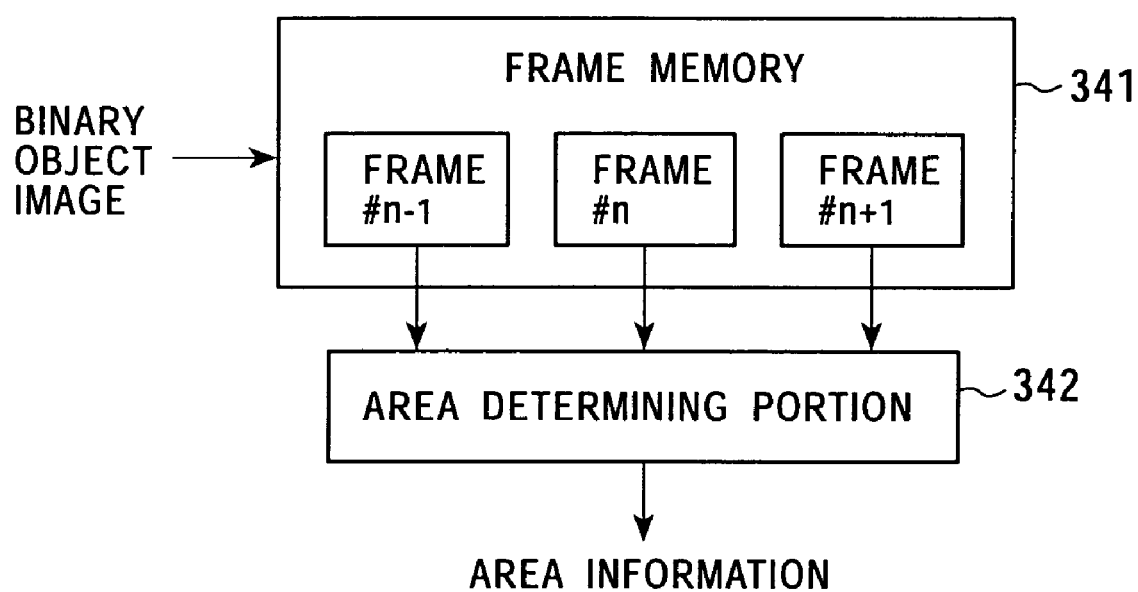
FIG. 41 is a block diagram illustrating the configuration of a time change detector 303.

FIG. 41 is a block diagram illustrating the configuration of the time change detector 303. When determining the area of a pixel in frame #n, a frame memory 341 stores a binary object image of frame #n−1, frame #n, and frame #n+1 sent from the binary-object-image extracting portion 302.

An area determining portion 342 determines the area of each pixel of frame #n based on the binary object image of frame #n−1, frame #n, and frame #n+1 so as to generate area information, and outputs the generated area information.

FIG. 42 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 43:
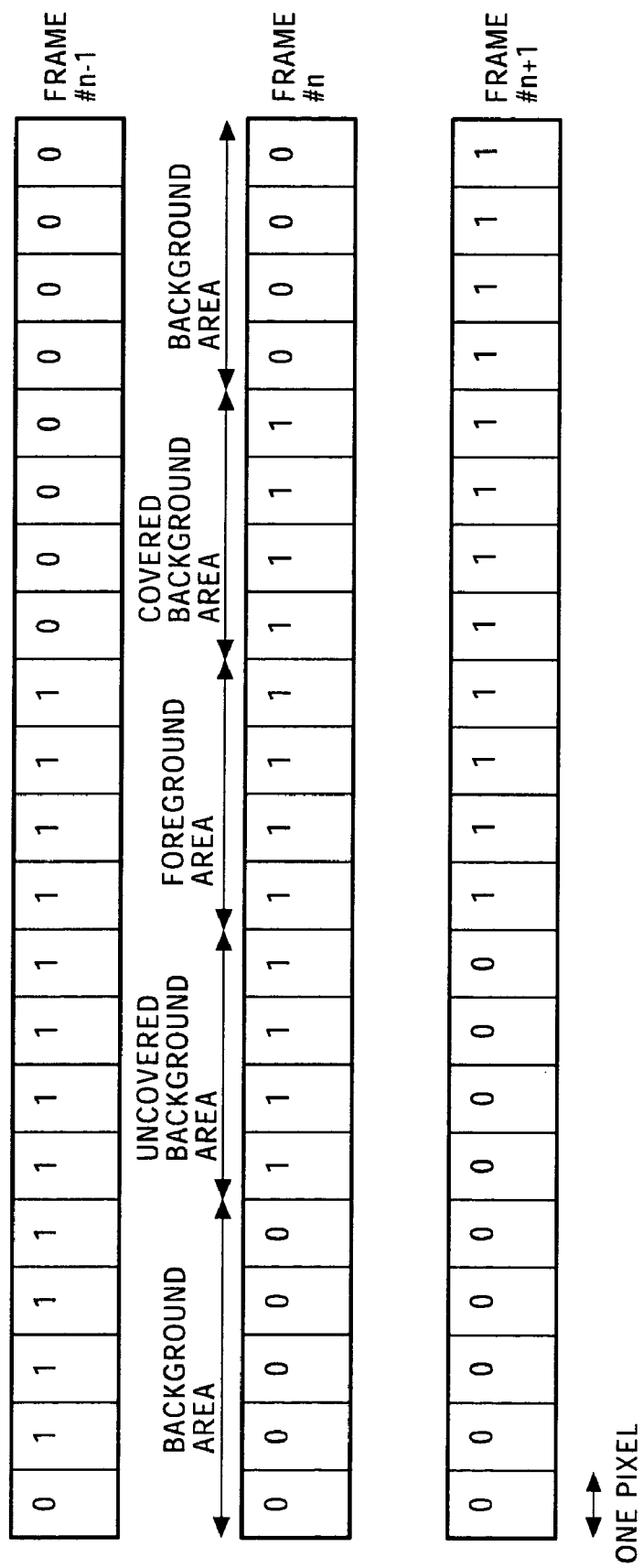
FIG. 43 illustrates an example of determinations made by the time change detector 303.

FIG. 43 illustrates an example of the determinations made by the time change detector 303 on the binary object image corresponding to the model of the input image shown in FIG. 35. The time change detector 303 determines that the first through fifth pixels from the left in frame #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 44:
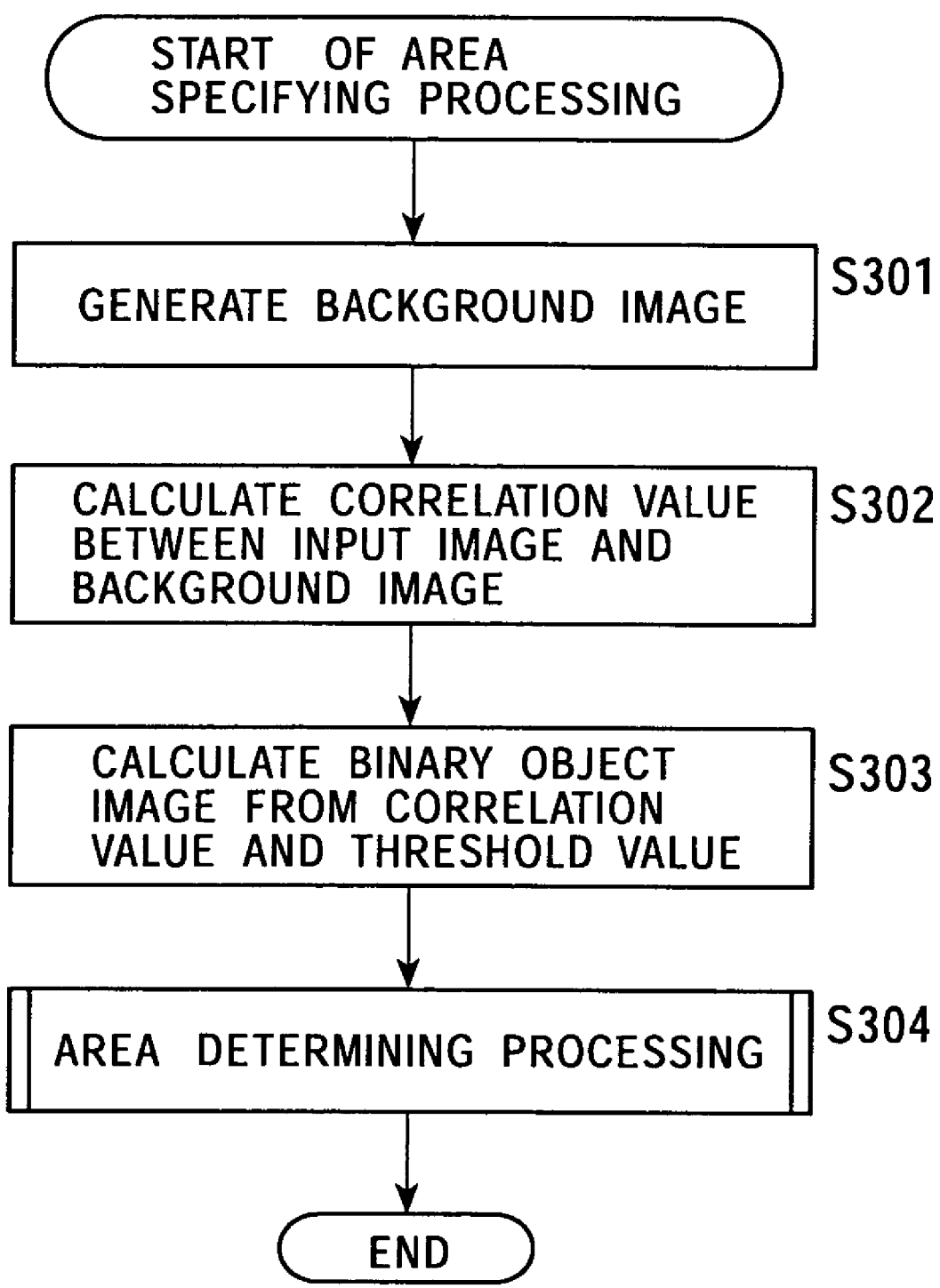
FIG. 44 is a flowchart illustrating the area specifying processing performed by an area determining portion 103.

The area specifying processing performed by the area determining portion 103 is described below with reference to the flowchart of FIG. 44. In step S301, the background image generator 301 of the area determining portion 103 extracts, for example, an image object corresponding to a background object included in an input image based on the input image so as to generate a background image, and sends the generated background image to the binary-object-image extracting portion 302.

In step S302, the binary-object-image extracting portion 302 calculates a correlation value between the input image and the background image sent from the background image generator 301 according to, for example, calculation discussed with reference to FIG. 38B. In step S303, the binary-object-image extracting portion 302 computes a binary object image from the correlation value and the threshold value th0 by, for example, comparing the correlation value with the threshold value th0.

In step S304, the time change detector 303 executes the area determining processing, and the processing is completed.

Figure 45:
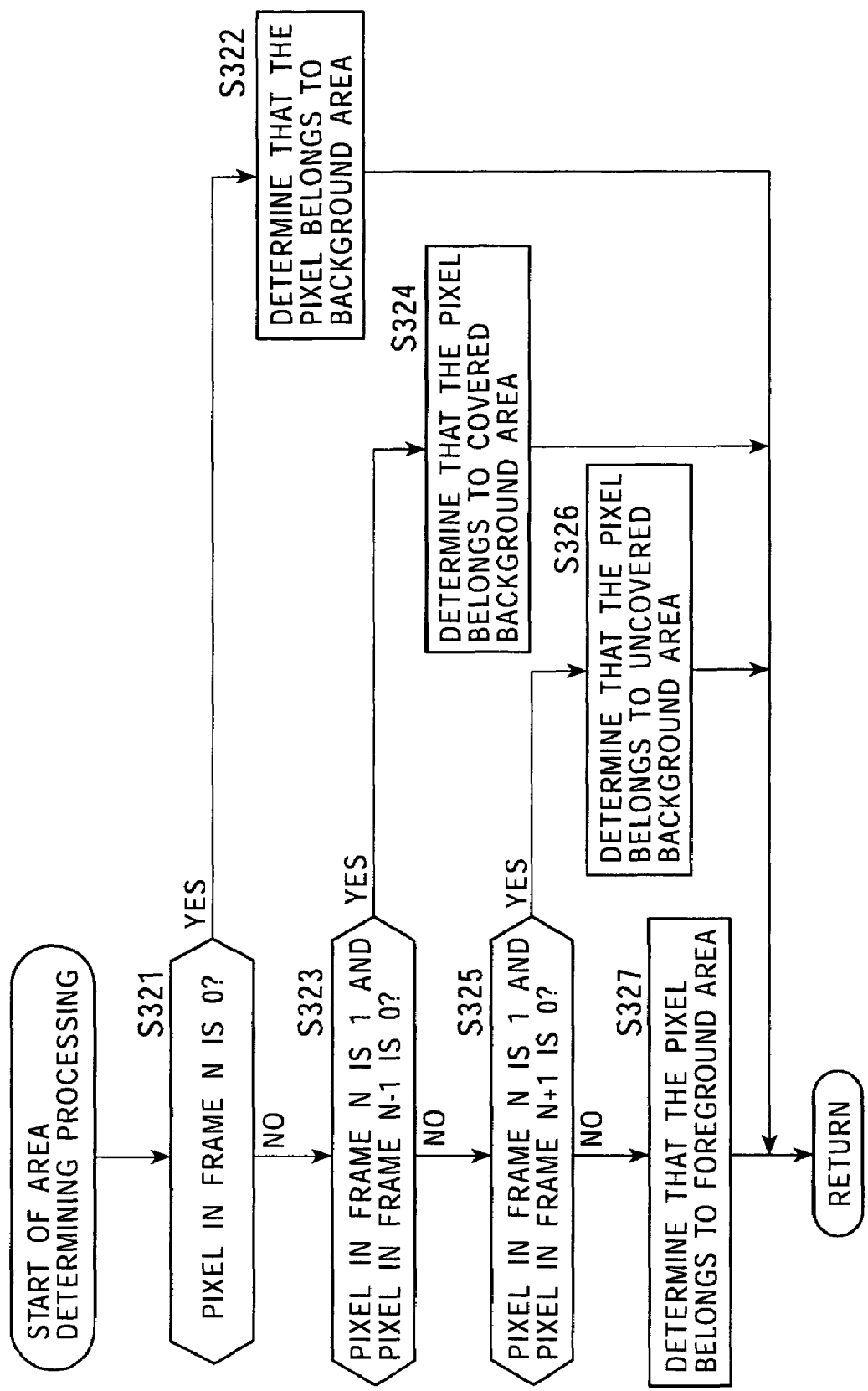
FIG. 45 is a flowchart illustrating details of the area specifying processing.

Details of the area determining processing in step S304 are described below with reference to the flowchart of FIG. 45. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 101 is able to specify, based on the correlation value between the input image and the corresponding background image, to which of the foreground area, the background area, the covered background area, or the uncovered background area each pixel of the input image belongs, and generates area information corresponding to the specified result.

Figure 46:
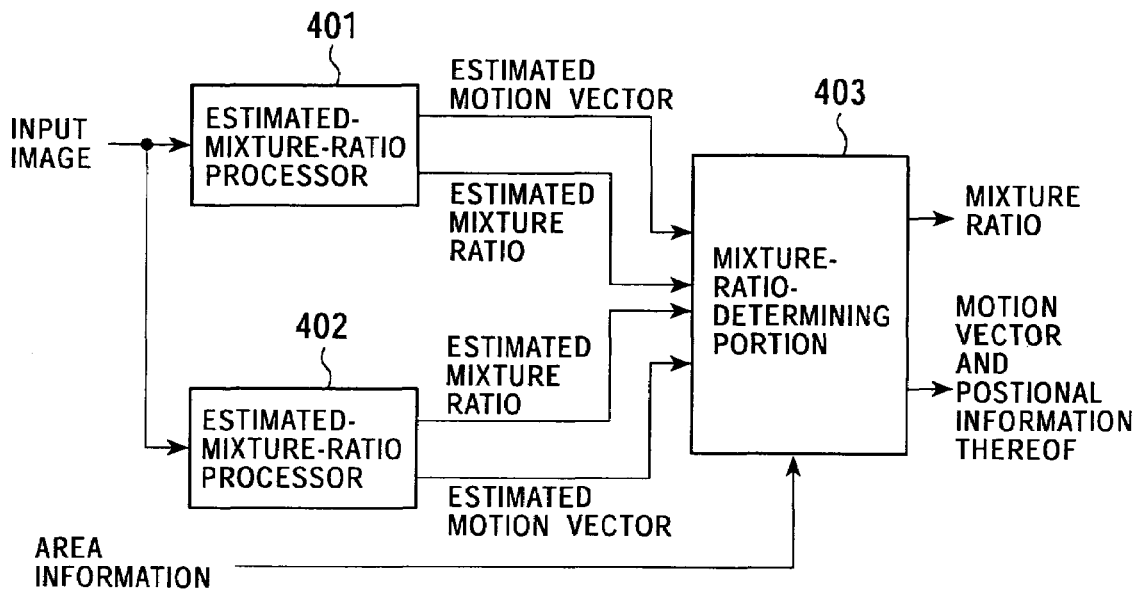
FIG. 46 is a block diagram illustrating the configuration of a mixture-ratio calculator 102.

FIG. 46 is a block diagram illustrating the configuration of the mixture-ratio calculator 102. An estimated-mixture-ratio processor 401 calculates an estimated mixture ratio for each pixel by a calculation corresponding to a model of a covered background area based on the input image, and sends the calculated estimated mixture ratio to a mixture-ratio determining portion 403. The estimated-mixture-ratio processor 401 calculates an estimated motion vector according to the estimated mixture ratio calculated for each pixel by the calculation corresponding to the model of the covered background area, and sends the calculated estimated motion vector to the mixture-ratio determining portion 403.

An estimated-mixture-ratio processor 402 calculates an estimated mixture ratio for each pixel by a calculation corresponding to a model of an uncovered background area based on the input image, and sends the calculated estimated mixture ratio to the mixture-ratio determining portion 403. The estimated-mixture-ratio processor 402 calculates an estimated motion vector according to the estimated mixture ratio calculated for each pixel by the calculation corresponding to the model of the uncovered background area, and sends the calculated estimated motion vector to the mixture-ratio determining portion 403.

The mixture-ratio determining portion 403 sets the mixture ratio $\alpha$ based on the area information sent from the area specifying unit 101 and indicating to which of the foreground area, the background area, the covered background area, or the uncovered background area the pixel for which the mixture ratio $\alpha$ is to be calculated belongs. The mixture-ratio determining portion 403 sets the mixture ratio $\alpha$ to 0 when the corresponding pixel belongs to the foreground area, and sets the mixture ratio $\alpha$ to 1 when the corresponding pixel belongs to the background area. When the corresponding pixel belongs to the covered background area, the mixture-ratio determining portion 403 sets the estimated mixture ratio sent from the estimated-mixture-ratio processor 401 as the mixture ratio $\alpha$. When the corresponding pixel belongs to the uncovered background area, the mixture-ratio determining portion 403 sets the estimated mixture ratio sent from the estimated-mixture-ratio processor 402 as the mixture ratio $\alpha$. The mixture-ratio determining portion 403 outputs the mixture ratio $\alpha$ specified according to the area information.

When the corresponding pixel belongs to the covered background area according to the area information sent from the area specifying unit 101, the mixture-ratio determining portion 403 sets the estimated motion vector sent from the estimated-mixture-ratio processor 401 as the motion vector. When the corresponding pixel belongs to the uncovered background area according to the area information sent from the area specifying unit 101, the mixture-ratio determining portion 403 sets the estimated motion vector sent from the estimated-mixture-ratio processor 402 as the motion vector. The mixture-ratio determining portion 403 outputs the motion vector specified according to the area information and the positional information of the motion vector.

Since it can be assumed that the object corresponding to the foreground is moving at a constant speed within the shutter time, the mixture ratio $\alpha$ of the pixels belonging to a mixed area exhibits the following characteristics. That is, the mixture ratio $\alpha$ linearly changes according to the positional change in the pixels. If the positional change in the pixels is one-dimensional, a change in the mixture ratio $\alpha$ can be represented linearly. If the positional change in the pixels is two-dimensional, a change in the mixture ratio $\alpha$ can be represented on a plane.

Since the period of one frame is short, it can be assumed that the object corresponding to the foreground is a rigid body and is moving at a constant speed.

The gradient of the mixture ratio α is inversely proportional to the amount v of movement within the shutter time of the foreground.

Figure 47:
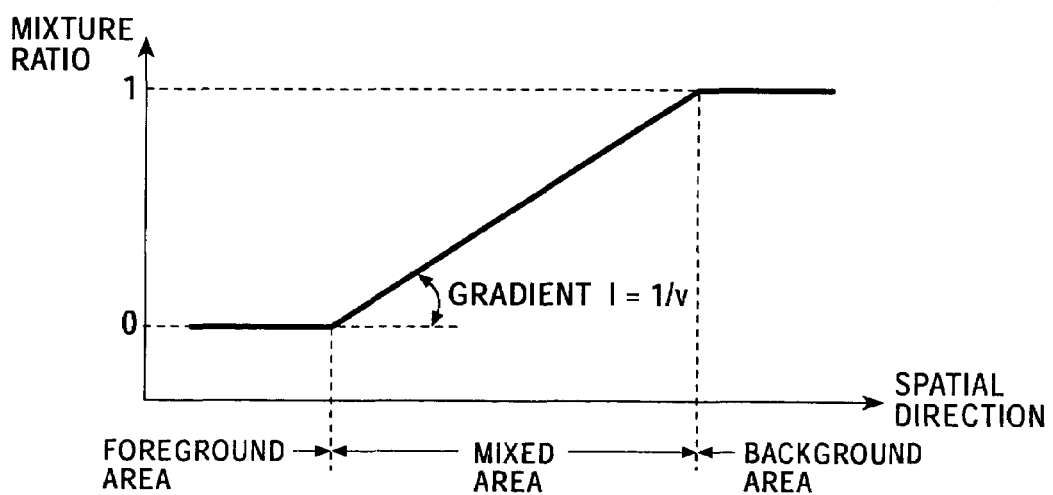
FIG. 47 illustrates an example of an ideal mixture ratio α.

An example of the ideal mixture ratio α is shown in FIG. 47. The gradient 1 of the ideal mixture ratio α in the mixed area can be represented by the reciprocal of the amount v of movement.

As shown in FIG. 47, the ideal mixture ratio α has the value of 1 in the background area, the value of 0 in the foreground area, and the value of greater than 0 and smaller than 1 in the mixed area.

Figure 48:
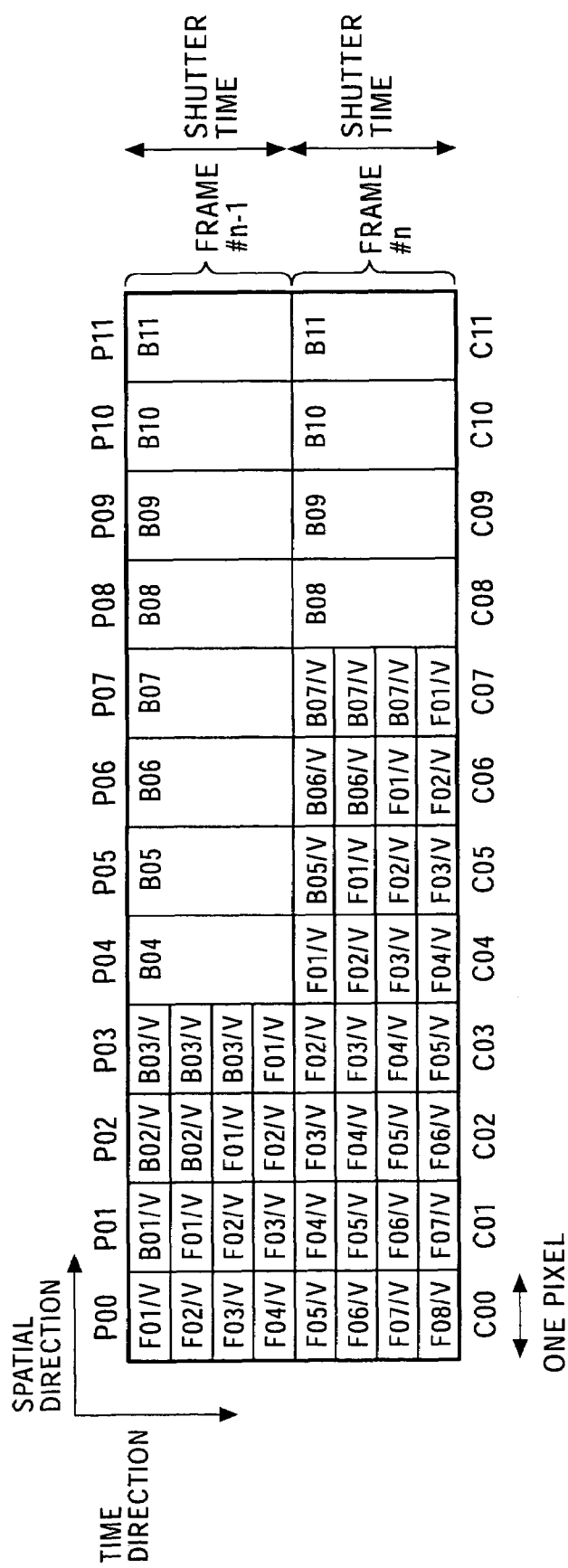
FIG. 48 illustrates a model in which pixel values are developed in the time direction and the period corresponding to the shutter time is divided.

In the example shown in FIG. 48, the pixel value C06 of the seventh pixel from the left in frame #n can be expressed by equation (8) by using the pixel value P06 of the seventh pixel from the left in frame #n−1.

$$C06 = B06/v + B06/v + F01/v + F02/v \qquad (8)$$
$$= P06/v + P06/v + F01/v + F02/v$$
$$= 2/v \cdot P06 + \sum_{i=1}^{2} Fi/v$$

In equation (8), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (9) and (10), respectively.

$$M=C06 \qquad (9)$$

$$B=P06 \qquad (10)$$

In equation (8), 2/v corresponds to the mixture ratio α. Since the amount v of movement within the shutter time is four, the mixture ratio α of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio α can be represented by equation (11):

$$C=\alpha \cdot P+f \qquad (11)$$

where f in equation (11) indicates the sum of the foreground components $\Sigma_i Fi/v$ included in the designated pixel. The variables included in equation (11) are two factors, i.e., the mixture ratio α and the sum f of the foreground components.

Figure 49:
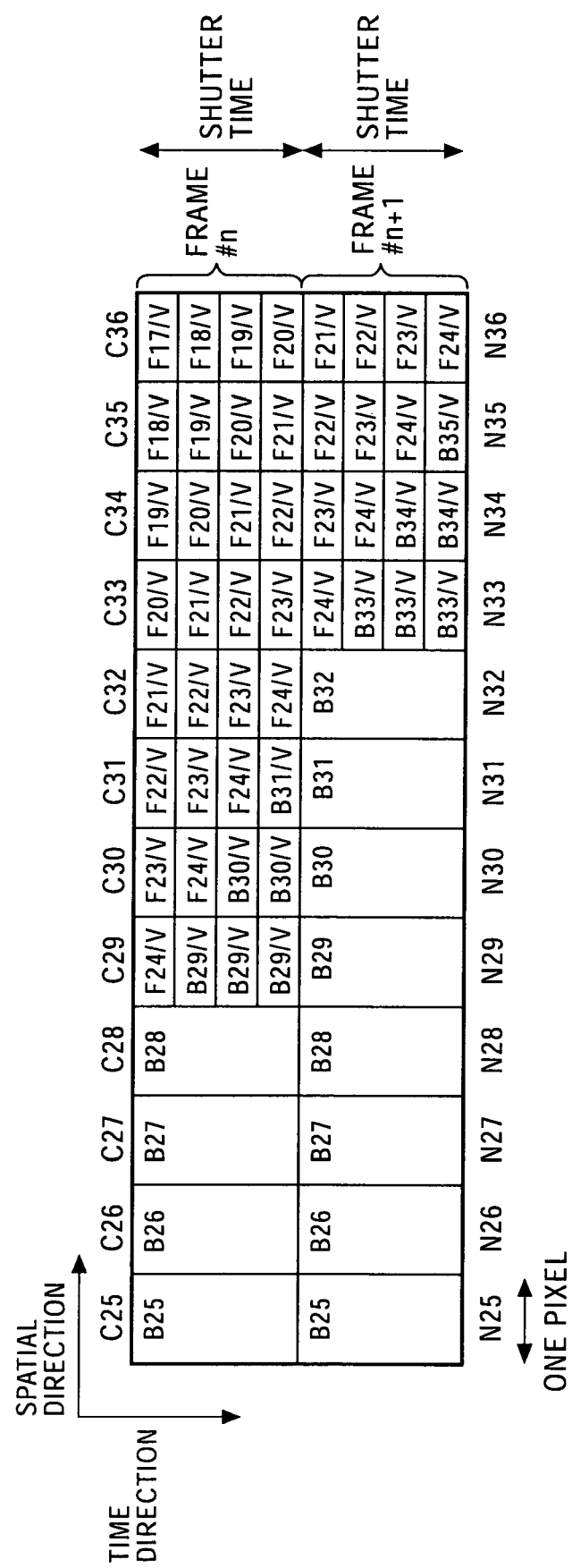
FIG. 49 illustrates a model in which pixel values are developed in the time direction and the period corresponding to the shutter time is divided.

Similarly, a model obtained by developing in the time direction the pixel values for which the amount v of movement within the shutter time is four and the virtual division number is four in the time direction in an uncovered background area is shown in FIG. 49.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio α can be represented by equation (12).

$$C=\alpha \cdot N+f \qquad (12)$$

The embodiment has been described, assuming that the background object is stationary. However, equations (8) through (12) can be applied to the case in which the background object is moving by using the pixel value of a pixel located corresponding to the amount v of movement within the shutter time of the background. It is now assumed, for example, in FIG. 48 that the amount v of movement within the shutter time of the object corresponding to the background is two, and the virtual division number is two. In this case, when the object corresponding to the background is moving to the right in the figure, the pixel value B of the pixel in the background area in equation (10) is represented by a pixel value P04.

Since equations (11) and (12) each include two variables, the mixture ratio α cannot be determined without modifying the equations.

The mixture ratio α linearly changes in accordance with a change in the position of the pixels, caused by the movement of the object corresponding to the foreground at a constant speed within the shutter time. By utilizing this characteristic, an equation in which the mixture ratio α and the sum f of the foreground components are approximated in the spatial direction is formulated. By utilizing a plurality of sets of the pixel values of the pixels belonging to the mixed area and the pixel values of the pixels belonging to the background area, the equation in which the mixture ratio α and the sum f of the foreground components are approximated is solved.

When the changes of the mixture ratio α are approximated by a straight line, the mixture ratio α can be expressed by equation (13).

$$\alpha = il + p \qquad (13)$$

In equation (13), i indicates the spatial index when the position of the designated pixel is set to 0, l designates the gradient of the straight line of the mixture ratio α, and p designates the intercept of the straight line of the mixture ratio α and also indicates the mixture ratio α of the designated pixel. In equation (13), the index i is known, but the gradient l and the intercept p are unknown.

Figure 50:
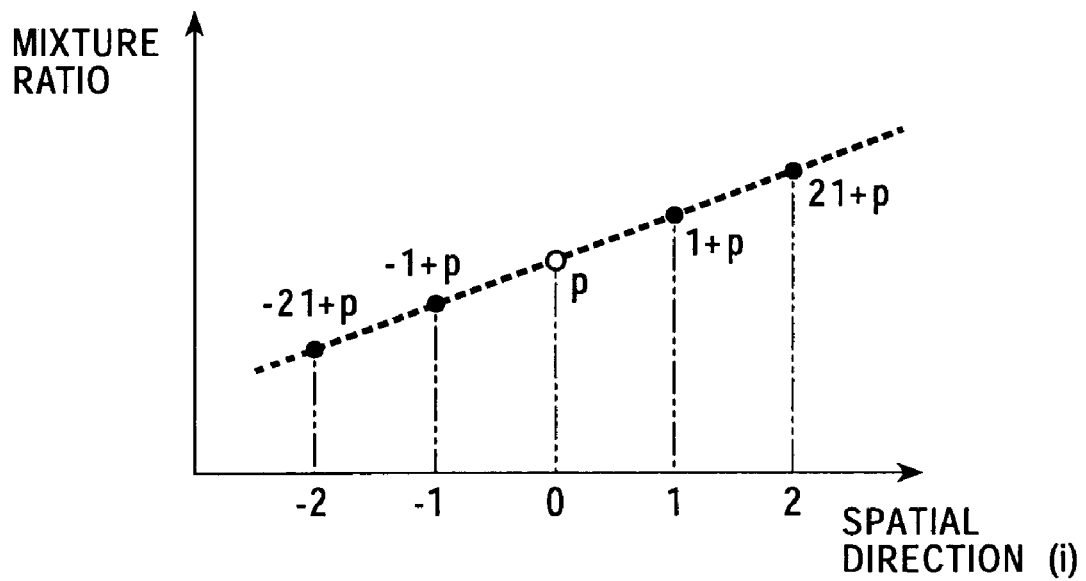
FIG. 50 illustrates a straight line for approximating the mixture ratio α.

The relationship among the index i, the gradient 1, and the intercept p is shown in FIG. 50. In FIG. 50, a white circle indicates the designated pixel, and black circles indicate pixels close to the designated pixel.

By approximating the mixture ratio α as equation (13), a plurality of different mixture ratios α for a plurality of pixels are expressed by two variables. In the example shown in FIG. 50, the five mixture ratios for five pixels are expressed by the two variables, i.e., the gradient l and the intercept p.

Figure 51:
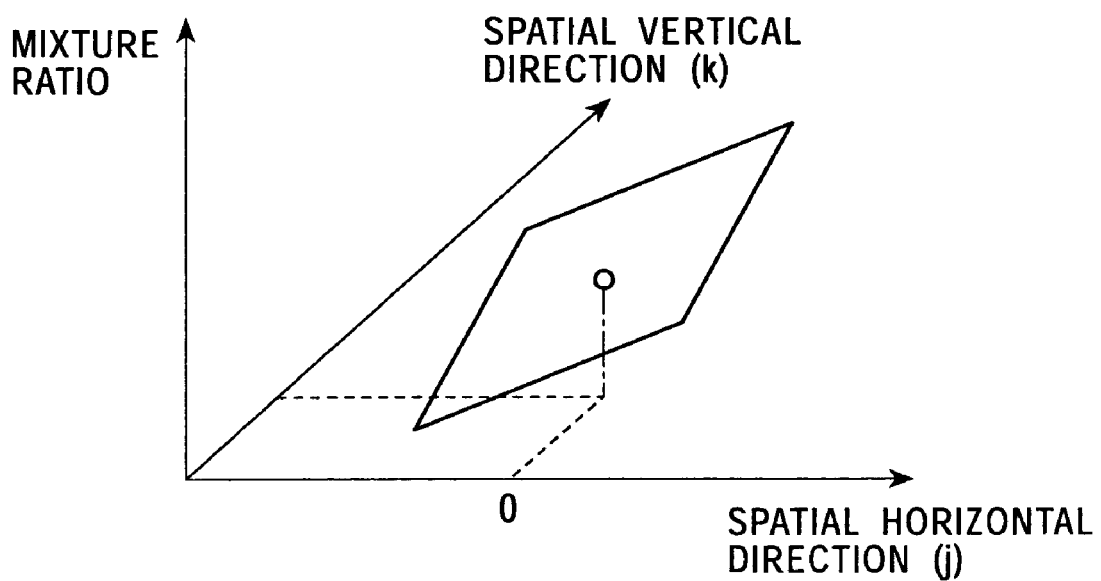
FIG. 51 illustrates a plane for approximating the mixture ratio α.

When the mixture ratio α is approximated by a plane shown in FIG. 51, equation (13) is expanded into the plane by considering the movement v corresponding to the two directions, i.e., the horizontal direction and the vertical direction of the image, and the mixture ratio α is expressed by equation (14). In FIG. 51, a white circle indicates the designated pixel.

$$\alpha = jm + kq + p \qquad (14)$$

In equation (14), j is an index in the horizontal direction and k is an index in the vertical direction when the position of the designated pixel is set to 0. In equation (14), m designates the horizontal gradient of the plane of the mixture ratio α, and q indicates the vertical gradient of the plane of the mixture ratio α. In equation (14), p indicates the intercept of the plane of the mixture ratio α.

For example, in frame #n shown in FIG. 48, equations (15) through (17) are satisfied for C05 through C07, respectively.

$$C05 = \alpha 05 \cdot B05/v + f05 \quad (15)$$

$$C06 = \alpha 06 \cdot B06/v + f06 \quad (16)$$

$$C07 = \alpha 07 \cdot B07/v + f07 \quad (17)$$

Assuming that the foreground components positioned in close proximity with each other are equal to each other, i.e., that F01 through F03 are equal, equation (18) holds true by replacing F01 through F03 by Fc.

$$f(x) = (1 - \alpha(x)) \cdot Fc \quad (18)$$

In equation (18), x indicates the position in the spatial direction.

When α(x) is replaced by equation (14), equation (18) can be expressed by equation (19).

$$\begin{aligned} f(x) &= (1 - (jm + kq + p)) \cdot Fc \\ &= j \cdot (-m \cdot Fc) + k \cdot (-q \cdot Fc) + ((1-p) \cdot Fc) \\ &= js + kt + u \end{aligned} \quad (19)$$

In equation (19), (−m·Fc), (−q·Fc), and (1−p)·Fc have been replaced, as expressed by equations (20) through (22), respectively.

$$s = -m \cdot Fc \quad (20)$$

$$t = -q \cdot Fc \quad (21)$$

$$u = (1-p) \cdot Fc \quad (22)$$

In equation (19), j is an index in the horizontal direction and k is an index in the vertical direction when the position of the designated pixel is set to 0.

As discussed above, since it can be assumed that the object corresponding to the foreground is moving at a constant speed within the shutter time, and that the foreground components positioned in close proximity with each other are the same, the sum of the foreground components is approximated by equation (19).

When the mixture ratio α is approximated by a straight line, the sum of the foreground components can be expressed by equation (23).

$$f(x) = is + u \quad (23)$$

By replacing the mixture ratio α and the sum of the foreground components in equation (13) by using equations (14) and (19), the pixel value M is expressed by equation (24).

$$\begin{aligned} M &= (jm + kq + p) \cdot B + js + kt + u \\ &= jB \cdot m + kB \cdot q + B \cdot p + j \cdot s + k \cdot t + u \end{aligned} \quad (24)$$

In equation (24), six variables are unknown, the horizontal gradient m of the plane of the mixture ratio α, the vertical gradient q of the plane of the mixture ratio α, and the intercepts, p, s, t, and u, of the plane of the mixture ratio α.

The mixture ratio α is calculated by setting the pixel value M or the pixel value B in the normal equation (24) in accordance with pixels located in the proximity to the designated pixel and by solving a plurality of normal equations in which the pixel value M or the pixel value B are set by the method of least squares.

It is now assumed, for example, that the horizontal index j of the designated pixel is set to 0, and the vertical index k of the designated pixel is set to 0. In this case, when the pixel value M or the pixel value B is set in the normal equation expressed by equation (24) for three-by-three pixels located in the proximity with the designated pixel, equations (25) through (33) are obtained.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \quad (25)$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \quad (26)$$

$$M_{+1,-1} = (+1) \cdot B_{+1,-1} \cdot m + (-1) \cdot B_{+1,-1} \cdot q + B_{+1,-1} \cdot p + (+1) \cdot s + (-1) \cdot t + u \quad (27)$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \quad (28)$$

$$M_{0,0} = (0) \cdot B_{0,0} \cdot m + (0) \cdot B_{0,0} \cdot q + B_{0,0} \cdot p + (0) \cdot s + (0) \cdot t + u \quad (29)$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \quad (30)$$

$$M_{-1,+1} = (-1) \cdot B_{-1,+1} \cdot m + (+1) \cdot B_{-1,+1} \cdot q + B_{-1,+1} \cdot p + (-1) \cdot s + (+1) \cdot t + u \quad (31)$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \quad (32)$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \quad (33)$$

Since the horizontal index j of the designated pixel is 0, and the vertical index k of the designated pixel is 0, the mixture ratio α of the designated pixel is equal to the value obtained when j is 0 and k is 0 in equation (14), i.e., the mixture ratio α is equal to the intercept p in equation (14).

Accordingly, based on nine equations (25) to (33), the horizontal gradient m, the vertical gradient q, and the intercepts p, s, t, and u are calculated by the method of least squares, and the intercept p is output as the mixture ratio α.

A specific procedure for calculating the mixture ratio α by applying the method of least squares is as follows.

When the index i and the index k are expressed by a single index x, the relationship among the index i, the index k, and the index x is expressed by equation (34).

$$x = (j+1) \cdot 3 + (k+1) \quad (34)$$

It is now assumed that the horizontal gradient m, the vertical gradient q, and the intercepts p, s, t, and u are expressed by variables w0, w1, w2, w3, w4, and w5, respectively, and jB, kB, B, j, k and l are expressed by a0, a1, a2, a3, a4, and a5, respectively. In consideration of an error ex, equations (25) through (23) can be modified into equation (35).

$$M_x = \sum_{y=0}^{5} a_y \cdot w_y + e_x \quad (35)$$

In equation (35), x is any one of the integers from 0 to 8.

Equation (36) can be found from equation (35).

$$e_x = M_x - \sum_{y=0}^{5} a_y \cdot w_y \qquad (36)$$

Since the method of least squares is applied, the square sum E of the error is defined as follows, as expressed by equation (37).

$$E = \sum_{x=0}^{8} e_x^2 \qquad (37)$$

In order to minimize the error, the partial differential value of the variable Wv with respect to the square sum E of the error should be 0. v is any one of the integers from 0 to 5. Thus, wy is determined so that equation (38) is satisfied.

$$\frac{\partial E}{\partial w_v} = 2 \cdot \sum_{x=0}^{8} e_x \cdot \frac{\partial e_x}{\partial w_v} \qquad (38)$$

$$= 2 \cdot \sum_{x=0}^{8} e_x \cdot a_v = 0$$

By substituting equation (36) into equation (38), equation (39) is obtained.

$$\sum_{x=0}^{8} \left( a_v \cdot \sum_{y=0}^{5} a_y \cdot w_y \right) = \sum_{x=0}^{8} a_v \cdot M_x \qquad (39)$$

For example, the sweep-out method (Gauss-Jordan elimination) is applied to six equations obtained by substituting one of the integers from 0 to 5 into v in equation (39), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

The description has been given with reference to equations (25) through (33), by assuming that the pixel value of the pixel included in the mixed area is M, and the pixel value of the pixel included in the background area is B. It is necessary to set normal equations for each of cases where the designated pixel is included in the covered background area, or the designated pixel is included in the uncovered background area.

For example, if the mixture ratio α of the pixel included in the covered background area in frame #n shown in FIG. 48 is determined, C04 through C08 of the pixels in frame #n and the pixel values P04 through P08 of pixels in frame #n−1 are set in the normal equations.

If the mixture ratio α of the pixels included in the uncovered background area in frame #n shown in FIG. 49 is determined, C28 through C32 of the pixels in frame #n and the pixel values N28 through N32 of pixels in frame #n+1 are set in the normal equations.

Figure 52:
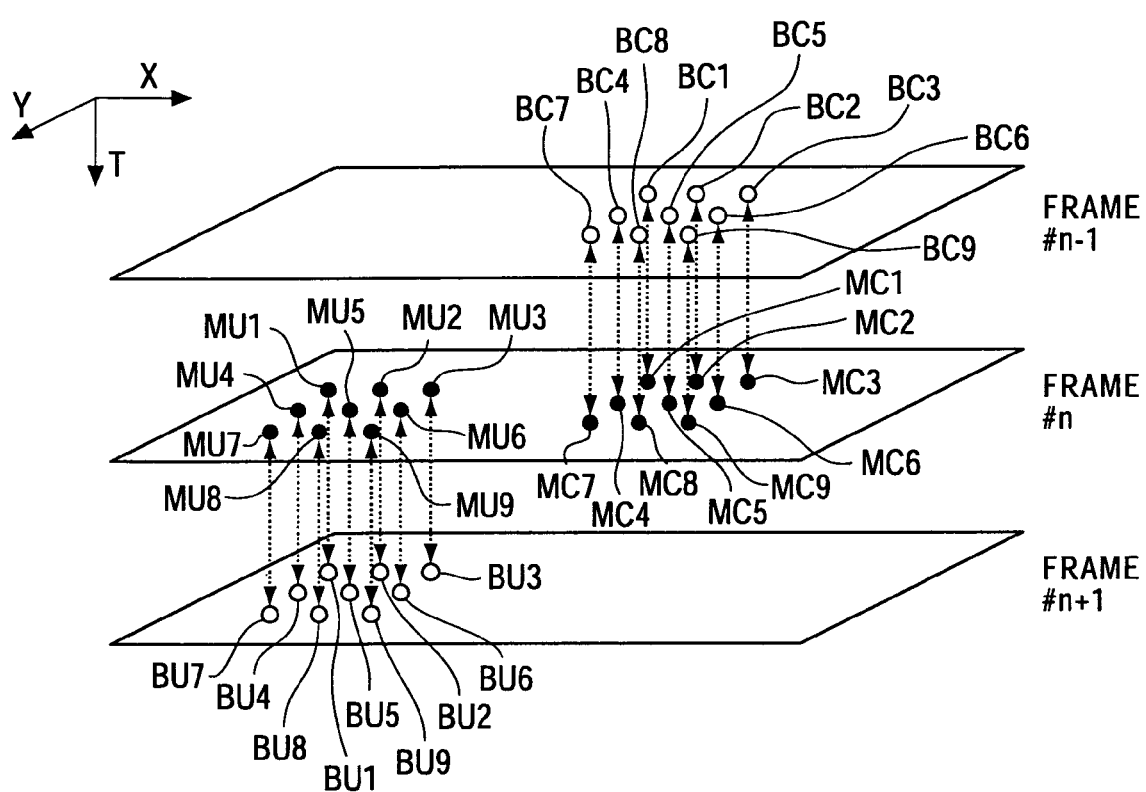
FIG. 52 illustrates the relationships of pixels in a plurality of frames when the mixture ratio α is calculated.

Moreover, if, for example, the mixture ratio α of the pixel included in the covered background area shown in FIG. 52 is calculated, the following equations (40) through (48) are set. In FIG. 52, white circles indicate pixels regarded as the background, and black circles indicate pixels regarded as those in the mixed area. The pixel value of the pixel for which the mixture ratio α is calculated is Mc5.

$$Mc1 = (-1) \cdot Bc1 \cdot m + (-1) \cdot Bc1 \cdot q + Bc1 \cdot p + (-1) \cdot s + (-1) \cdot t + u \qquad (40)$$

$$Mc2 = (0) \cdot Bc2 \cdot m + (-1) \cdot Bc2 \cdot q + Bc2 \cdot p + (0) \cdot s + (-1) \cdot t + u \qquad (41)$$

$$Mc3 = (+1) \cdot Bc3 \cdot m + (-1) \cdot Bc3 \cdot q + Bc3 \cdot p + (+1) \cdot s + (-1) \cdot t + u \qquad (42)$$

$$Mc4 = (-1) \cdot Bc4 \cdot m + (0) \cdot Bc4 \cdot q + Bc4 \cdot p + (-1) \cdot s + (0) \cdot t + u \qquad (43)$$

$$Mc5 = (0) \cdot Bc5 \cdot m + (0) \cdot Bc5 \cdot q + Bc5 \cdot p + (0) \cdot s + (0) \cdot t + u \qquad (44)$$

$$Mc6 = (+1) \cdot Bc6 \cdot m + (0) \cdot Bc6 \cdot q + Bc6 \cdot p + (+1) \cdot s + (0) \cdot t + u \qquad (45)$$

$$Mc7 = (-1) \cdot Bc7 \cdot m + (+1) \cdot Bc7 \cdot q + Bc7 \cdot p + (-1) \cdot s + (+1) \cdot t + u \qquad (46)$$

$$Mc8 = (0) \cdot Bc8 \cdot m + (+1) \cdot Bc8 \cdot q + Bc8 \cdot p + (0) \cdot s + (+1) \cdot t + u \qquad (47)$$

$$Mc9 = (+1) \cdot Bc9 \cdot m + (+1) \cdot Bc9 \cdot q + Bc9 \cdot p + (+1) \cdot s + (+1) \cdot t + u \qquad (48)$$

For calculating the mixture ratio α of the pixel included in the covered background area in frame #n, the pixel values Bc1 through Bc9 of pixels in the background area of the pixel in frame #n−1 corresponding to the pixel in frame #n for which the mixture ratio is to be calculated are used in equations (40) through (48).

When, for example, the mixture ratio α of a pixel included in the uncovered background area shown in FIG. 52 is calculated, the following equations (49) through (57) are set. The pixel value of the pixel for which the mixture ratio α is calculated is Mu5.

$$Mu1 = (-1) \cdot Bu1 \cdot m + (-1) \cdot Bu1 \cdot q + Bu1 \cdot p + (-1) \cdot s + (-1) \cdot t + u \qquad (49)$$

$$Mu2 = (0) \cdot Bu2 \cdot m + (-1) \cdot Bu2 \cdot q + Bu2 \cdot p + (0) \cdot s + (-1) \cdot t + u \qquad (50)$$

$$Mu3 = (+1) \cdot Bu3 \cdot m + (-1) \cdot Bu3 \cdot q + Bu3 \cdot p + (+1) \cdot s + (-1) \cdot t + u \qquad (51)$$

$$Mu4 = (-1) \cdot Bu4 \cdot m + (0) \cdot Bu4 \cdot q + Bu4 \cdot p + (-1) \cdot s + (0) \cdot t + u \qquad (52)$$

$$Mu5 = (0) \cdot Bu5 \cdot m + (0) \cdot Bu5 \cdot q + Bu5 \cdot p + (0) \cdot s + (0) \cdot t + u \qquad (53)$$

$$Mu6 = (+1) \cdot Bu6 \cdot m + (0) \cdot Bu6 \cdot q + Bu6 \cdot p + (+1) \cdot s + (0) \cdot t + u \qquad (54)$$

$$Mu7 = (-1) \cdot Bu7 \cdot m + (+1) \cdot Bu7 \cdot q + Bu7 \cdot p + (-1) \cdot s + (+1) \cdot t + u \qquad (55)$$

$$Mu8 = (0) \cdot Bu8 \cdot m + (+1) \cdot Bu8 \cdot q + Bu8 \cdot p + (0) \cdot s + (+1) \cdot t + u \qquad (56)$$

$$Mu9 = (+1) \cdot Bu9 \cdot m + (+1) \cdot Bu9 \cdot q + Bu9 \cdot p + (+1) \cdot s + (+1) \cdot t + u \qquad (57)$$

For calculating the mixture ratio α of the pixel included in the uncovered background area in frame #n, the pixel values Bu1 through Bu9 of pixels of the background area of the pixel in frame #n+1 corresponding to the pixel in frame #n for which the mixture ratio is to be calculated are used in equations (49) through (57).

Figure 53:
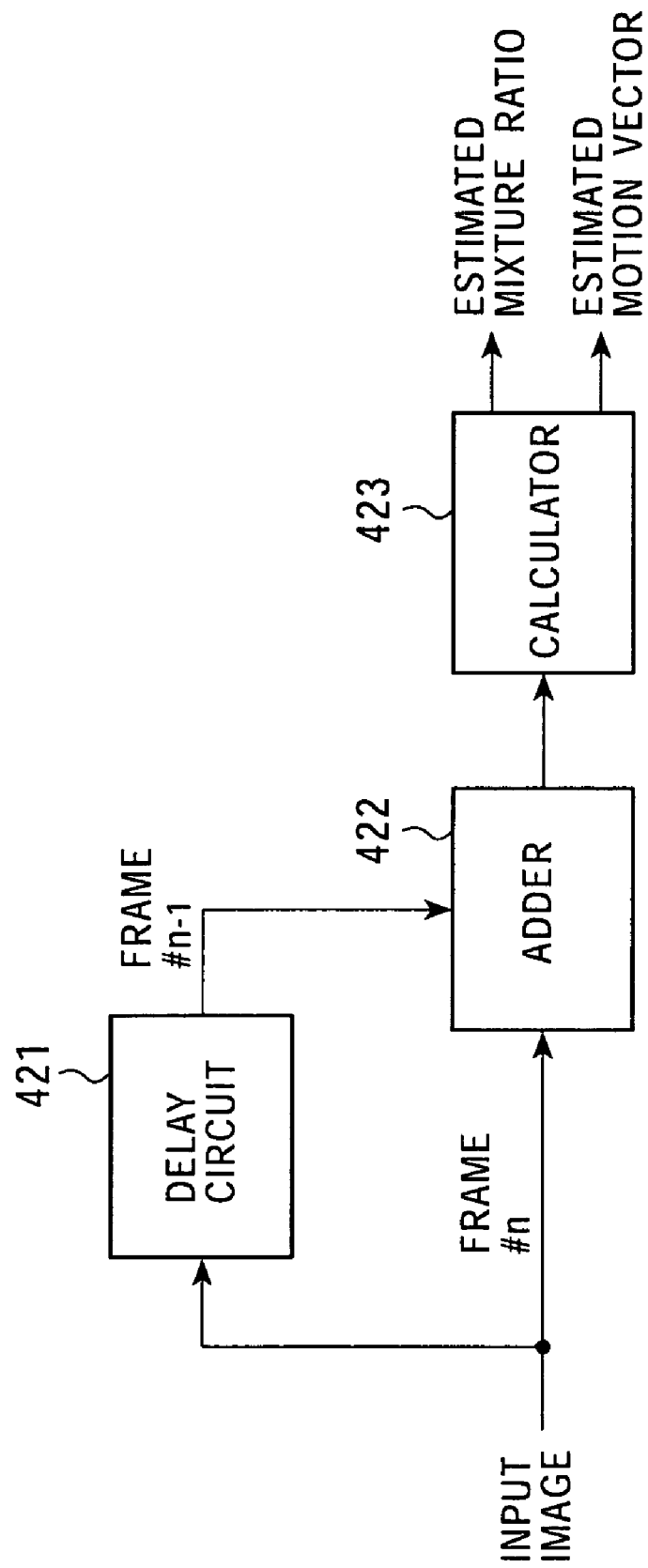
FIG. 53 is a block diagram illustrating the configuration of a mixture-ratio estimation processor 401.

FIG. 53 is a block diagram illustrating the configuration of the estimated-mixture-ratio processor 401. An image input into the estimated-mixture-ratio processor 401 is sent to a delay circuit 421 and an adder 422.

The delay circuit 421 delays the input image for one frame, and sends the image to the adder 422. When frame #n is sent as the input image to the adder 422, the delay circuit 421 sends frame #n−1 to the adder 422.

The adder 422 sets the pixel value of the pixel adjacent to the pixel for which the mixture ratio α is calculated, and the pixel value of frame #n−1 in the normal equation. For example, the adder 422 sets the pixel values Mc1 through Mc9 and the pixel values Bc1 through Bc9 in the normal equations based on equations (40) through (48), respectively. The adder 422 sends the normal equations in which the pixel values are set to a calculator 423.

The calculator 423 determines the estimated mixture ratio by solving the normal equations sent from the adder 422, by the sweep-out method or other methods, and outputs the determined estimated mixture ratio.

The calculator 423 calculates movement v within the shutter time according to the gradient a of the mixture ratio by using equation (58).

$$a=1/v \qquad (58)$$

More specifically, the calculator 423 calculates movement vix within the shutter time in the x direction and movement viy within the shutter time in the y direction according to the gradient m in the horizontal direction of the plane of the mixture ratio and the gradient q in the vertical direction of the plane of the mixture ratio, both indicated in equation (24).

$$vix=1/m \qquad (59)$$

$$viy=1/q \qquad (60)$$

The calculator 423 outputs an estimated motion vector indicated by the movement vix within the shutter time in the x direction and the movement viy within the shutter time in the y direction.

Figure 54:
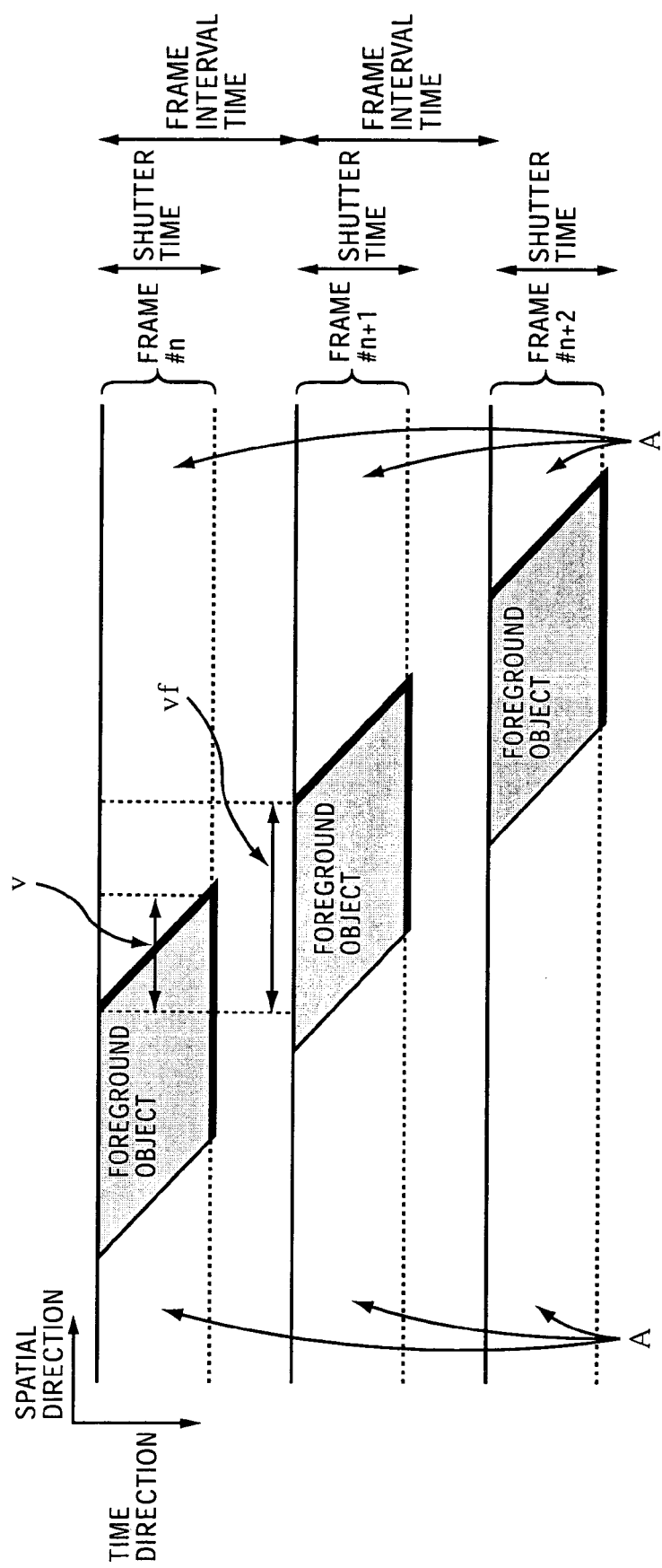
FIG. 54 illustrates a motion vector output from a mixture-ratio determining portion 403.

As shown in FIG. 54, the magnitude of the estimated motion vector output from the calculator 423 corresponds to the movement v within the shutter time.

The amount vf of interframe movement indicates the movement of an object between two adjacent frames. When the image of the object corresponding to the foreground is moving such that the image is displayed at a position eight pixels apart between a certain frame and the next frame, for example, the amount vf of interframe movement of the image of the object corresponding to the foreground is eight. In FIG. 54, A indicates background objects.

In this way, the estimated-mixture-ratio processor 401 calculates the estimated mixture ration and the estimated motion vector according to the input image, and sends them to the mixture-ratio determining portion 403.

Since the estimated-mixture-ratio processor 402 has the same structure as the estimated-mixture-ratio processor 401, a description thereof is omitted.

Figure 55:
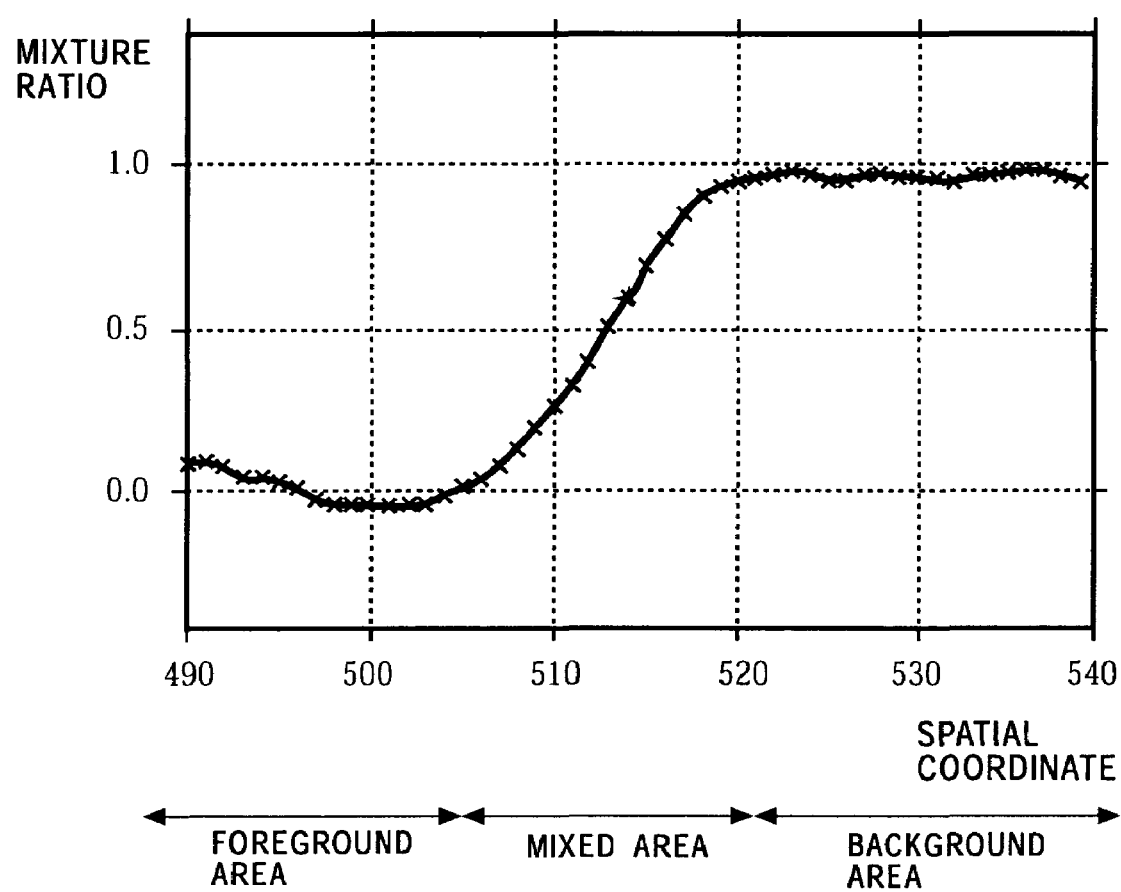
FIG. 55 illustrates an example estimated mixture ratio.

FIG. 55 is a view showing example estimated mixture ratios calculated by the estimated-mixture-ratio processor 401. The estimated mixture ratios shown in FIG. 55 are for one line, calculated by formulating and solving equations in units of seven-by-seven pixel blocks when the movement v of the foreground corresponding to an object moving at an equal speed is eleven.

Figure 61:
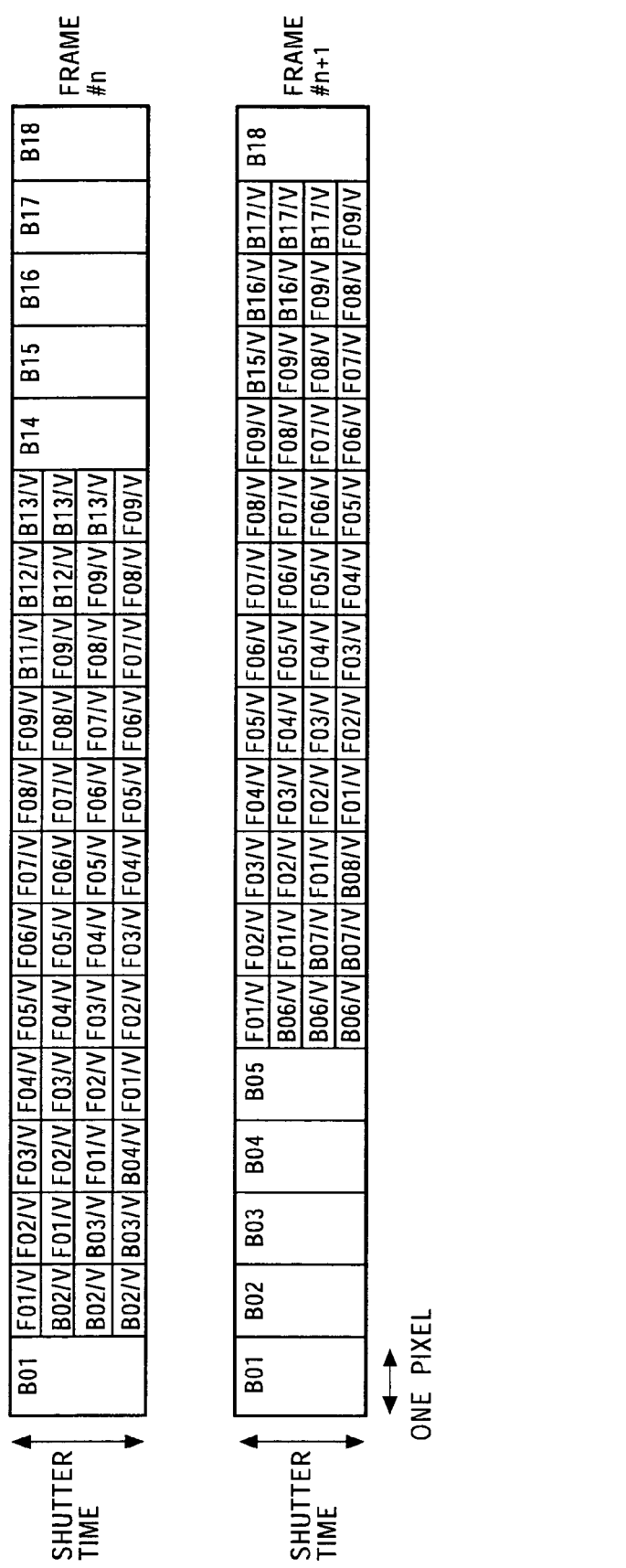
FIG. 61 illustrates a model in which pixel values are developed in the time direction and the period corresponding to the shutter time is divided.

As shown in FIG. 61, it is understood that the estimated mixture ratios are changed almost linearly in a mixed area.

Figure 56:
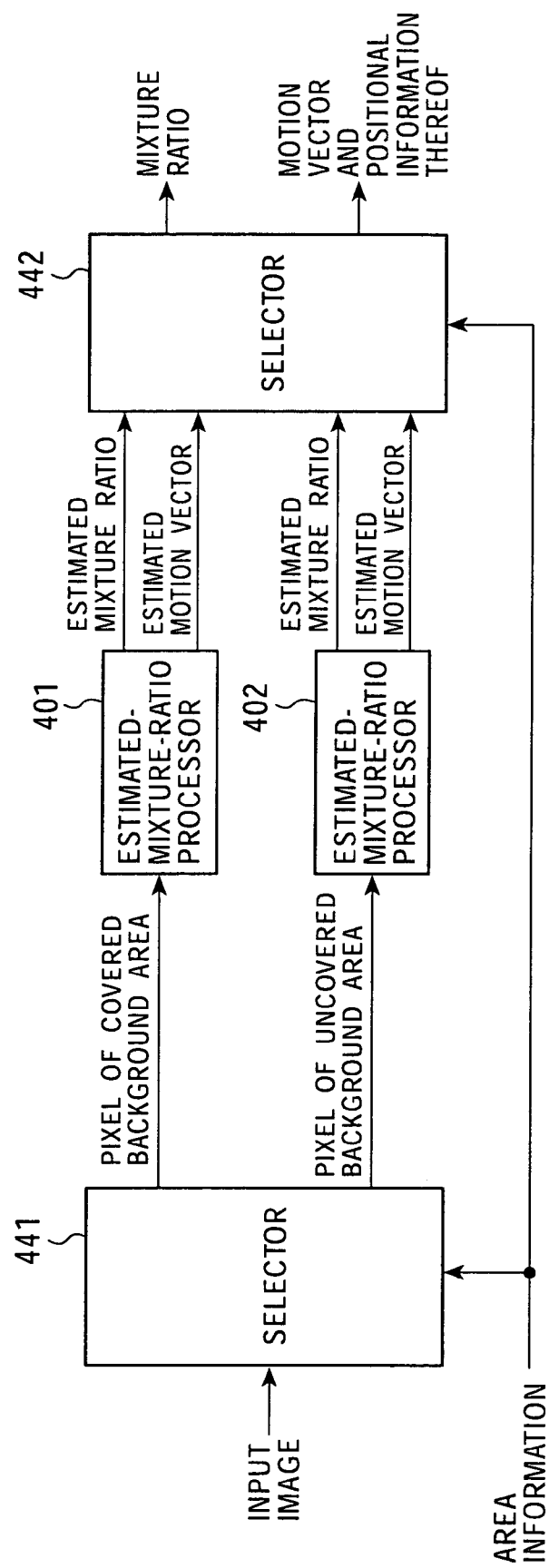
FIG. 56 is a block diagram illustrating another structure of the mixture-ratio calculator 102.

FIG. 56 is a block diagram illustrating another configuration of the mixture-ratio calculator 102.

The same portions as those shown in FIG. 46 are indicated by the same reference numerals, and an explanation thereof is omitted.

A selector 441 sends a pixel belonging to the covered background area and the corresponding pixels in the previous and following frames to the estimated-mixture-ratio processor 401 based on the area information sent from the area specifying unit 101. The selector 441 sends a pixel belonging to the uncovered background area and the corresponding pixels in the previous and following frames to the estimated-mixture-ratio processor 402 based on the area information sent from the area specifying unit 101.

The estimated-mixture-ratio processor 401 calculates an estimated mixture ratio for a designated pixel which belongs to the covered background area according to the pixel values input from the selector 441, and sends the calculated estimated mixture ratio to a selector 442. The estimated-mixture-ratio processor 401 calculates an estimated motion vector according to the calculated estimated mixture ratio, and sends the calculated estimated motion vector to the selector 442.

The estimated-mixture-ratio processor 402 calculates an estimated mixture ratio for a designated pixel which belongs to the uncovered background area according to the pixel values input from the selector 441, and sends the calculated estimated mixture ratio to the selector 442. The estimated-mixture-ratio processor 402 calculates an estimated motion vector according to the calculated estimated mixture ratio, and sends the calculated estimated motion vector to the selector 442.

Based on the area information sent from the area specifying unit 101, the selector 442 selects an estimated mixture ratio of 0 and sets the mixture ratio α to 0 when the designated pixel belongs to the foreground area, and selects an estimated mixture ratio of 1 and sets the mixture ratio α to 1 when the designated pixel belongs to the background area. When the designated pixel belongs to the covered background area, the selector 442 selects the estimated mixture ratio sent from the estimated-mixture-ratio processor 442 and sets it as the mixture ratio α. When the designated pixel belongs to the uncovered background area, the selector 442 selects the estimated mixture ratio sent from the estimated-mixture-ratio processor 443 and sets it as the mixture ratio α. The selector 442 then outputs the mixture ratio α which has been selected and set based on the area information.

Based on the area information sent from the area specifying unit 101, when the designated pixel belongs to the covered background area, the selector 442 selects the estimated motion vector sent from the estimated-mixture-ratio processor 401 and sets it as the motion vector. When the designated pixel belongs to the uncovered background area, the selector 442 selects the estimated motion vector sent from the estimated-mixture-ratio processor 402 and sets it as the motion vector. The selector 442 then outputs the motion vector which has been selected and set based on the area information.

As discussed above, the mixture-ratio calculator 102 calculates the mixture ratio α for each pixel included in the image, calculates the motion vector, and outputs the calculated mixture ratio α and the calculated motion vector.

Figure 57:
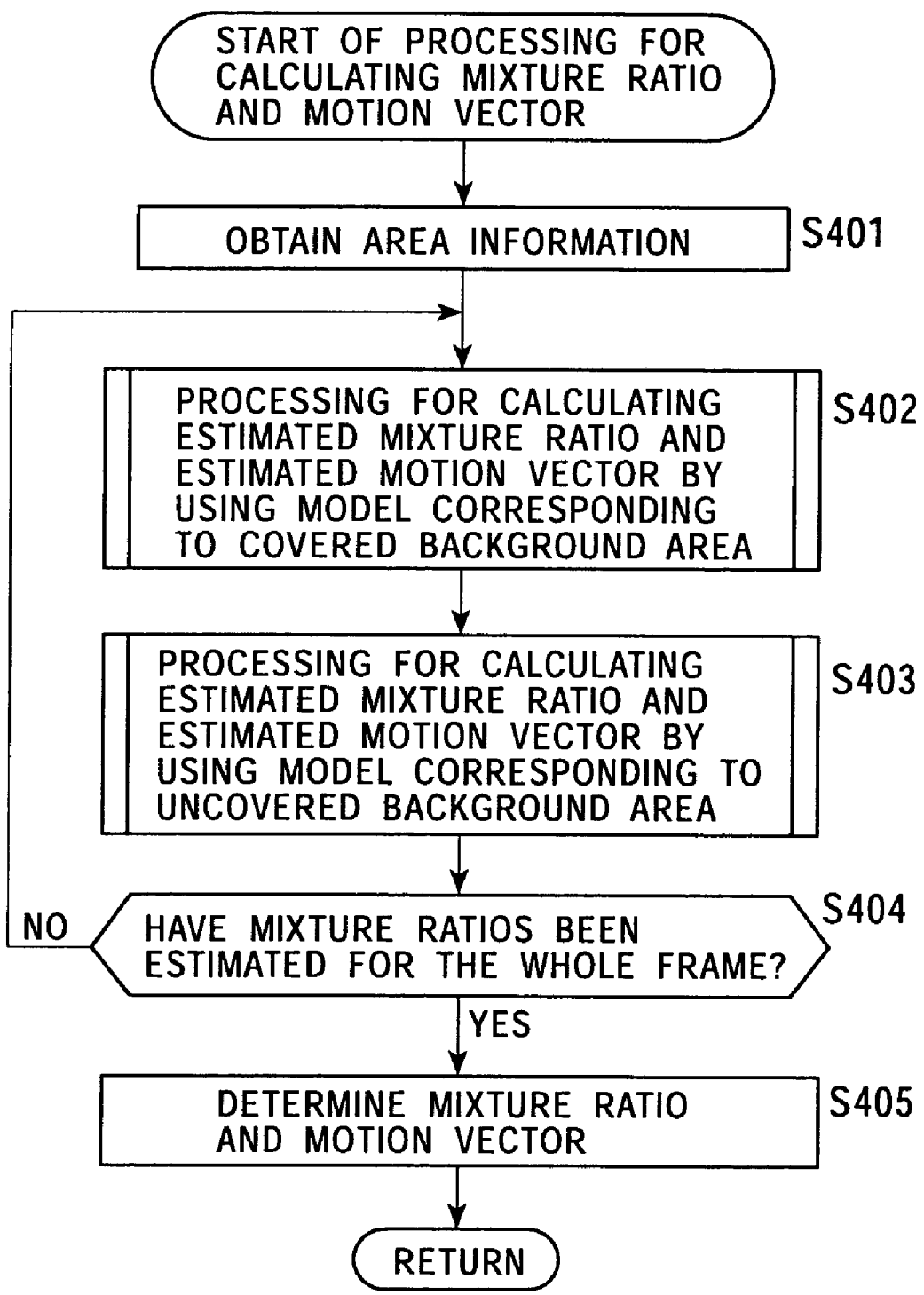
FIG. 57 is a flowchart illustrating processing for calculating a mixture ratio and a motion vector.

Processing for calculating the mixture ratio α and motion vector performed by the mixture-ratio calculator 102 will be described below with reference to a flowchart shown in FIG. 57. In step S401, the mixture-ratio calculator 102 obtains area information sent from the area specifying unit 101. In step S402, the estimated-mixture-ratio processor 401 calculates an estimated mixture ratio and an estimated motion vector by using a model corresponding to a covered background area, and sends the calculated estimated mixture ratio the calculated estimated motion vector to the mixture-ratio determining portion 403. Details of the processing for estimating the mixture ratio are discussed later with reference to a flowchart shown in FIG. 58.

In step S403, the estimated-mixture-ratio processor 402 calculates an estimated mixture ratio and an estimated motion vector by using a model corresponding to an uncovered background area, and sends the calculated estimated mixture ratio and the calculated estimated motion vector to the mixture-ratio determining portion 403.

In step S404, the mixture-ratio calculator 102 determines whether the mixture ratios α have been estimated for the whole frame. If it is determined that the mixture ratios α have not yet been estimated for the whole frame, the process returns to step S402, and the processing for estimating the mixture ratio α for the subsequent pixel is executed.

If it is determined in step S404 that the mixture ratios α have been estimated for the whole frame, the process proceeds to step S405. In step S405, the mixture-ratio determining portion 403 determines the mixture ratio α and the motion vector according to the area information sent from the area specifying unit 101 and indicating to which of the foreground area, the background area, the covered background area, or the uncovered background area the pixel for which the mixture ratio α and the motion vector are to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the estimated mixture ratio sent from the estimated-mixture-ratio processor 401 as the mixture ratio α. When the corresponding pixel belongs to the uncovered background area, the mixture-ratio determining portion 403 sets the estimated mixture ratio sent from the estimated-mixture-ratio processor 402 as the mixture ratio α.

Based on the area information sent from the area specifying unit 101, when the designated pixel belongs to the covered background area, the mixture-ratio determining portion 403 selects the estimated motion vector sent from the estimated-mixture-ratio processor 401 and sets it as the motion vector. When the designated pixel belongs to the uncovered background area, the mixture-ratio determining portion 403 selects the estimated motion vector sent from the estimated-mixture-ratio processor 402 and sets it as the motion vector. The processing is terminated.

As discussed above, the mixture-ratio calculator 102 calculates the mixture ratio α and the motion vector, which are feature quantities corresponding to each pixel, based on the area information sent from the area specifying unit 101, and the input image.

The processing for calculating the mixture ratio α performed by the mixture-ratio calculator 102 configured as shown in FIG. 56 is similar to that discussed with reference to the flowchart of FIG. 57, and an explanation thereof is thus omitted.

Figure 58:
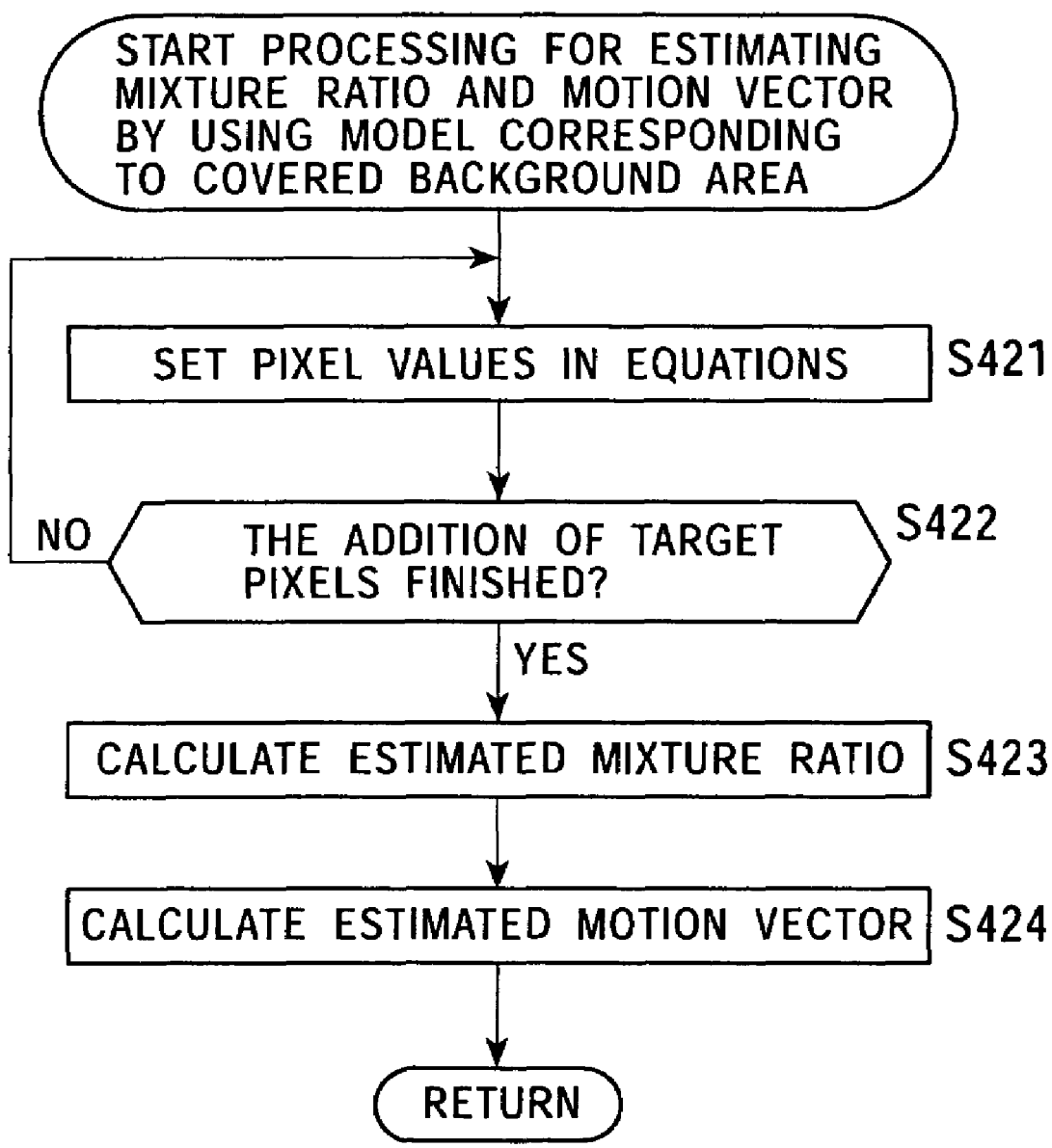
FIG. 58 is a flowchart illustrating processing for estimating a mixture ratio and a motion vector by using a model corresponding to a covered background area.

A description is now given, with reference to a flowchart shown in FIG. 58, of mixture-ratio and motion-vector estimating processing performed by the estimated-mixture-ratio processor 401 by using a model corresponding to the covered background area, the processing corresponding to the process of step S402.

In step S421, the adder 422 sets the pixel value included in the input image and the pixel value included in the image sent from the delay circuit 421 in a normal equation corresponding to a model of the covered background area.

In step S422, the estimated-mixture-ratio processor 401 determines whether the setting of the target pixels is finished. If it is determined that the setting of the target pixels is not finished, the processing returns to step S421, and the process for setting the pixel values in the normal equation is repeated.

If it is determined in step S422 that the setting for the target pixels is finished, the processing proceeds to step S423. In step S423, a calculator 423 calculates the estimated mixture ratio based on the normal equations in which the pixels values are set, and outputs the calculated mixture ratio.

In step S424, the calculator 423 calculates an estimated motion vector according to the gradient of the obtained estimated mixture ratio, and the processing is terminated.

As discussed above, the estimated-mixture-ratio processor 401 having the configuration shown in FIG. 53 calculates the estimated mixture ratio and the estimated motion vector based on the input image.

Mixture-ratio and motion-vector estimating processing by using a model corresponding to the uncovered background area is similar to the processing indicated by the flowchart of FIG. 58, which uses the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area includes motion. For example, if the image corresponding to the background area is uniformly moving, the estimated-mixture-ratio processor 401 shifts the overall image in accordance with this motion, and performs processing in a manner similar to the case in which the object corresponding to the background is stationary. If the image corresponding to the background area includes locally different motions, the estimated-mixture-ratio processor 401 selects the pixels corresponding to the motions as the pixels belonging to the mixed area, and executes the above-described processing.

The mixture-ratio calculator 102 may execute only the mixture-ratio estimating processing on all the pixels by using a model corresponding to the covered background area, and outputs the calculated estimated mixture ratio as the mixture ratio α. In this case, the mixture ratio α indicates the ratio of the background components for the pixels belonging to the covered background area, and indicates the ratio of the foreground components for the pixels belonging to the uncovered background area. Concerning the pixels belonging to the uncovered background area, when the absolute value of the difference between the calculated mixture ratio α and 1 is determined and the calculated absolute value is set as the mixture ratio α, the image processing apparatus can determine the mixture ratio α indicating the ratio of the background components for the pixels belonging to the uncovered background area.

Similarly, the mixture-ratio processor 102 may execute only the mixture-ratio estimating processing on all the pixels by using a model corresponding to the uncovered background area, and outputs the calculated estimated mixture ratio as the mixture ratio α.

As described above, the mixture-ratio processor 102 calculates the mixture ratio α and the motion vector, which area feature quantities for each pixel, according to the area information sent from the area specifying unit 101 and the input image.

With the user of the mixture ratio α calculated by the mixture-ratio processor 102, foreground components and background components can be separated in a pixel value while motion-blur information included in an object corresponding to a moving object is left.

An image which includes correct motion blur matching the speed of a moving object can be synthesized according to the motion ratios α as if the real world were actually captured.

The motion vector calculated by the mixture-ratio processor 102 indicates the amount v of movement within the shutter time, which conventionally could not be detected.

With the use of the motion vector calculated by the mixture-ratio processor 102, the amount of motion blur included in an image corresponding to a moving object can be adjusted.

The mixture-ratio processor 102 may set the motion vector to an estimated vector corresponding to an estimated mixture ratio of 0 to 1, both excluding. In this case, the mixture-ratio processor 102 can generate the motion vector without using the area information.

Figure 59:
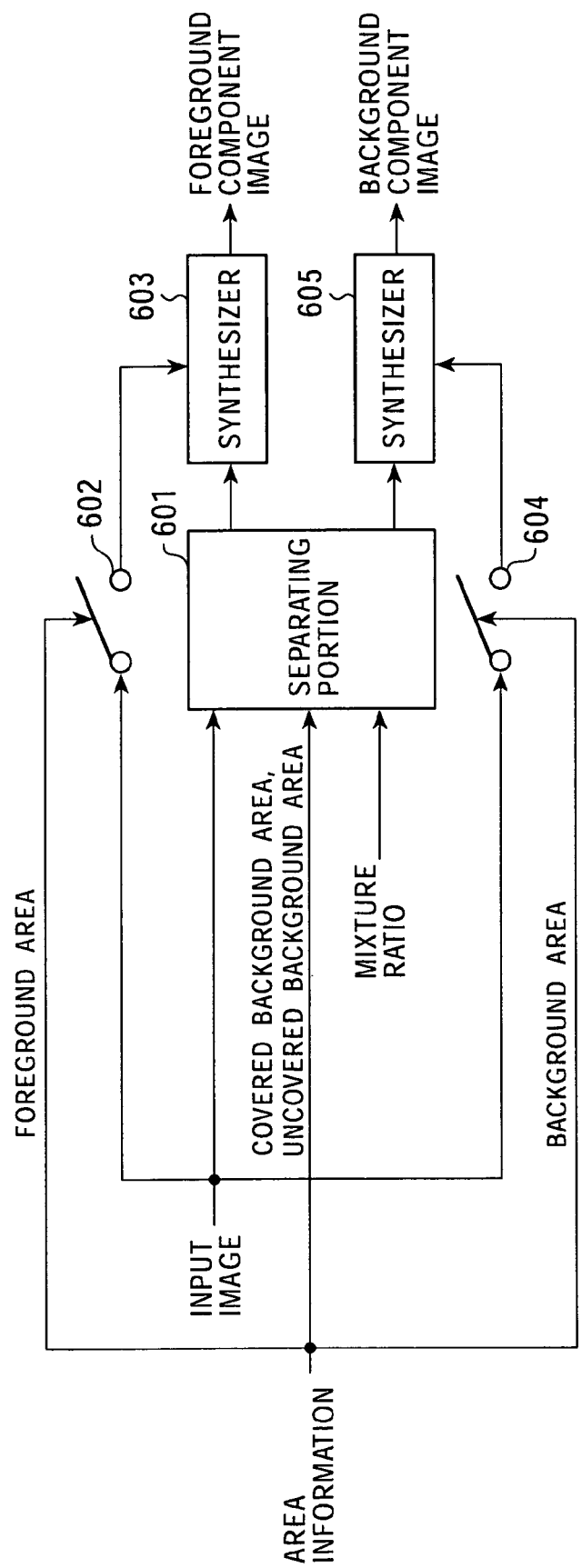
FIG. 59 is a block diagram illustrating an example of the configuration of a foreground/background separator 103.

The foreground/background separator 103 is discussed below. FIG. 59 is a block diagram illustrating an example of the configuration of the foreground/background separator 103. The input image sent to the foreground/background separator 103 is sent to a separating portion 601, a switch 602, and a switch 604. The area information sent from the area specifying unit 101 and indicating the information of the covered background area and the uncovered background area is sent to the separating portion 601. The area information indicating the foreground area is sent to the switch 602. The area information indicating the background area sent to the switch 604.

The mixture ratio α sent from the mixture-ratio calculator 102 is sent to the separating portion 601.

The separating portion 601 separates the foreground components from the input image based on the area information indicating the covered background area, the area information indicating the uncovered background area, and the mixture ratio α, and sends the separated foreground components to a synthesizer 603. The separating portion 601 also separates the background components from the input image, and sends the separated background components to a synthesizer 605.

The switch 602 is closed when a pixel corresponding to the foreground is input based on the area information indicating the foreground area, and sends only the pixels corresponding to the foreground included in the input image to the synthesizer 603.

The switch 604 is closed when a pixel corresponding to the background is input based on the area information indicating the background area, and sends only the pixels corresponding to the background included in the input image to the synthesizer 605.

The synthesizer 603 synthesizes a foreground component image based on the foreground components sent from the separating portion 601 and the pixels corresponding to the foreground sent from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components sent from the separating portion 601 and the pixels corresponding to the background sent from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 60B:
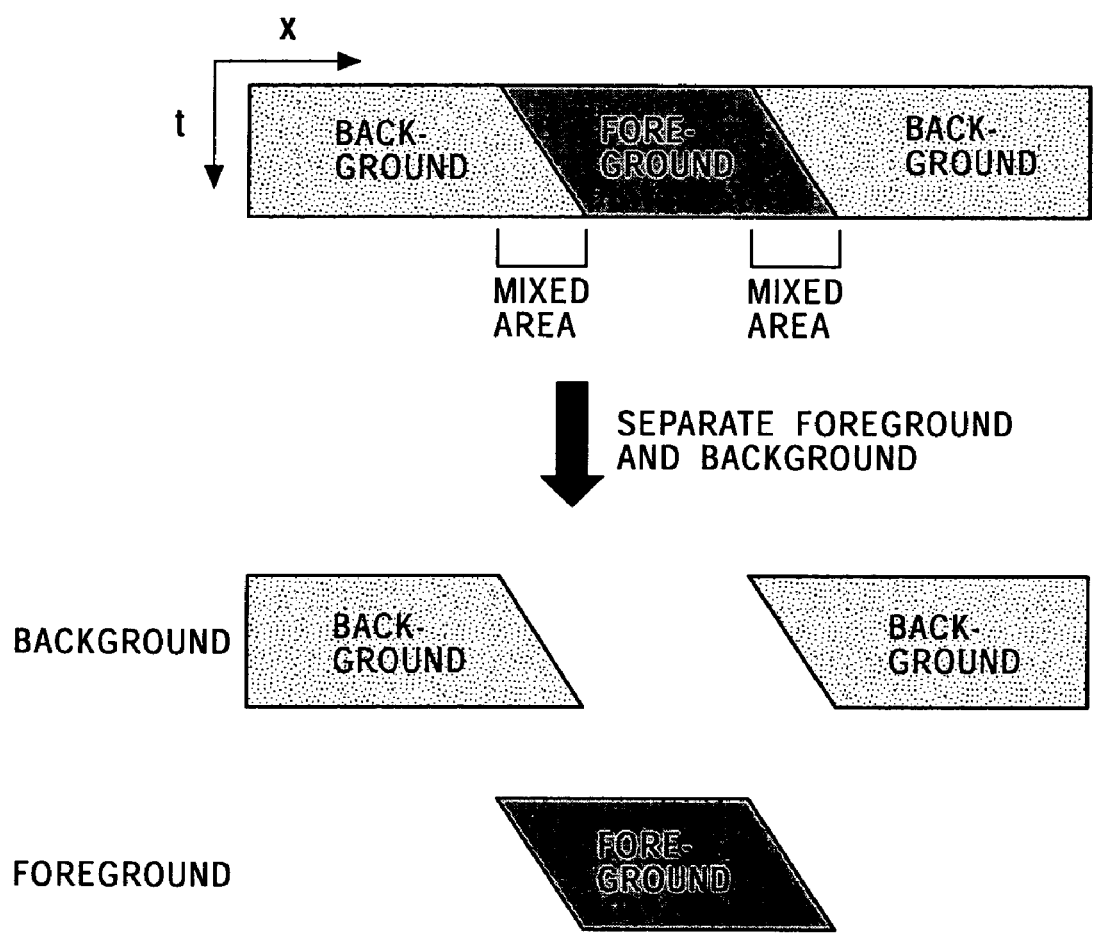
FIG. 60B illustrates a model of an input image, a foreground component image, and a background component image.

FIG. 60A illustrates the input image input into the foreground/background separator 103 and the foreground component image and the background component image output from the foreground/background separator 103. FIG. 60B illustrates a model corresponding to the input image input into the foreground/background separator 103 and the foreground component image and the background component image output from the foreground/background separator 103.

FIG. 60A is a schematic diagram illustrating the image to be displayed, and FIG. 60B illustrates a model obtained by developing in the time direction the pixels disposed in one line including the pixels belonging to the foreground area, the pixels belonging to the background area, and the pixels belonging to the mixed area corresponding to FIG. 73A.

As shown in FIGS. 60A and 60B, the background component image output from the foreground/background separator 103 consists of the pixels belonging to the background area and the background components included in the pixels of the mixed area.

As shown in FIGS. 60A and 60B, the foreground component image output from the foreground/background separator 103 consists of the pixel belonging to the foreground area and the foreground components included in the pixels of the mixed area.

The pixel values of the pixels in the mixed area are separated into the background components and the foreground components by the foreground/background separator 103. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of processing executed by the separating portion 601 for separating the foreground components and the background components from the pixels belonging to the mixed area when a frame interval time is equal to a shutter time.

FIG. 61 illustrates a model of an image indicating foreground components and background components in two frames including a foreground object moving from the left to the right in the figure. In the model of the image shown in FIG. 61, the amount v of movement within the shutter time is four, and a virtual division number is set to four.

In frame #n, the leftmost pixel and the fourteenth through eighteenth pixels from the left consist of only the background components and belong to the background area. In frame #n, the second through fourth pixels from the left include background components and foreground components, and belong to the uncovered background area. In frame #n, the eleventh through thirteenth pixels from the left include background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left include background components and foreground components, and belong to the uncovered background area. In frame #n+1, the fifteenth through seventeenth pixels from the left include background components and foreground components, and belong to the covered background area. In frame #n+1, the ninth through fourteenth pixels from the left consist of only the foreground components, and belong to the foreground area.

Figure 62:
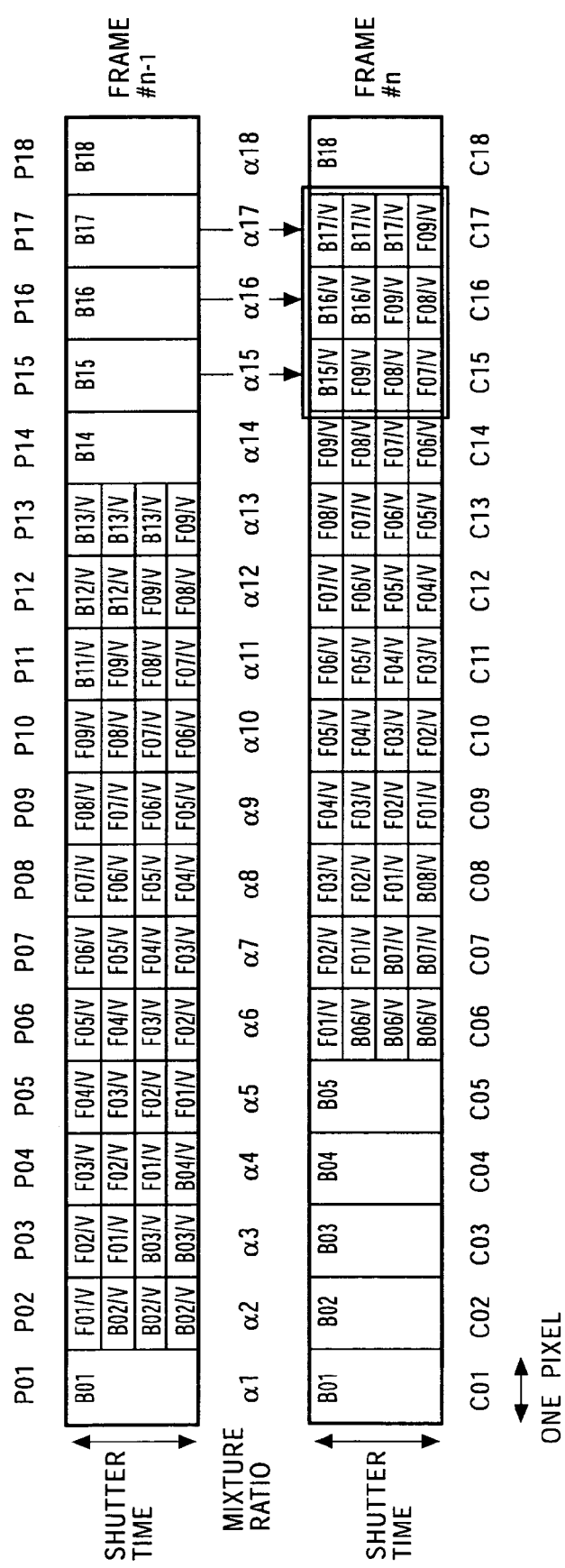
FIG. 62 illustrates a model in which pixel values are developed in the time direction and the period corresponding to the shutter time is divided.

FIG. 62 illustrates the processing for separating the foreground components from the pixels belonging to the covered background area. In FIG. 62, $\alpha 1$ through $\alpha 18$ indicate mixture ratios of the individual pixels of frame #n. In FIG. 62, the fifteenth through seventeenth pixels from the left belong to the covered background area.

The pixel value C15 of the fifteenth pixel from the left in frame #n can be expressed by equation (61):

$$C15 = B15/v + F09/v + F08/v + F07/v \qquad (61)$$
$$= \alpha 15 \cdot B15 + F09/v + F08/v + F07/v$$
$$= \alpha 15 \cdot P15 + F09/v + F08/v + F07/v$$

where $\alpha 15$ indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (62) based on equation (61).

$$f15 = F09/v + F08/v + F07/v \qquad (62)$$
$$= C15 - \alpha 15 \cdot P15$$

Similarly, the sum f16 of the foreground components of the sixteenth pixel from the left in frame #n can be expressed by equation (63), and the sum f17 of the foreground components of the seventeenth pixel from the left in frame #n can be expressed by equation (64).

$$f16 = C16 - \alpha 16 \cdot P16 \qquad (63)$$

$$f17 = C17 - \alpha 17 \cdot P17 \qquad (64)$$

In this manner, the foreground components fc included in the pixel value C of the pixel belonging to the covered background area can be expressed by equation (65):

$$fc = C - \alpha \cdot p \qquad (65)$$

where P designates the pixel value of the corresponding pixel in the previous frame.

Figure 63:
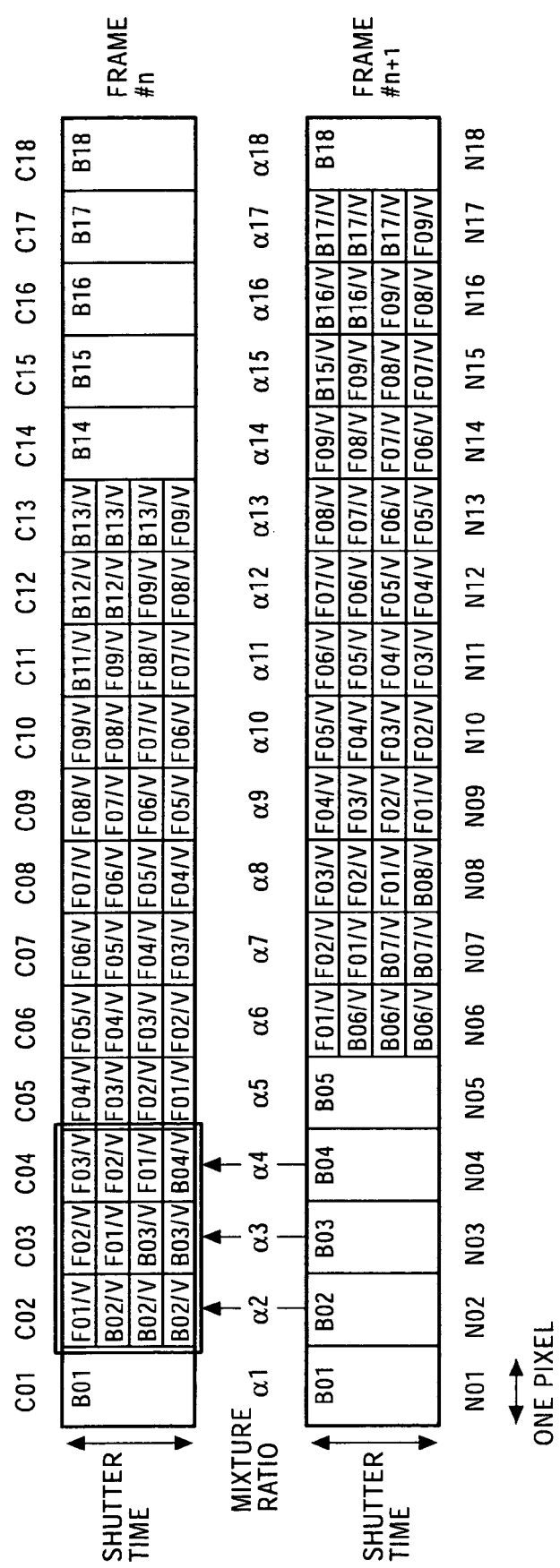
FIG. 63 illustrates a model in which pixel values are developed in the time direction and the period corresponding to the shutter time is divided.

FIG. 63 illustrates the processing for separating the foreground components from the pixels belonging to the uncovered background area. In FIG. 63, $\alpha 1$ through $\alpha 18$ indicate mixture ratios of the individual pixels of frame #n. In FIG. 63, the second through fourth pixels from the left belong to the uncovered background area.

The pixel value C02 of the second pixel from the left in frame #n can be expressed by equation (66):

$$C02 = B02/v + B02/v + B02/v + F01/v \qquad (66)$$
$$= \alpha 2 \cdot B02 + F01/v$$
$$= \alpha 2 \cdot N02 + F01/v$$

where $\alpha 2$ indicates the mixture ratio of the second pixel from the left in frame #n, and N02 designates the pixel value of the second pixel from the left in frame #n+1.

The sum f02 of the foreground components of the second pixel from the left in frame #n can be expressed by equation (67) based on equation (66).

$$f02 = F01/v \qquad (67)$$
$$= C02 - \alpha 2 \cdot N02$$

Similarly, the sum f03 of the foreground components of the third pixel from the left in frame #n can be expressed by equation (68), and the sum f04 of the foreground components of the fourth pixel from the left in frame #n can be expressed by equation (69).

$$f03 = C03 - \alpha 3 \cdot N03 \qquad (68)$$

$$f04 = C04 - \alpha 4 \cdot N04 \qquad (69)$$

In this manner, the foreground components fu included in the pixel value C of the pixel belonging to the uncovered background area can be expressed by equation (70)

$$fu = C - \alpha \cdot N \qquad (70)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area included in the area information, and the mixture ratio α for each pixel.

Figure 64:
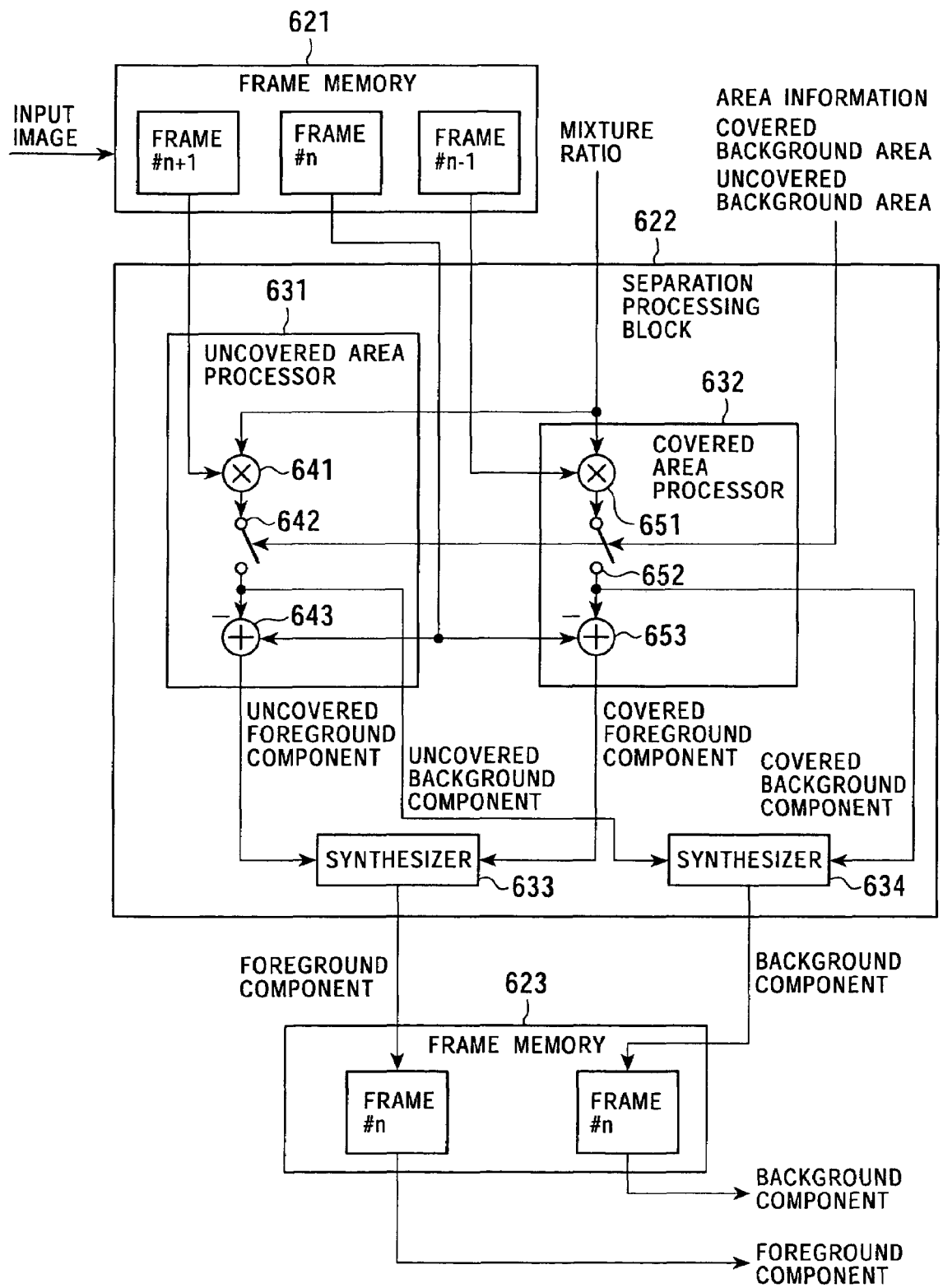
FIG. 64 is a block diagram illustrating an example of the configuration of a separating portion 601.

FIG. 64 is a block diagram illustrating an example of the configuration of the separating portion 601 for executing the above-described processing. An image input into the separating portion 601 is sent to a frame memory 621, and the area information indicating the covered background area and the uncovered background area sent from the mixture-ratio calculator 102 and the mixture ratio α are sent to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 sends the corresponding pixels in frame #n−1, frame #n, and frame #n+1 to the separation processing block 622.

The separation processing block 622 applies the calculations discussed with reference to FIGS. 62 and 63 to the pixel values of the corresponding pixels in frame #n−1, frame #n, and frame #n+1 sent from the frame memory 621 based on the area information indicating the covered background area and the uncovered background area and the mixture ratio α so as to separate the foreground components and the background components from the pixels belonging to the mixed area in frame #n, and sends them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 sent from the frame memory 621 by the mixture ratio α, and outputs the resulting pixel value to a switch 642. The switch 642 is closed when the pixel of frame #n (corresponding to the pixel in frame #n+1) sent from the frame memory 621 belongs to the uncovered background area, and sends the pixel value multiplied by the mixture ratio α sent from the multiplier 641 to a calculator 643 and the synthesizer 634. The value obtained by multiplying the pixel value of the pixel in frame #n+1 by the mixture ratio α output from the switch 642 is equivalent to the background components of the pixel value of the corresponding pixel in frame #n.

The calculator 643 subtracts the background components sent from the switch 642 from the pixel value of the pixel in frame #n sent from the frame memory 621 so as to obtain the foreground components. The calculator 643 sends the foreground components of the pixel in frame #n belonging to the uncovered background area to the synthesizer 633.

A multiplier 651 of the covered area processor 632 multiplies the pixel value of the pixel in frame #n−1 sent from the frame memory 621 by the mixture ratio α, and outputs the resulting pixel value to a switch 652. The switch 652 is closed when the pixel of frame #n (corresponding to the pixel in frame #n−1) sent from the frame memory 621 belongs to the covered background area, and sends the pixel value multiplied by the mixture ratio α sent from the multiplier 651 to a calculator 653 and the synthesizer 634. The value obtained by multiplying the pixel value of the pixel in frame #n−1 by the mixture ratio α output from the switch 652 is equivalent to the background components of the pixel value of the corresponding pixel in frame #n.

The calculator 653 subtracts the background components sent from the switch 652 from the pixel value of the pixel in frame #n sent from the frame memory 621 so as to obtain the foreground components. The calculator 653 sends the foreground components of the pixel in frame #n belonging to the covered background area to the synthesizer 633.

The synthesizer 633 combines the foreground components of the pixels belonging to the uncovered background area and sent from the calculator 643 with the foreground components of the pixels belonging to the covered background area and sent from the calculator 653, and sends the synthesized foreground components to the frame memory 623.

The synthesizer 634 combines the background components of the pixels belonging to the uncovered background area and sent from the switch 642 with the background components of the pixels belonging to the covered background area and sent from the switch 652, and sends the synthesized background components to the frame memory 623.

The frame memory 623 stores the foreground components and the background components of the pixels in the mixed area of frame #n sent from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components included in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

Figure 65A:
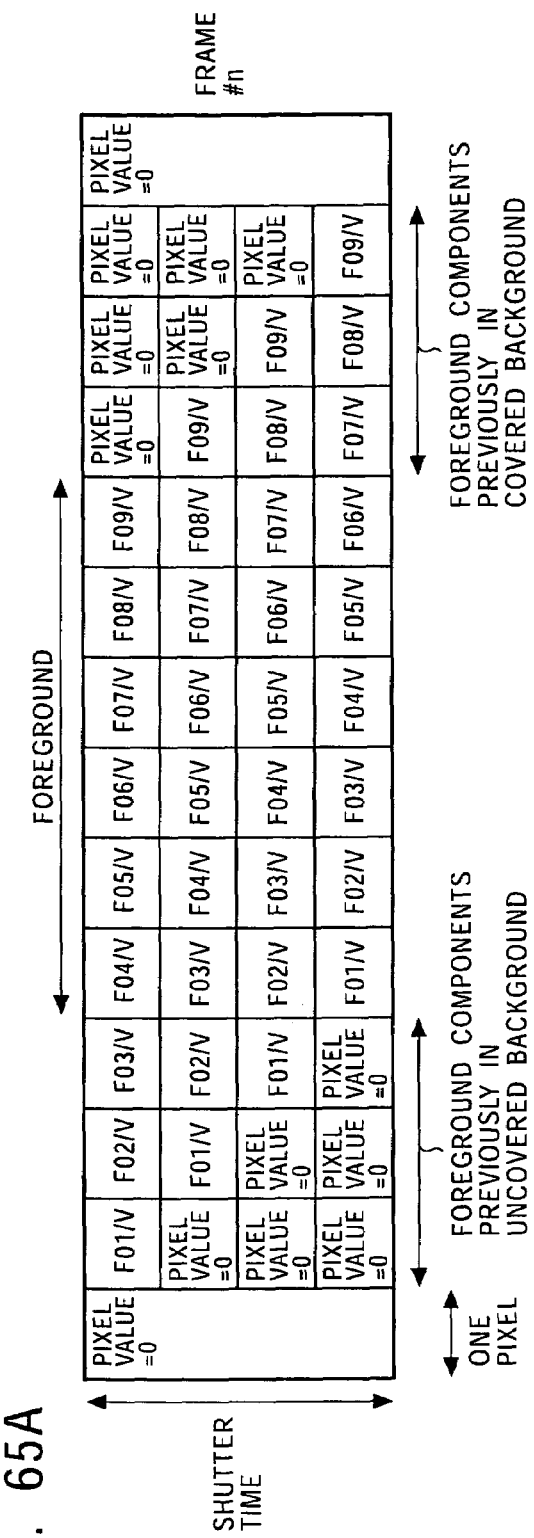
FIG. 65A illustrates an example of a separated foreground component image.

FIG. 65A illustrates an example of the foreground component image corresponding to frame #n in FIG. 61. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

Figure 65B:
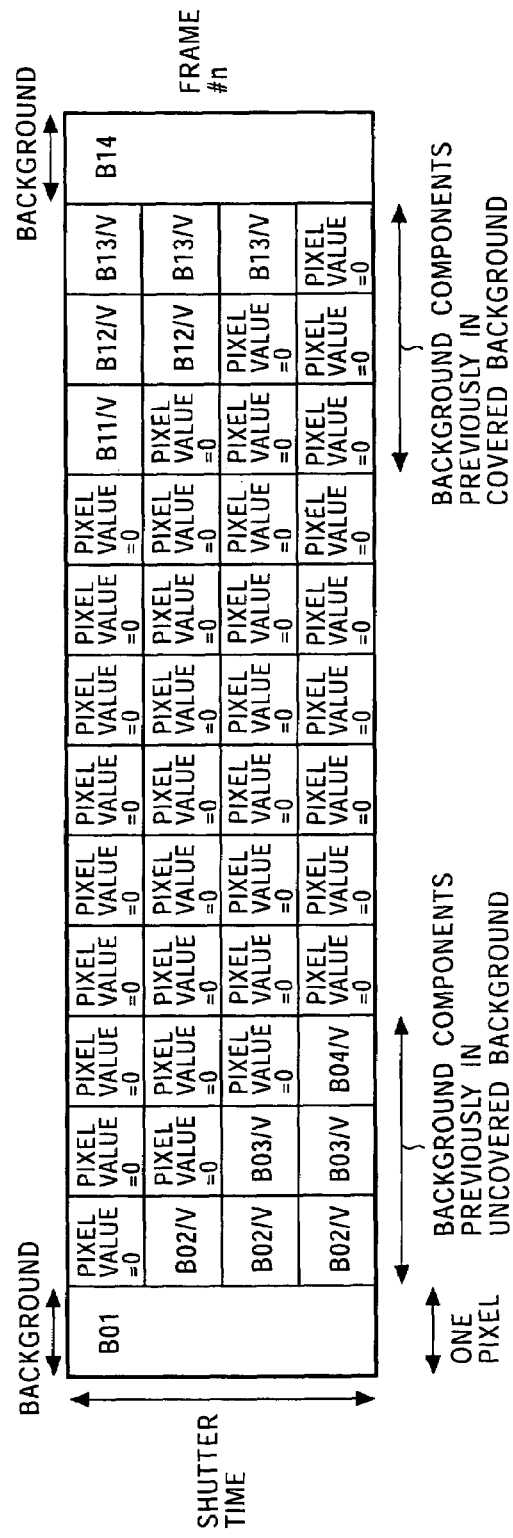
FIG. 65B illustrates an example of a separated background component image.

FIG. 65B illustrates an example of the background component image corresponding to frame #n in FIG. 61. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 66:
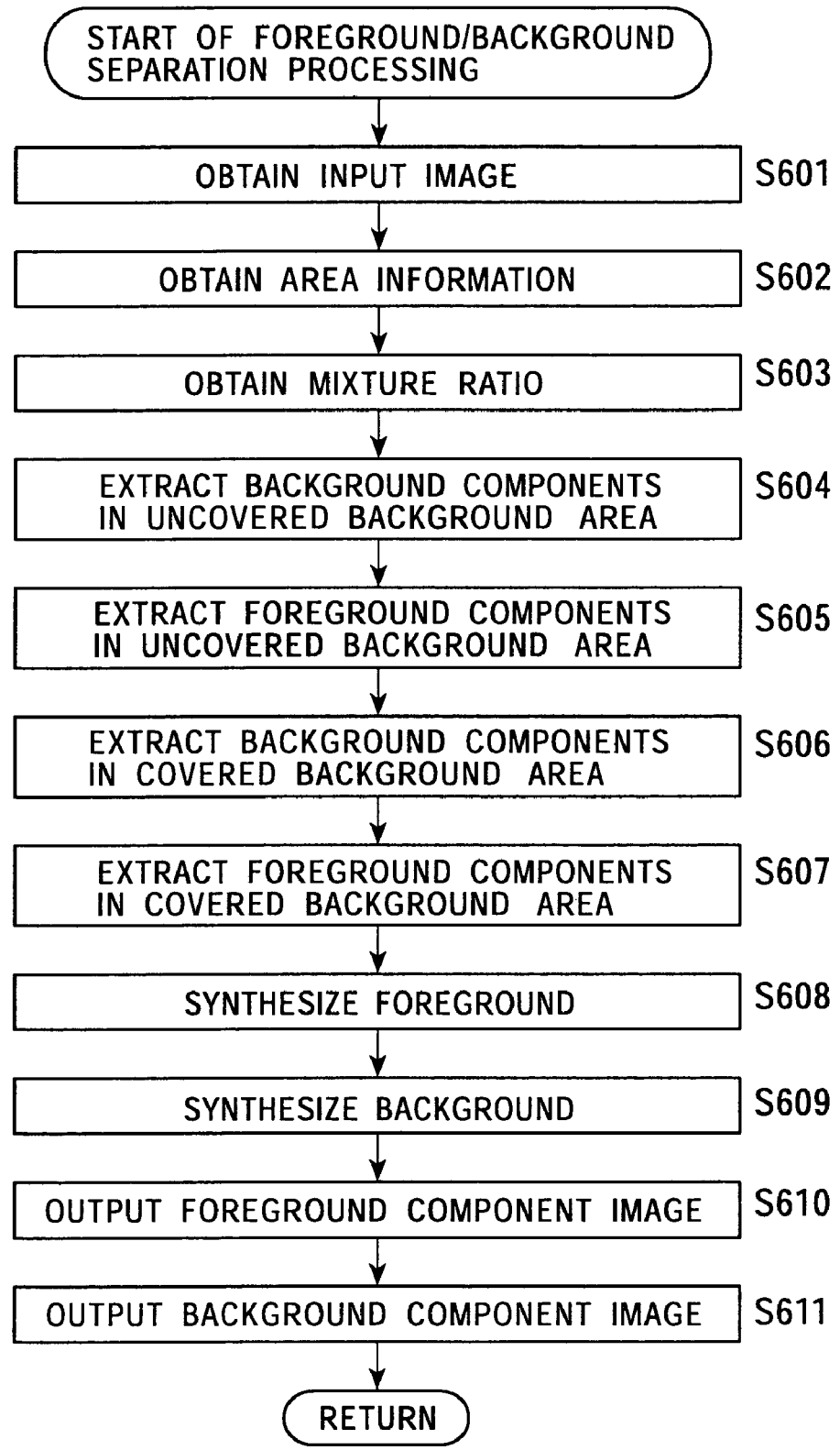
FIG. 66 is a flowchart illustrating processing for separating a foreground and a background.

The processing for separating the foreground and the background executed by the foreground/background separator 103 is described below with reference to the flowchart of FIG. 66. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information sent from the mixture-ratio calculator 102. In step S603, the separation processing block 622 of the separating portion 601 obtains the mixture ratio α sent from the mixture-ratio calculator 102.

In step S604, the uncovered area processor 631 extracts the background components from the pixel values of the pixels belonging to the uncovered background area sent from the frame memory 621 based on the area information and the mixture ratio α.

In step S605, the uncovered area processor 631 extracts the foreground components from the pixel values of the pixels belonging to the uncovered background area sent from the frame memory 621 based on the area information and the mixture ratio α.

In step S606, the covered area processor 632 extracts the background components from the pixel values of the pixels belonging to the covered background area sent from the frame memory 621 based on the area information and the mixture ratio α.

In step S607, the covered area processor 632 extracts the foreground components from the pixel values of the pixels belonging to the covered background area sent from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are sent to the synthesizer 603. The synthesizer 603 further combines the pixels belonging to the foreground area sent via the switch 602 with the foreground components sent from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are sent to the synthesizer 605. The synthesizer 605 further combines the pixels belonging to the background area sent via the switch 604 with the background components sent from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 103 separates the foreground components and the background components from the input image based on the area information and the mixture ratio α, and outputs the foreground component image consisting of only the foreground components and the background component image consisting of only the background components.

Adjustments of the amount of motion blur in a foreground component image are described below.

Figure 67:
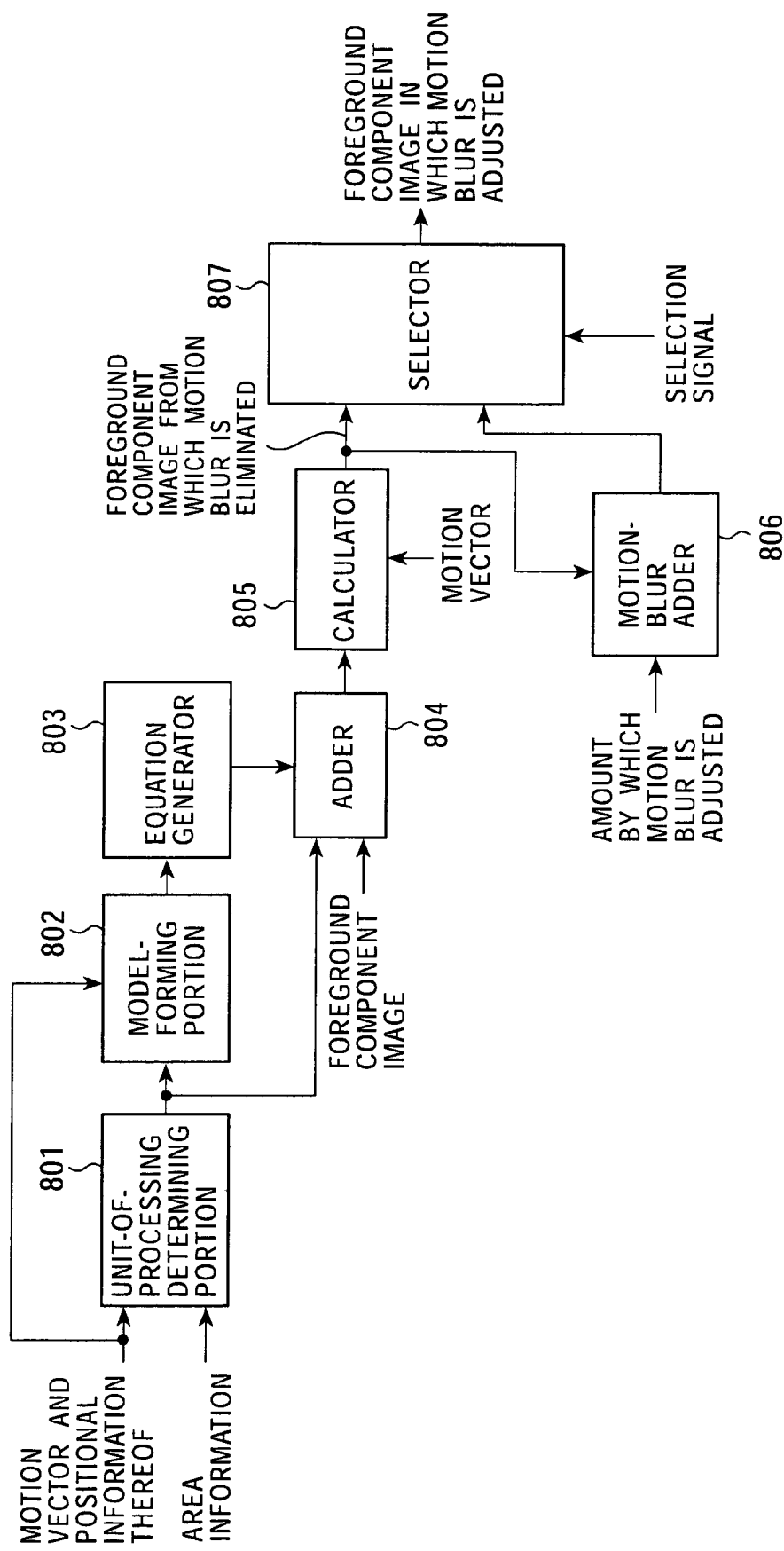
FIG. 67 is a block diagram illustrating an example of the configuration of a motion-blur adjusting unit 104.

FIG. 67 is a block diagram illustrating an example of the configuration of the motion-blur adjusting unit 104. The motion vector and the positional information thereof sent from the motion detector 102 are sent to a unit-of-processing determining portion 801, a model-forming portion 802, and a calculator 805. The area information sent from the area specifying unit 101 is sent to the unit-of-processing determining portion 801. The foreground component image sent from the foreground/background separator 103 is sent to the adder 804.

The unit-of-processing determining portion 801 generates the unit of processing based on the motion vector, the positional information thereof, and the area information and sends the generated unit of processing to the model-forming portion 802. The unit-of-processing determining portion 801 sends the generated unit of processing to the adder 804.

Figure 68:
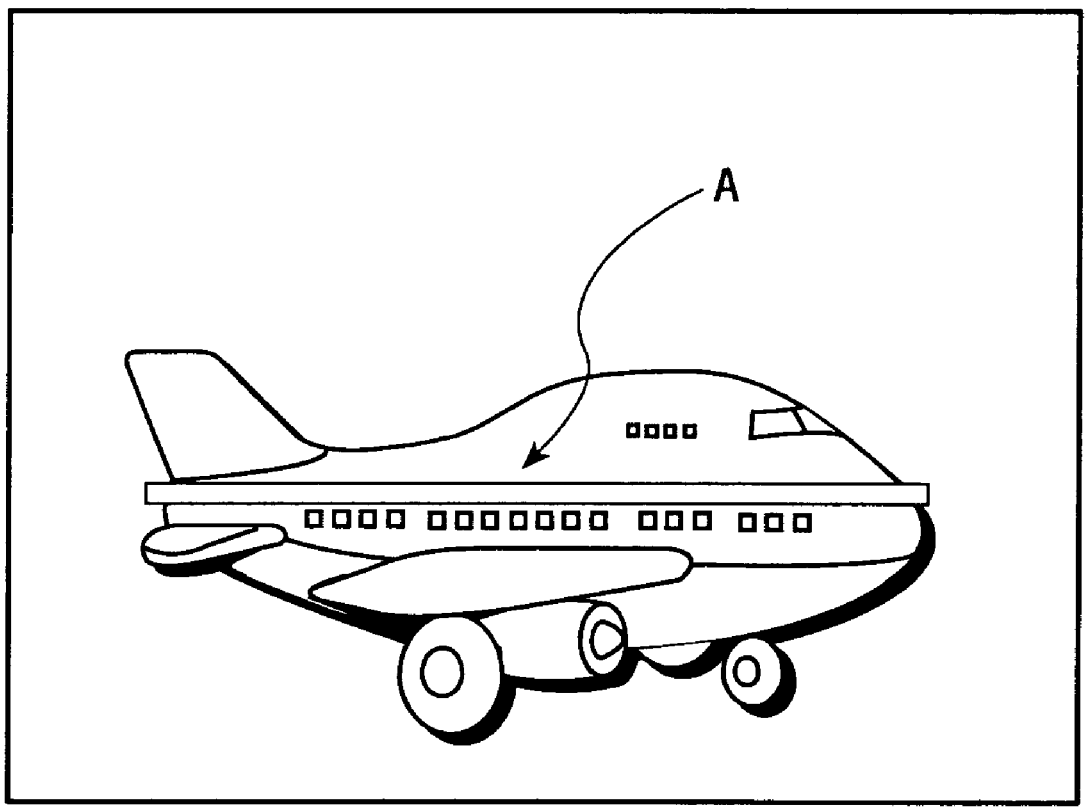
FIG. 68 illustrates the unit of processing.

As an example is indicated by A in FIG. 68, the unit of processing generated by the unit-of-processing determining portion 801 indicates consecutive pixels disposed in the moving direction starting from the pixel corresponding to the covered background area of the foreground component image until the pixel corresponding to the uncovered background area, or indicates consecutive pixels disposed in the moving direction starting from the pixel corresponding to the uncovered background area until the pixel corresponding to the covered background area. The unit of processing is formed of two pieces of data which indicate, for example, the upper left point (which is the position of the leftmost or the topmost pixel in the image designated by the unit of processing) and the lower right point.

The model-forming portion 802 forms a model based on the motion vector and the unit of processing. More specifically, for example, the model-forming portion 802 stores in advance a plurality of models in accordance with the number of pixels included in the unit of processing, the virtual division number of the pixel value in the time direction, and the number of foreground components for each pixel. The model-forming portion 902 then selects a model in which the correlation between the pixel values and the foreground components is designated, such as that shown in FIG. 69, based on the unit of processing and the virtual division number of the pixel value in the time direction.

It is now assumed, for example, that the number of pixels corresponding to the unit of processing is 12, and that the amount v of movement within the shutter time is 5. Then, the model-forming portion 802 sets the virtual division number to 5, and selects a model formed of eight types of foreground components so that the leftmost pixel includes one foreground component, the second pixel from the left includes two foreground components, the third pixel from the left includes three foreground components, the fourth pixel from the left includes four pixel components, the fifth pixel from the left includes five foreground components, the sixth pixel from the left includes five foreground components, the seventh pixel from the left includes five foreground components, the eighth pixel from the left includes five foreground components, the ninth pixel from the left includes four foreground components, the tenth pixel from the left includes three foreground components, the eleventh pixel from the left includes two foreground components, and the twelfth pixel from the left includes one foreground component.

Instead of selecting a model from the pre-stored models, the model-forming portion 802 may generate a model based on the motion vector and the unit of processing when the motion vector and the unit of processing are sent.

The model-forming portion 802 sends the selected model to an equation generator 803.

The equation generator 803 generates an equation based on the model sent from the model-forming portion 802.

Figure 69:
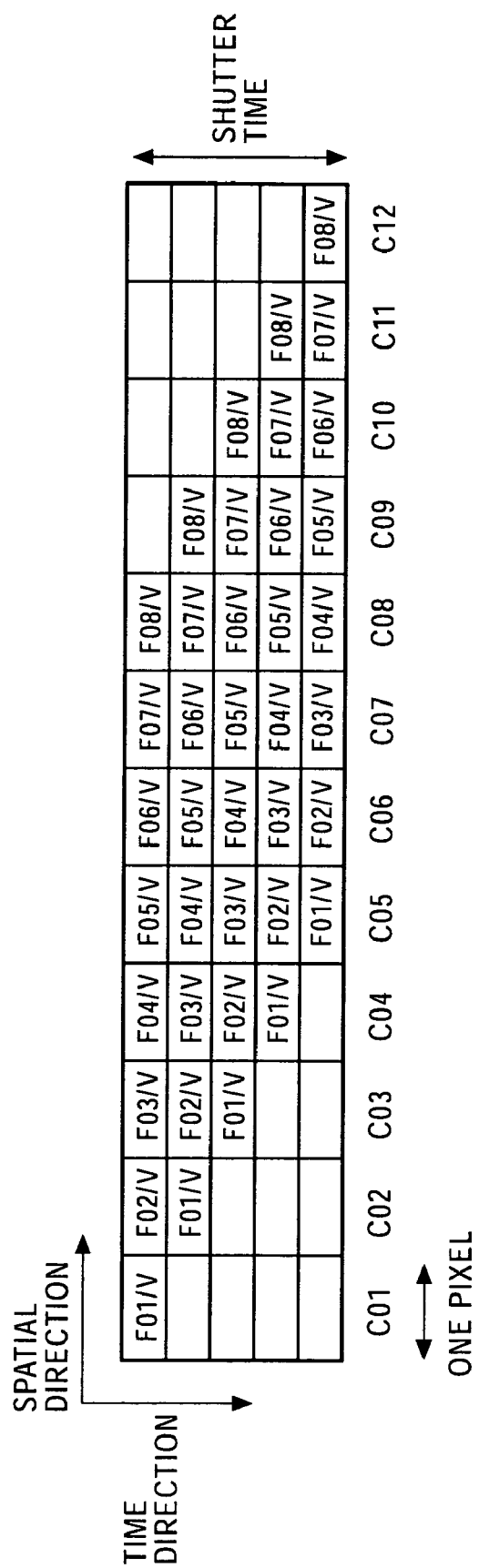
FIG. 69 illustrates a model in which pixel values of a foreground component image are developed in the time direction and the period corresponding to the shutter time is divided.

A description is given below, with reference to the model of the foreground component image shown in FIG. 69, of equations generated by the equation generator 803 when the number of foreground components is 8, the number of pixels corresponding to the unit of processing is 12, the amount v of movement within the shutter time is 5, and the virtual division number is 5.

When the foreground components included in the foreground component image corresponding to the shutter time/v are F01/v through F08/v, the relationships between F01/v through F08/v and the pixel values C01 through C12 can be expressed by equations (71) through (82).

$$C01 = F01/v \quad (71)$$

$$C02 = F02/v + F01/v \quad (72)$$

$$C03 = F03/v + F02/v + F01/v \quad (73)$$

$$C04 = F04/v + F03/v + F02/v + F01/v \quad (74)$$

$$C05 = F05/v + F04/v + F03/v + F02/v + F01/v \quad (75)$$

$$C06 = F06/v + F05/v + F04/v + F03/v + F02/v \quad (76)$$

$$C07 = F07/v + F06/v + F05/v + F04/v + F03/v \quad (77)$$

$$C08 = F08/v + F07/v + F06/v + F05/v + F04/v \quad (78)$$

$$C09 = F08/v + F07/v + F06/v + F05/v \quad (79)$$

$$C10 = F08/v + F07/v + F06/v \quad (80)$$

$$C11 = F08/v + F07/v \quad (81)$$

$$C12 = F08/v \quad (82)$$

The equation generator 803 generates an equation by modifying the generated equations. The equations generated by the equation generator 803 are indicated by equations (83) though (94).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \quad (83)$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \quad (84)$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \quad (85)$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \quad (86)$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \quad (87)$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \quad (88)$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \quad (89)$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \quad (90)$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \quad (91)$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \quad (92)$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \quad (93)$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \quad (94)$$

Equations (83) through (94) can be expressed by equation (95).

$$C_j = \sum_{i=01}^{08} aij \cdot F_i / v \quad (95)$$

In equation (95), j designates the position of the pixel. In this example, j has one of the values from 1 to 12. In equation (95), i designates the position of the foreground value. In this example, i has one of the values from 1 to 8. In equation (95), aij has the value 0 or 1 according to the values of i and j.

Equation (95) can be expressed by equation (96) in consideration of the error.

$$C_j = \sum_{i=01}^{08} a_{ij} \cdot F_i / v + e_j \quad (96)$$

In equation (96), ej designates the error included in the designated pixel Cj.

Equation (96) can be modified into equation (97).

$$e_j = C_j - \sum_{i=01}^{08} a_{ij} \cdot F_i / v \quad (97)$$

In order to apply the method of least squares, the square sum E of the error is defined by equation (98).

$$E = \sum_{j=01}^{12} e_j^2 \quad (98)$$

In order to minimize the error, the partial differential value using the variable Fk with respect to the square sum E of the error should be 0. Fk is determined so that equation (99) is satisfied.

$$\frac{\partial E}{\partial F_k} = 2 \cdot \sum_{j=01}^{12} e_j \cdot \frac{\partial e_j}{\partial F_k} \quad (99)$$

$$= 2 \cdot \sum_{j=01}^{12} \left\{ \left( C_j - \sum_{i=01}^{08} a_{ij} \cdot F_i / v \right) \cdot (-a_{kj}/v) \right\} = 0$$

In equation (99), since the amount v of movement within the shutter time is a fixed value, equation (100) can be deduced.

$$\sum_{j=01}^{12} akj \cdot (Cj - \sum_{i=01}^{08} aij \cdot Fi/v) = 0 \quad (100)$$

To develop equation (100) and transpose the terms, equation (101) can be obtained.

$$\sum_{j=01}^{12} (akj \cdot \sum_{i=01}^{08} aij \cdot Fi) = v \cdot \sum_{j=01}^{12} akj \cdot Cj \quad (101)$$

Equation (101) is developed into eight equations by substituting the individual integers from 1 to 8 into k in equation (178). The obtained eight equations can be expressed by one matrix equation. This equation is referred to as a normal equation.

An example of the normal equation generated by the equation generator 803 based on the method of least squares is indicated by equation (102).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \quad (102)$$

When equation (102) is expressed by A·F=v·C, C, A, and v are known, and F is unknown. A and v are known when the model is formed, while C becomes known when the pixel value is input in the addition processing.

By calculating the foreground components according to the normal equation based on the method of least squares, the error included in the pixel C can be distributed.

The equation generator 803 sends the normal equation generated as discussed above to the adder 804.

The adder 804 sets, based on the unit of processing sent from the unit-of-processing determining portion 801, the pixel value C included in the foreground component image in the matrix equation sent from the equation generator 803. The adder 804 sends the matrix in which the pixel value C is set to a calculator 805.

The calculator 805 calculates the foreground component Fi/v from which motion blur is eliminated by the processing based on a solution, such as a sweep-out method (Gauss-Jordan elimination), so as to obtain Fi corresponding to i indicating one of the integers from 1 to 8, which is the pixel value from which motion blur is eliminated. The calculator 805 then outputs the foreground component image consisting of the pixel values Fi without motion blur, such as that in FIG. 70, to a motion-blur adder 806 and a selector 807.

Figure 70:
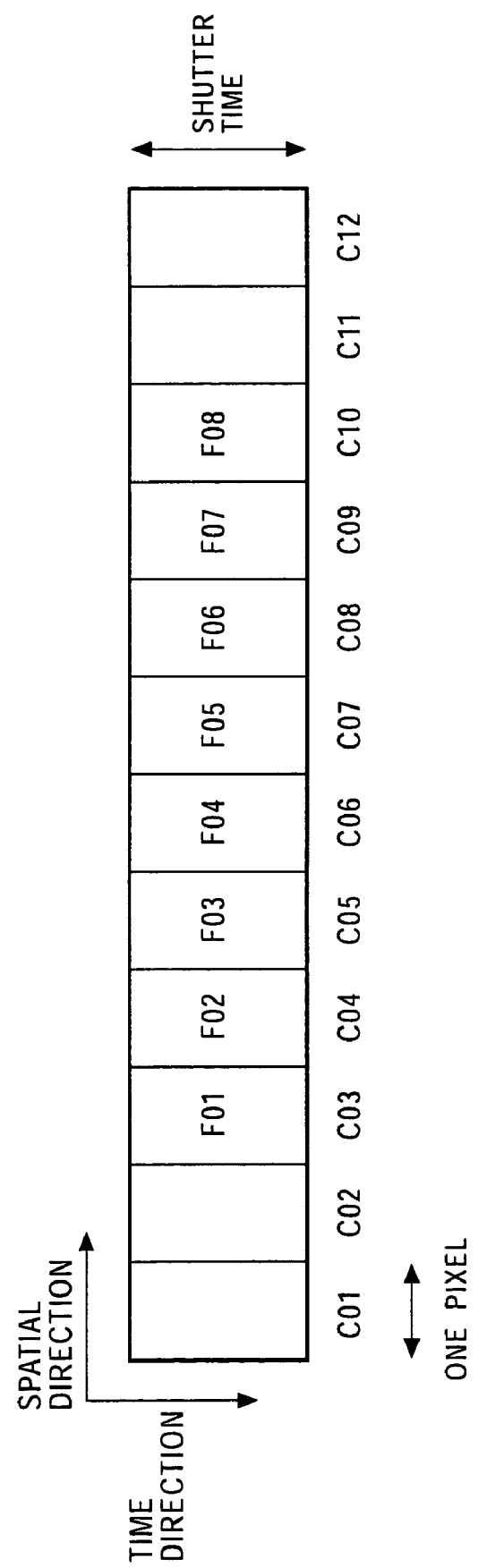
FIG. 70 illustrates a model in which pixel values of a foreground component image are developed in the time direction and the period corresponding to the shutter time is divided.

In the foreground component image without motion blur shown in FIG. 70, the reason for setting F01 through F08 in C03 through C10, respectively, is not to change the position of the foreground component image with respect to the screen. However, F01 through F08 may be set in any desired positions.

Figure 71:
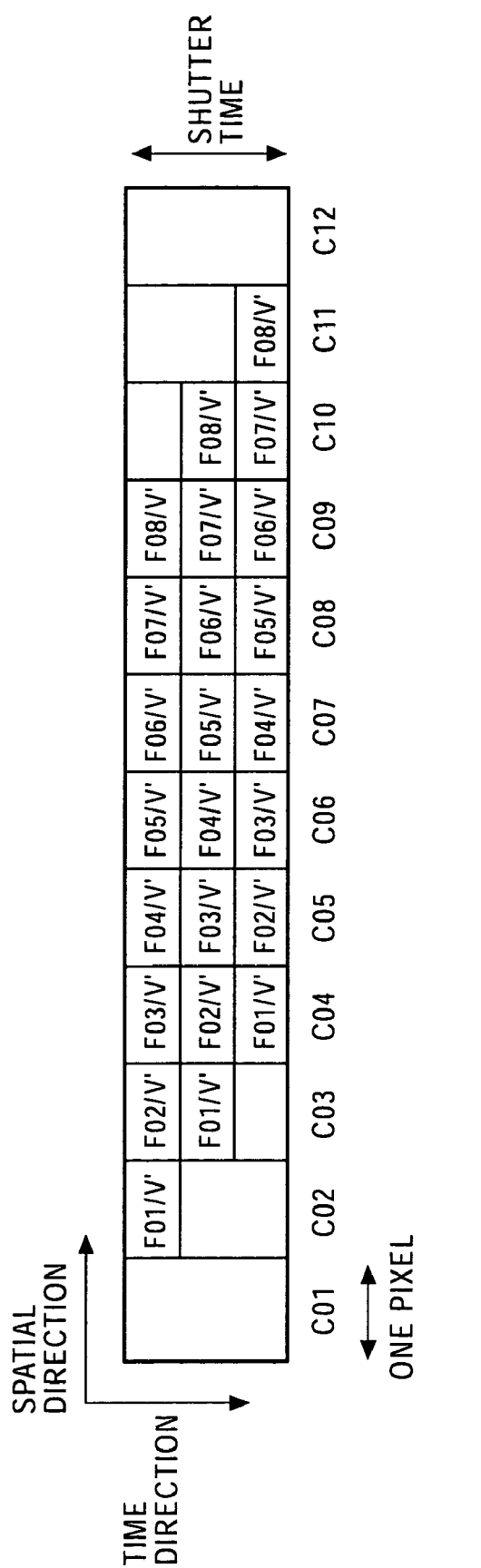
FIG. 71 illustrates a model in which pixel values of a foreground component image are developed in the time direction and the period corresponding to the shutter time is divided.

The motion-blur adder 806 is able to adjust the amount of motion blur by adding the amount v' by which motion blur is adjusted, which is different from the amount v of movement, for example, the amount v' by which motion blur is adjusted, which is one half the value of the amount v of movement within the shutter time, or the amount v' by which motion blur is adjusted, which is irrelevant to the amount v of movement within the shutter time. For example, as shown in FIG. 71, the motion-blur adder 806 divides the foreground pixel value Fi without motion blur by the amount v' by which motion blur is adjusted so as to obtain the foreground component Fi/v'. The motion-blur adder 806 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 806 sends the foreground component image in which the amount of motion blur is adjusted to a selector 807.

The selector 807 selects one of the foreground component image without motion blur sent from the calculator 805 and the foreground component image in which the amount of motion blur is adjusted sent from the motion-blur adder 806 based on a selection signal reflecting a user's selection, and outputs the selected foreground component image.

As discussed above, the motion-blur adjusting unit 104 is able to adjust the amount of motion blur based on the selection signal and the amount v' by which motion blur is adjusted.

Figure 72:
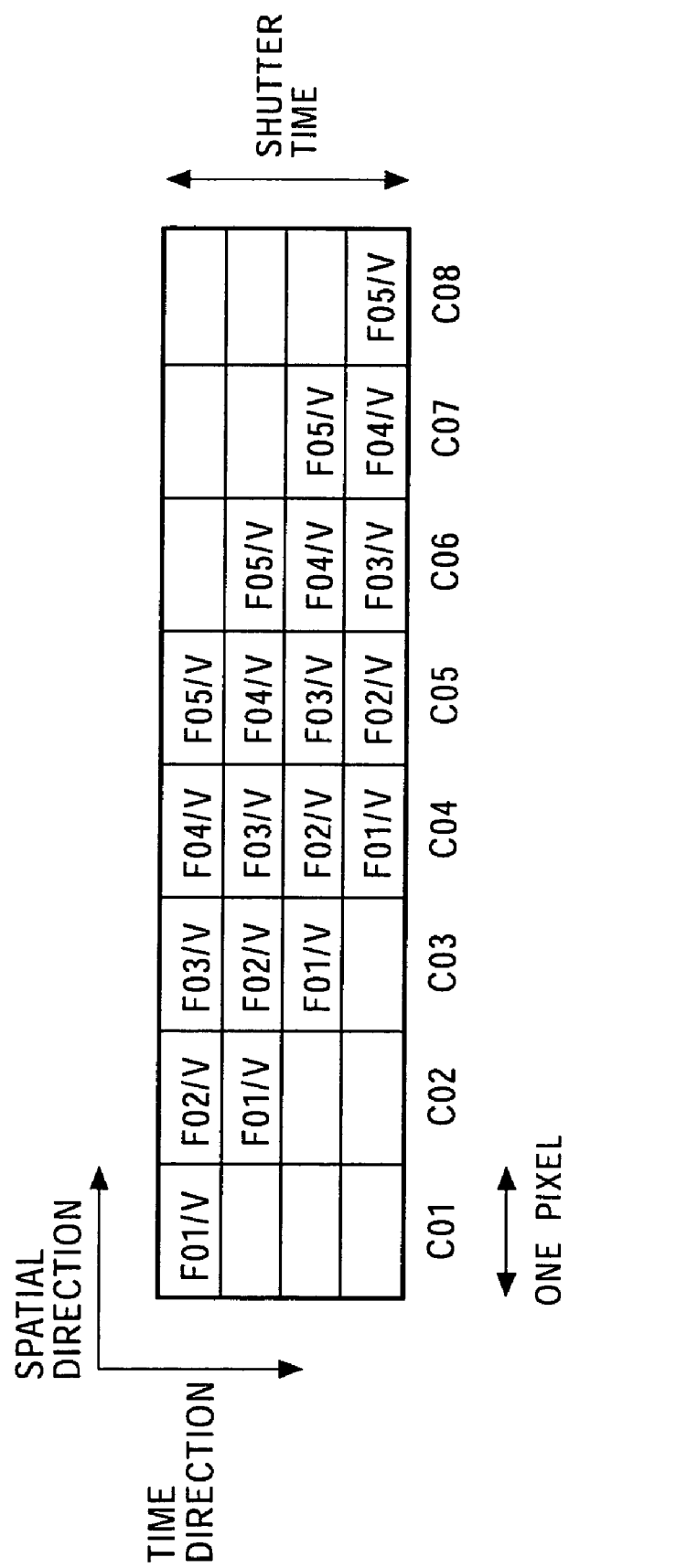
FIG. 72 illustrates a model in which pixel values of a foreground component image are developed in the time direction and the period corresponding to the shutter time is divided.

Also, for example, when the number of pixels corresponding to the unit of processing is 8, and the amount v of movement within the shutter time is four, as shown in FIG. 72, the motion-blur adjusting unit 104 generates a matrix equation expressed by equation (103).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (103)$$

In this manner, the motion-blur adjusting unit 104 calculates Fi, which is the pixel value in which the amount of motion blur is adjusted, by setting up the equation in accordance with the length of the unit of processing. Similarly, for example, when the number of pixels included in the unit of processing is 100, the equation corresponding to 100 pixels is generated so as to calculate Fi.

Figure 73:
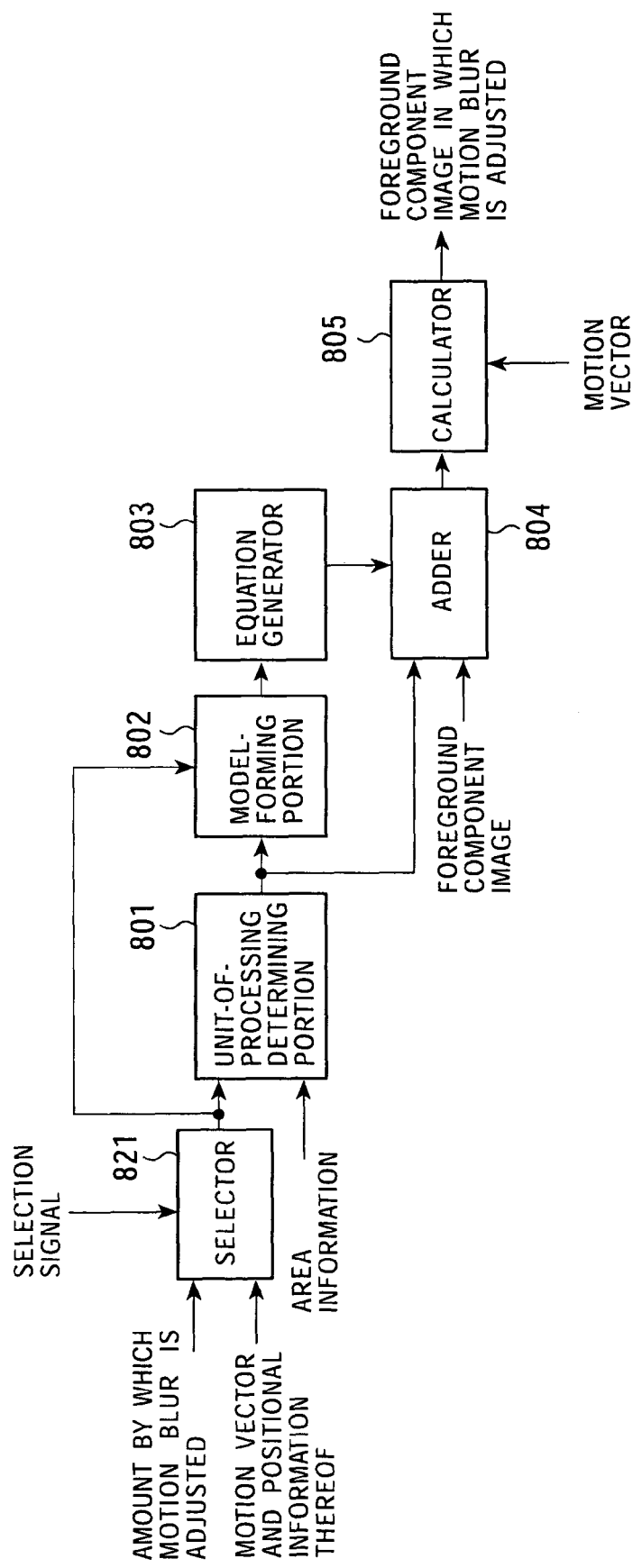
FIG. 73 illustrates another configuration of the motion-blur adjusting unit 104.

FIG. 73 illustrates an example of another configuration of the motion-blur adjusting unit 104. The same elements as those shown in FIG. 67 are designated with like reference numerals, and an explanation thereof is thus omitted.

Based on a selection signal, a selector 821 directly sends an input motion vector and a positional signal thereof to the unit-of-processing determining portion 801 and the model-forming portion 802. Alternatively, the selector 821 may substitute the magnitude of the motion vector by the amount v' by which motion blur is adjusted, and then sends the motion vector and the positional signal thereof to the unit-of-processing determining portion 801 and the model-forming unit 802.

With this arrangement, the unit-of-processing determining portion 801 through the calculator 805 of the motion-blur adjusting unit 104 shown in FIG. 73 are able to adjust the amount of motion blur in accordance with the amount v of movement within the shutter time and the amount v' by which motion blur is adjusted. For example, when the amount v of movement within the shutter time is 5, and the amount v' by which motion blur is adjusted is 3, the unit-of-processing determining portion 801 through the calculator 805 of the motion-blur adjusting unit 104 shown in FIG. 73 execute computation on the foreground component image in which the amount v of movement within the shutter time is 5 shown in FIG. 69 according to the model shown in FIG. 71 in which the amount v' by which motion blur is adjusted is 3. As a result, the image including motion blur having the amount v of movement within the shutter time of (amount v of movement within the shutter time)/(amount v' by which motion blur is adjusted)=5/3, i.e., about 1.7 is obtained. In this case, the calculated image does not include motion blur corresponding to the amount v of movement within the shutter time of 3. Accordingly, it should be noted that the relationship between the amount v of movement within the shutter time and the amount v' by which motion blur is adjusted is different from the result of the motion-blur adder 806.

As discussed above, the motion-blur adjusting unit 104 generates the equation in accordance with the amount v of movement within the shutter time and the unit of processing, and sets the pixel values of the foreground component image in the generated equation, thereby calculating the foreground component image in which the amount of motion blur is adjusted.

Figure 74:
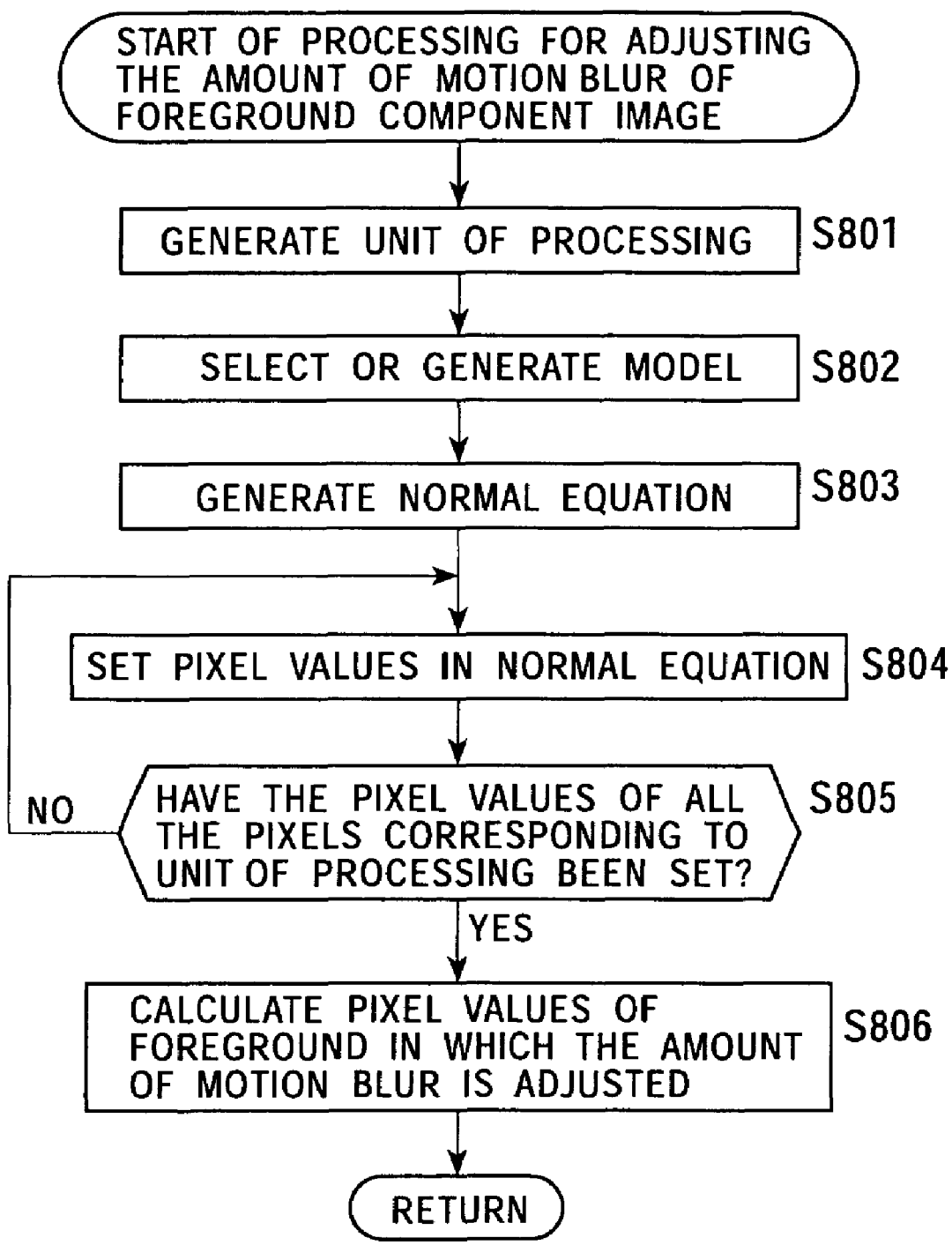
FIG. 74 is a flowchart illustrating processing for adjusting the amount of motion blur included in a foreground component image, performed by the motion-blur adjusting unit 104.

The processing for adjusting the amount of motion blur included in the foreground component image executed by the motion-blur adjusting unit 104 is described below with reference to the flowchart of FIG. 74.

In step S801, the unit-of-processing determining portion 801 of the motion-blur adjusting unit 104 generates the unit of processing based on the motion vector and the area information, and sends the generated unit of processing to the model-forming portion 802.

In step S802, the model-forming portion 802 of the motion-blur adjusting unit 104 selects or generates the model in accordance with the amount v of movement within the shutter time and the unit of processing. In step S803, the equation generator 803 generates the normal equation based on the selected model.

In step S804, the adder 804 sets the pixel values of the foreground component image in the generated normal equation. In step S805, the adder 804 determines whether the pixel values of all the pixels corresponding to the unit of processing are set. If it is determined that the pixel values of all the pixels corresponding to the unit of processing are not yet set, the process returns to step S804, and the processing for setting the pixel values in the normal equation is repeated.

If it is determined in step S805 that the pixel values of all the pixels corresponding to the unit of processing are set, the process proceeds to step S806. In step S806, the calculator 805 calculates the pixel values of the foreground in which the amount of motion blur is adjusted based on the normal equation in which the pixel values are set sent from the adder 804. The processing is then completed.

As discussed above, the motion-blur adjusting unit 104 is able to adjust the amount of motion blur of the foreground image including motion blur based on the motion vector and the area information.

That is, it is possible to adjust the amount of motion blur included in the pixel values, that is, included in sampled data.

Figure 75:
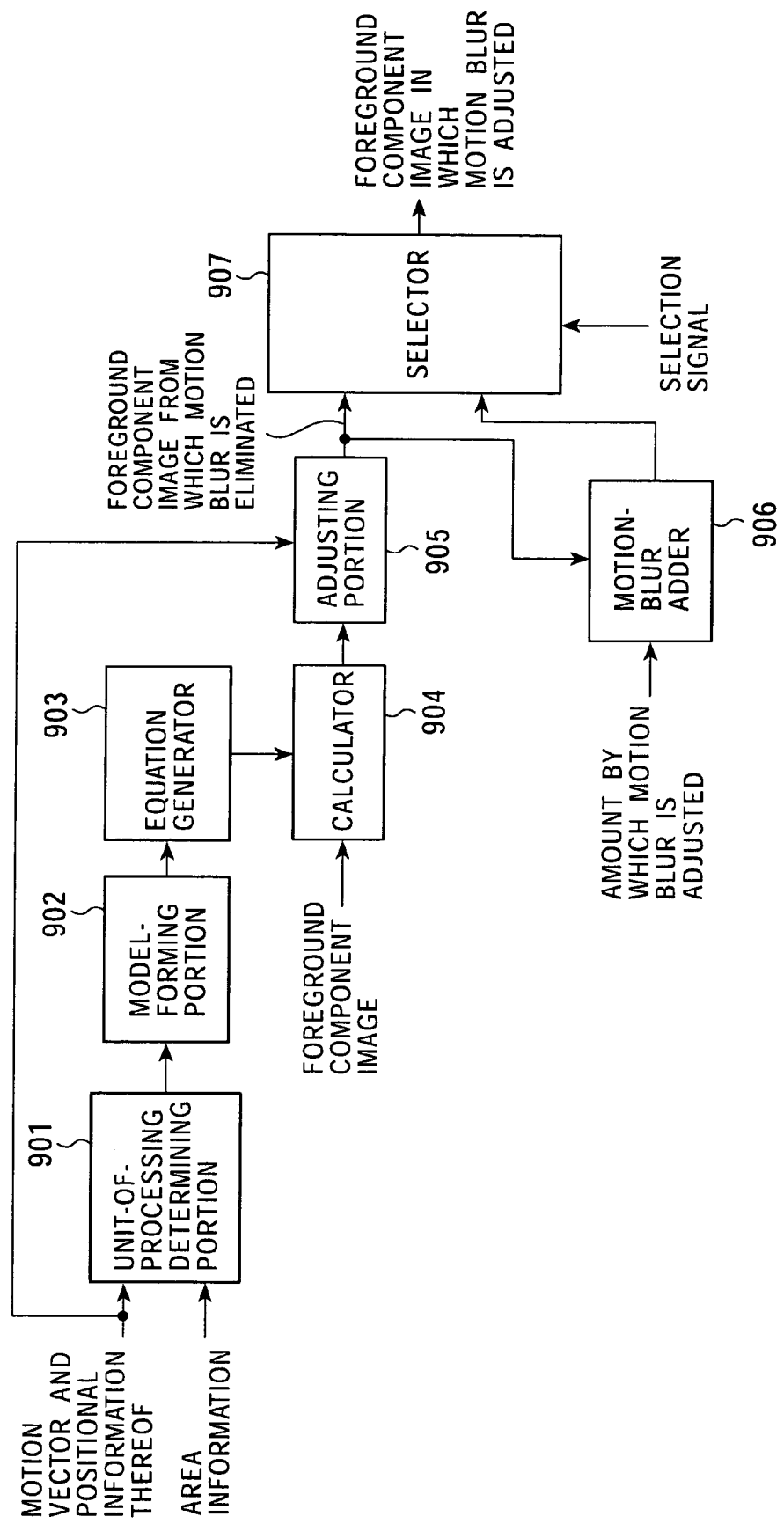
FIG. 75 is a block diagram illustrating an example of another configuration of the motion-blur adjusting unit 104.

FIG. 75 is a block diagram illustrating another example of the configuration of the motion-blur adjusting unit 104. The motion vector and the positional information thereof sent from the mixture-ratio calculator 102 are sent to a unit-of-processing determining portion 901 and an adjusting portion 905. The area information sent from the area specifying unit 101 is sent to the unit-of-processing determining portion 901. The foreground component image sent from the foreground/background separator 103 is sent to a calculator 904.

The unit-of-processing determining portion 901 generates the unit of processing based on the motion vector, the positional information thereof, and the area information, and sends it together with the motion vector to a model-forming portion 902.

The model-forming portion 902 forms a model based on the motion vector and the input unit of processing. More specifically, for example, the model-forming portion 902 stores in advance a plurality of models in accordance with the number of pixels included in the unit of processing, a virtual division number for pixel values in the time direction, and the number of foreground components for each pixel. The model-forming portion 902 then selects a model in which the relationship between pixel values and foreground components is designated, such as that shown in FIG. 76, based on the unit of processing and the virtual division number for the pixel values in the time direction.

It is now assumed, for example, that the number of pixels corresponding to the unit of processing is twelve, and that the amount v of movement within the shutter time is five. Then, the model-forming portion 902 sets the virtual division number to five, and selects a model formed of eight foreground components such that the leftmost pixel includes one foreground component, the second pixel from the left includes two foreground components, the third pixel from the left includes three foreground components, the fourth pixel from the left includes four pixel components, the fifth pixel from the left includes five foreground components, the sixth pixel from the left includes five foreground components, the seventh pixel from the left includes five foreground components, the eighth pixel from the left includes five foreground components, the ninth pixel from the left includes four foreground components, the tenth pixel from the left includes three foreground components, the eleventh pixel from the left includes two foreground components, and the twelfth pixel from the left includes one foreground component.

Instead of selecting a model from the pre-stored models, the model-forming portion 902 may generate a model based on the motion vector and the unit of processing when the motion vector and the unit of processing are sent.

An equation generator 903 generates an equation based on the model sent from the model-forming portion 902.

Figure 76:
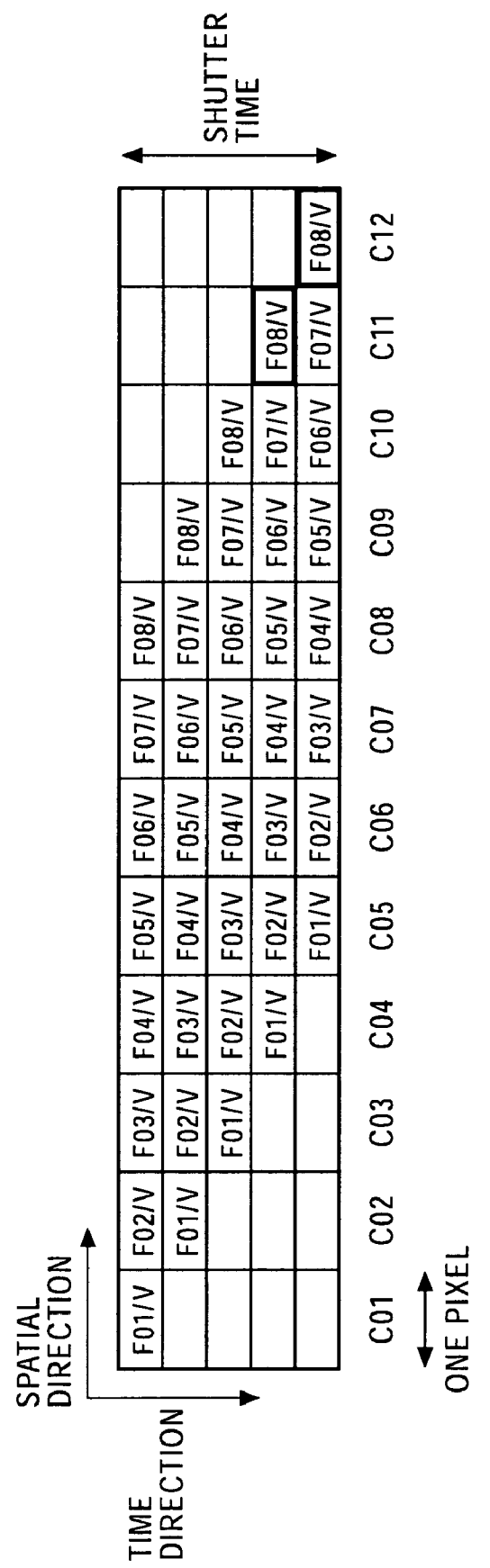
FIG. 76 illustrates an example of a model in which the relationships between pixel values and foreground components are indicated.
Figure 77:
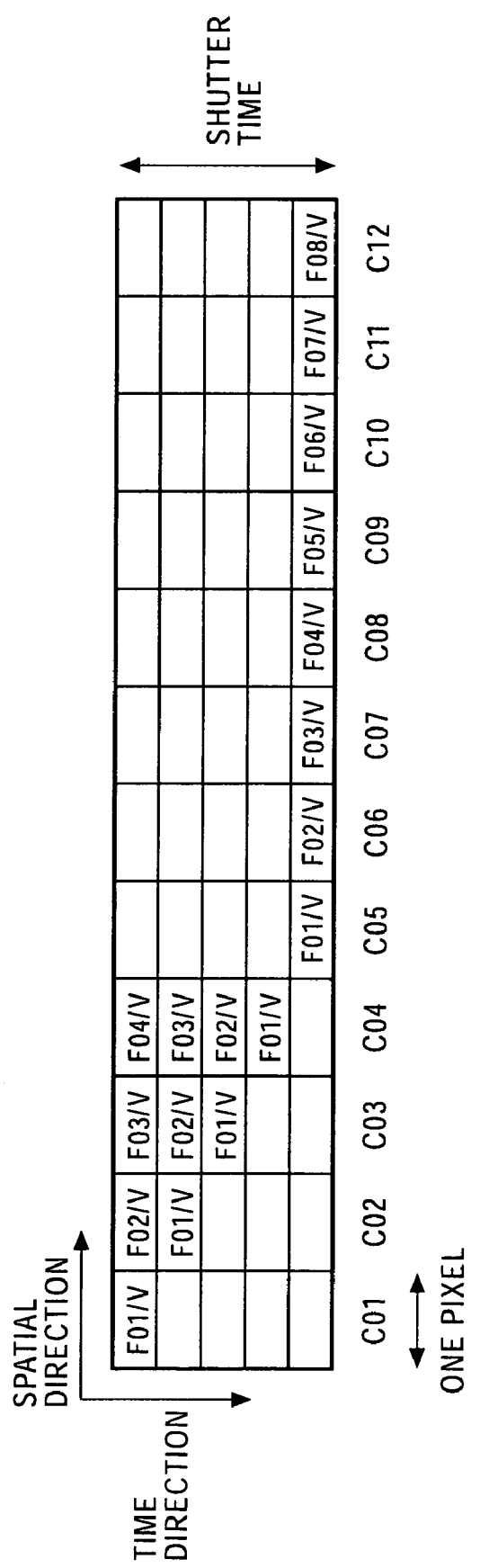
FIG. 77 illustrates the calculation of foreground components.
Figure 78:
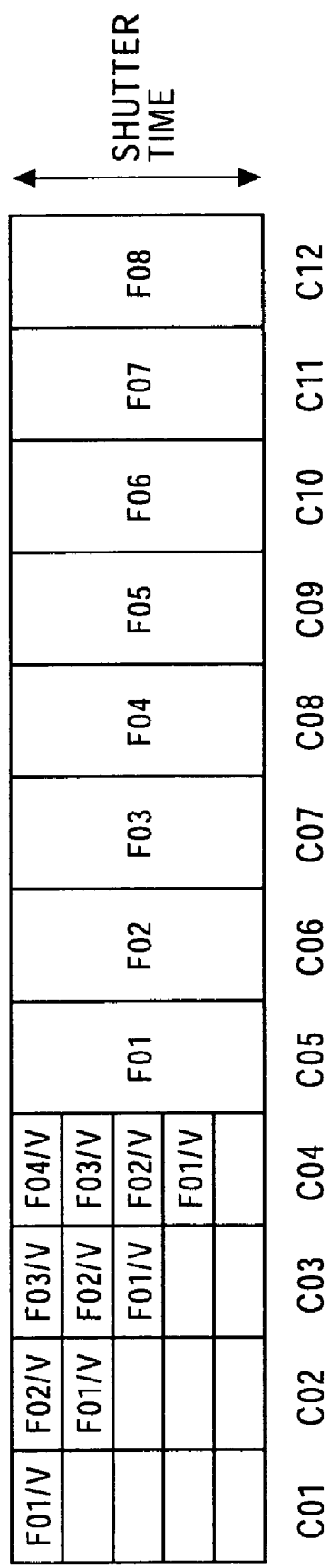
FIG. 78 illustrates the calculation of foreground components.

A description is now given, with reference to the models of foreground component images shown in FIGS. 76 through 78, of an example equation generated by the equation generator 903 when the number of foreground components is eight, the number of pixels corresponding to the unit of processing is twelve, and the amount v of movement within the shutter time is five.

When foreground components included in the foreground component image, corresponding to the shutter time/v are F01/v through F08/v, the relationships between F01/v through F08/v and pixel values C01 through C12 can be expressed by equations (71) through (82), as stated above.

By considering the pixel values C12 and C11, the pixel value C12 includes only the foreground component F08/v, as expressed by equation (104), and the pixel value C11 consists of the product sum of the foreground component F08/v and the foreground component F07/v. Accordingly, the foreground component F07/v can be found by equation (105).

$$F08/v = C12 \quad (104)$$

$$F07/v = C11 - C12 \quad (105)$$

Similarly, by considering the foreground components included in the pixel values C10 through C01, the foreground components F06/v through F01/v can be found by equations (106) through (111), respectively.

$$F06/v = C10 - C11 \quad (106)$$

$$F05/v = C09 - C10 \quad (107)$$

$$F04/v = C08 - C09 \quad (108)$$

$$F03/v = C07 - C08 + C12 \quad (109)$$

$$F02/v = C06 - C07 + C11 - C12 \quad (110)$$

$$F01/v = C05 - C06 + C10 - C11 \quad (111)$$

The equation generator 903 generates equations for calculating foreground components by the difference between pixel values, as indicated by the example equations (104) through (111). The equation generator 903 sends the generated equations to the calculator 904.

The calculator 904 sets the pixel values of the foreground component image in the equations sent from the equation generator 903 so as to obtain the foreground components based on the equations in which the pixel values are set. For example, when equations (104) through (111) are sent from the equation generator 903, the calculator 904 sets the pixel values C05 through C12 in equations (104) through (111).

The calculator 904 calculates the foreground components based on the equations in which the pixel values are set. For example, the calculator 904 calculates the foreground components F01/v through F08/v, as shown in FIG. 77, based on the calculations of equations (104) through (111) in which the pixel values C05 through C12 are set. The calculator 904 sends the foreground components F01/v through F08/v to the adjusting portion 905.

The adjusting portion 905 multiplies the foreground components sent from the calculator 904 by the amount v of movement within the shutter time included in the motion vector sent from the mixture-ratio calculator 102 so as to obtain the foreground pixel values from which motion blur is eliminated. For example, when the foreground components F01/v through F08/v are sent from the calculator 904, the adjusting portion 905 multiples each of the foreground components F01/v through F08/v by the amount v of movement within the shutter time, i.e., five, so as to obtain the foreground pixel values F01 through F08 from which motion blur has been eliminated, as shown in FIG. 78.

The adjusting portion 905 sends the foreground component image consisting of the foreground pixel values without motion blur, calculated as described above, to a motion-blur adder 906 and a selector 907.

The motion-blur adder 906 adjusts the amount of motion blur by using an amount v' by which motion blur is adjusted, which is different from the amount v of movement within the shutter time, for example, an amount v' by which motion blur is adjusted, which is one half the value of the amount v of movement within the shutter time, or an amount v' by which motion blur is adjusted, which is irrelevant to the amount v of movement within the shutter time. For example, as shown in FIG. 71, the motion-blur adder 906 divides foreground pixel values Fi without motion blur by the amount v' by which motion blur is adjusted so as to obtain foreground components Fi/v'. The motion-blur adder 906 then calculates the sums of foreground components Fi/v' to generate pixel values in which the amount of motion blur is adjusted. For example, when the amount v' by which motion blur is adjusted is three, the pixel value C02 is set to (F01)/v', the pixel value C03 is set to (F01+F02)/v', the pixel value C04 is set to (F01+F02+F03)/v', and the pixel value C05 is set to (F02+F03+F04)/v'.

The motion-blur adder 906 sends the foreground component image in which the amount of motion blur has been adjusted to the selector 907.

The selector 907 selects either the foreground component image without motion blur sent from the adjusting portion 905 or the foreground component image in which the amount of motion blur has been adjusted sent from the motion-blur adder 906, according to a selection signal reflecting a user's selection, and outputs the selected foreground component image.

As discussed above, the motion-blur adjusting unit 104 adjusts the amount of motion blur according to the selection signal and the amount v' by which motion blur is adjusted.

Figure 79:
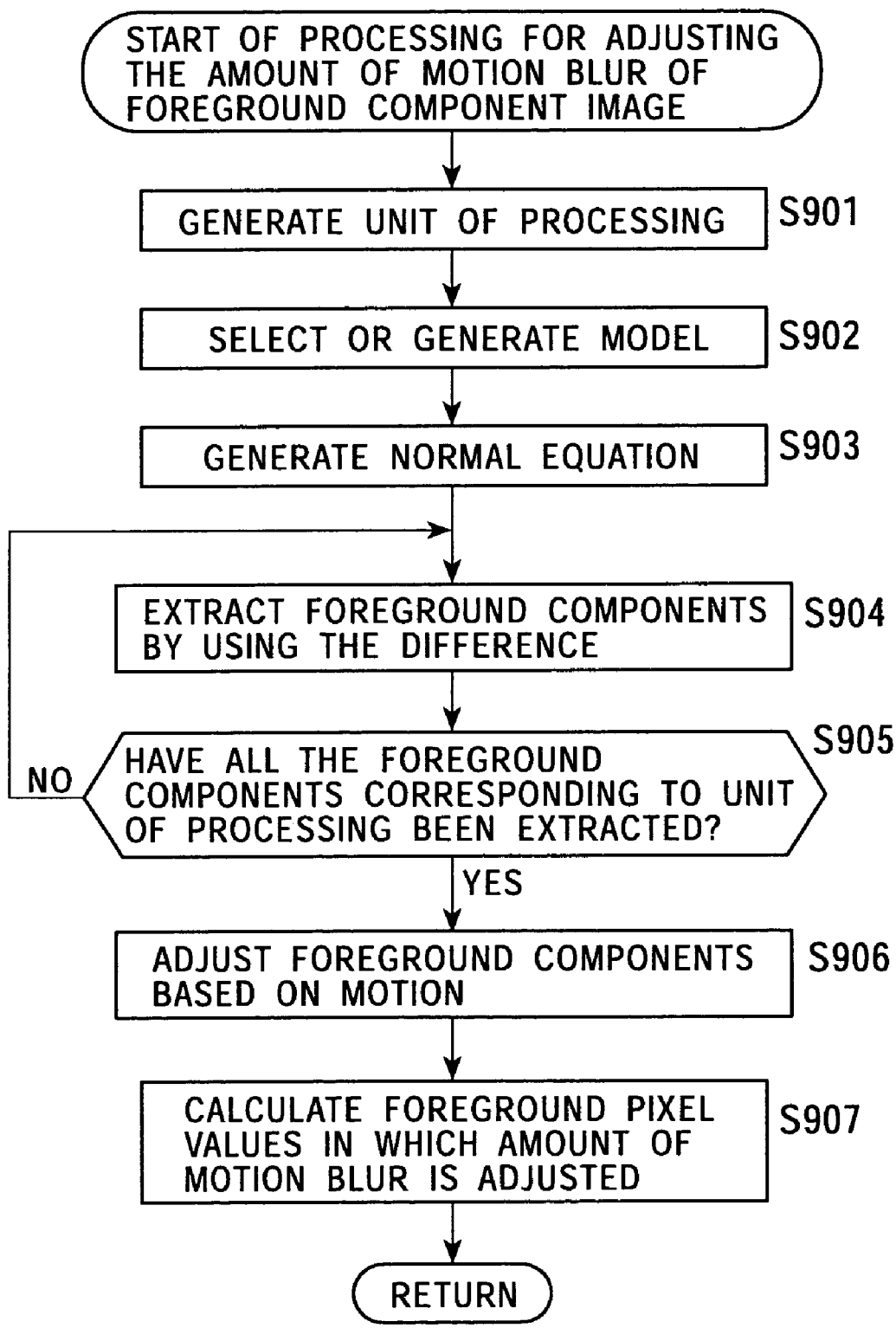
FIG. 79 is a flowchart illustrating processing for adjusting the amount of motion blur included in a foreground.

The processing for adjusting the amount of motion blur in the foreground executed by the motion-blur adjusting unit 104 configured as shown in FIG. 75 is described below with reference to an flowchart shown in FIG. 79.

In step S901, the unit-of-processing determining portion 901 of the motion-blur adjusting unit 104 generates the unit of processing based on the motion vector and the area information, and sends the generated unit of processing to the model-forming portion 902 and the adjusting portion 905.

In step S902, the model-forming portion 902 of the motion-blur adjusting unit 104 selects or generates a model according to the amount v of movement within the shutter time and the unit of processing. In step S903, the equation generator 903 generates, based on the selected or generated model, equations for calculating the foreground components by the difference between the pixel values of the foreground component image.

In step S904, the calculator 904 sets the pixel values of the foreground component image in the generated equations, and extracts foreground components by using the difference between the pixel values based on the equations in which the pixel values are set. In step S905, the calculator 904 determines whether all the foreground components corresponding to the unit of processing have been extracted. If it is determined that all the foreground components corresponding to the unit of processing have not been extracted, the processing returns to step S904, and the processing for extracting foreground components is repeated.

If it is determined in step S905 that all the foreground components corresponding to the unit of processing have been extracted, the processing proceeds to step S906. In step S906, the adjusting portion 905 adjusts each of the foreground components F01/v through F08/v sent from the calculator 904 based on the amount v of movement within the shutter time so as to obtain the foreground pixel values F01 through F08 from which motion blur is eliminated.

In step S907, the motion-blur adder 906 calculates the foreground pixel values in which the amount of motion blur has been adjusted, and the selector 907 selects the image without motion blur or the image in which the amount of motion blur has been adjusted, and outputs the selected image. The processing is then completed.

As described above, the motion-blur adjusting unit 104 configured as shown in FIG. 75 adjusts the motion blur of the foreground image more quickly according to simpler calculations.

A known technique for partially eliminating motion blur, such as a Wiener filter, is effective when being used in the ideal state, but is not sufficient for an actual image quantized and including noise. In contrast, it is proved that the motion-blur adjusting unit 104 configured as shown in FIG. 75 is sufficiently effective for an actual image quantized and including noise. It is thus possible to eliminate motion blur with high precision.

As described above, the image processing apparatus, the structure of which is shown in FIG. 2, can adjust the amount of motion blur included in an input image.

Figure 80:
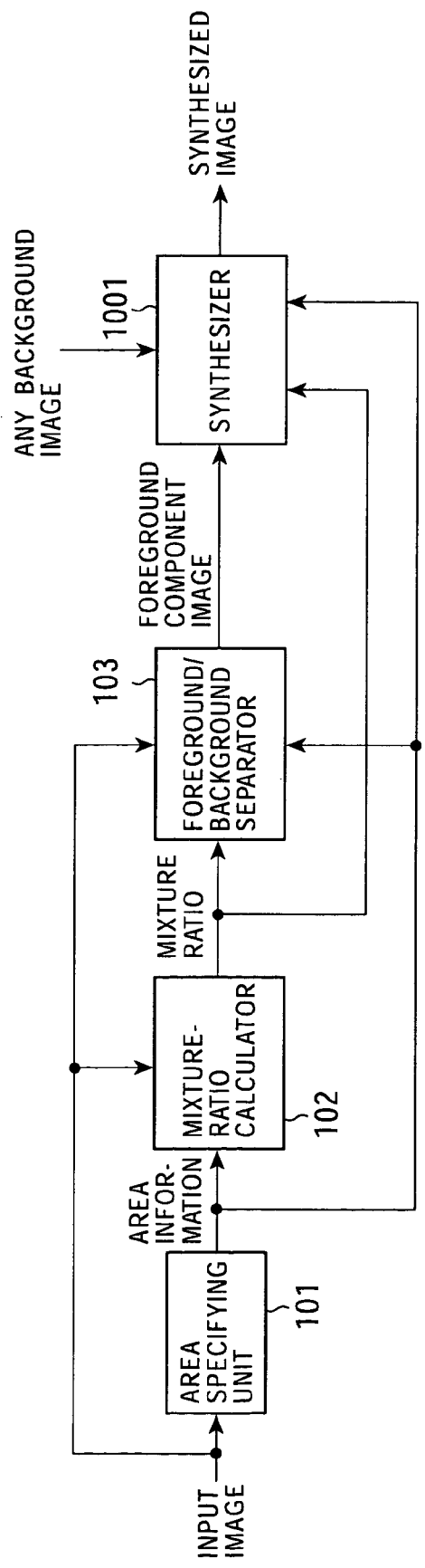
FIG. 80 is a block diagram illustrating another configuration of the function of the image processing apparatus.

FIG. 80 is a block diagram illustrating another configuration of the function of the image processing apparatus. The image processing apparatus, the structure of which is shown in FIG. 80, does not use a motion vector.

Elements similar to those shown in FIG. 2 are designated with the same reference numerals, and an explanation thereof is thus omitted.

An area specifying unit 101 sends area information to a mixture-ratio calculator 102 and a synthesizer 1001.

The mixture-ratio calculator 102 sends a mixture ratio α to a foreground/background separator 103 and the synthesizer 1001.

The foreground/background separator 103 sends a foreground component image to the synthesizer 1001.

The synthesizer 1001 combines any background image with the foreground component image sent from the foreground/background separator 103 according to the mixture ratio α sent from the mixture-ratio calculator 102 and the area information sent from the area specifying unit 101, and outputs a synthesized image in which the any background image and the foreground component image have been combined.

Figure 81:
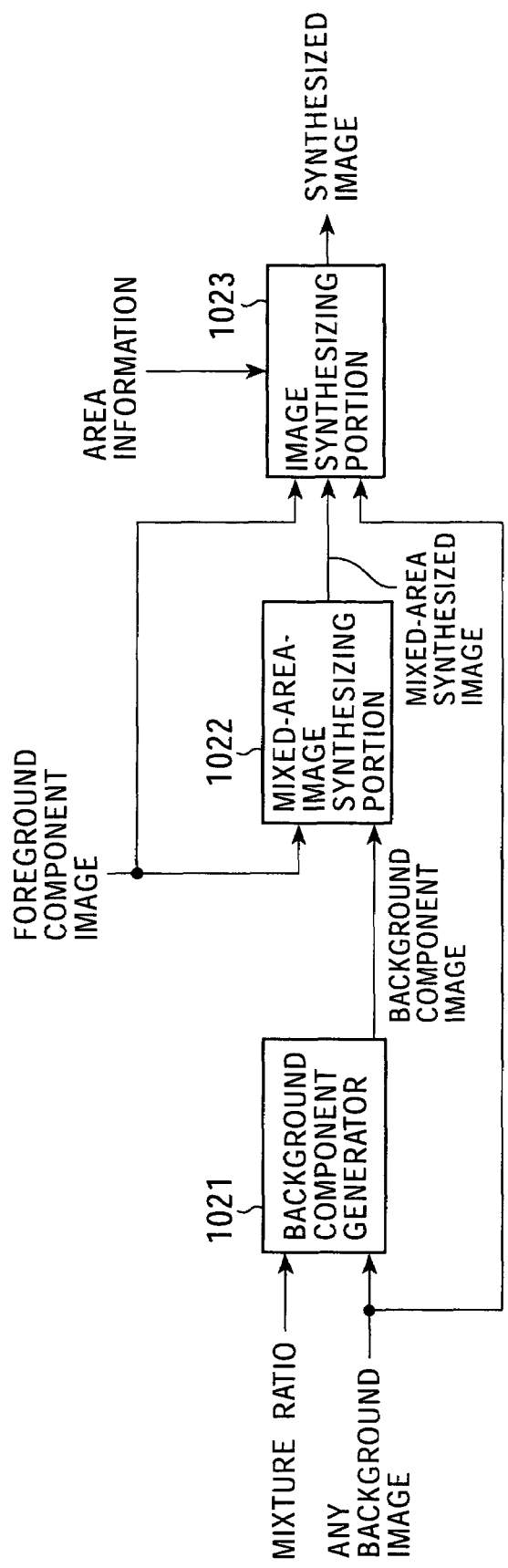
FIG. 81 illustrates the configuration of a synthesizer 1001.

FIG. 81 illustrates the configuration of the synthesizer 1001. A background component generator 1021 generates a background component image according to the mixture ratio α and any background image, and sends the background component image to a mixed-area-image synthesizing portion 1022.

The mixed-area-image synthesizing portion 1022 combines the background component image sent from the background component generator 1021 with the foreground component image so as to generate a mixed-area synthesized image, and sends the generated mixture-area synthesized image to an image synthesizing portion 1023.

The image synthesizer 1023 combines the foreground component image, the mixed-area synthesized image sent from the mixed-area-image synthesizing portion 1022, and the any background image according to the area information so as to generate a synthesized image, and outputs it.

As discussed above, the synthesizer 1001 combines a foreground component image with any background image.

The image obtained by combining a foreground component image with any background image according to the mixture ratio α, which is a feature quantity, appears more natural compared to an image obtained by simply combining pixels.

Figure 82:
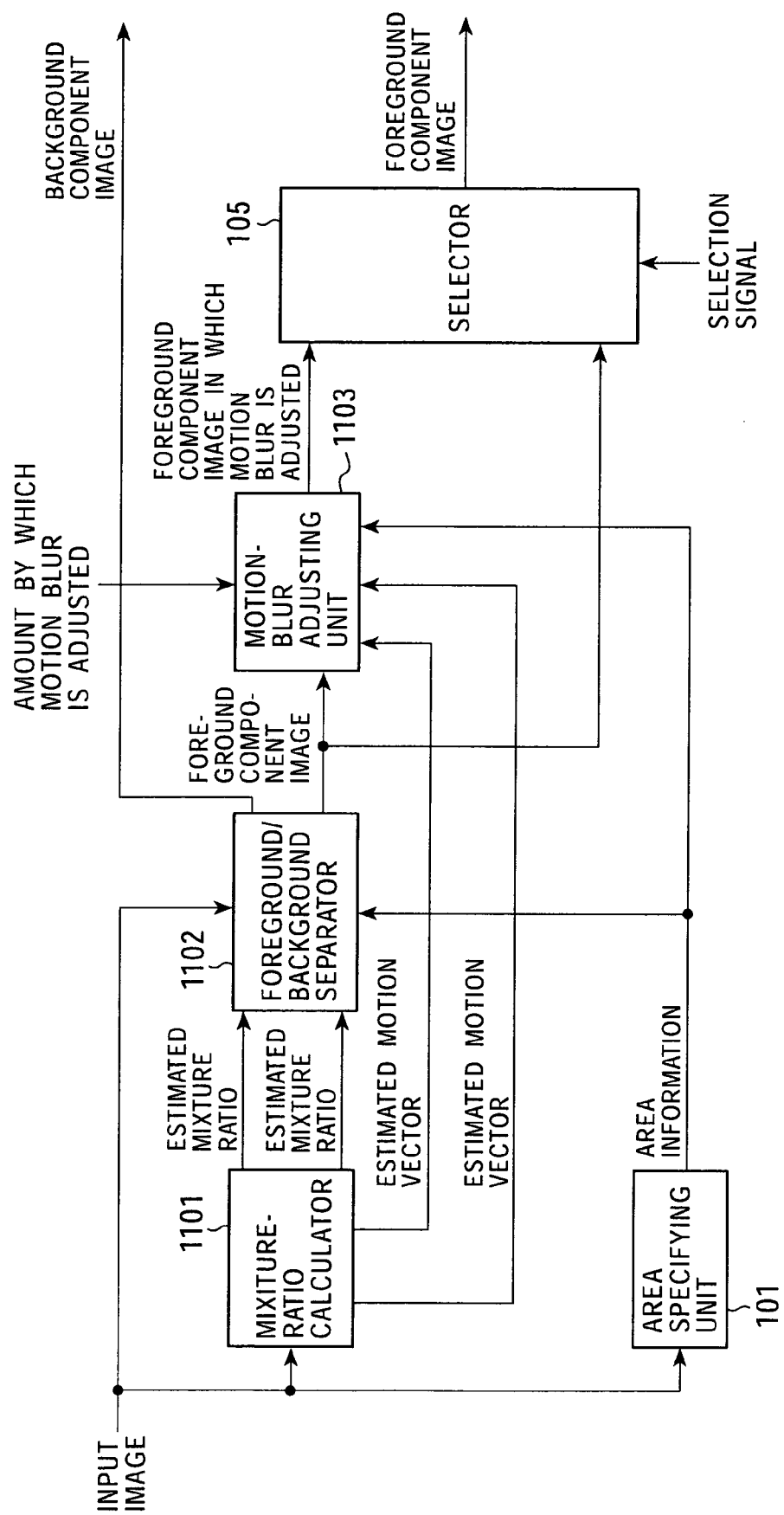
FIG. 82 is a block diagram illustrating still another configuration of the function of the image processing apparatus.

FIG. 82 is a block diagram illustrating still another configuration of the function of the image processing apparatus for adjusting the amount of motion blur. The image processing apparatus shown in FIG. 2 sequentially performs the area-specifying operation and the calculation of a mixture ratio α. In contrast, the image processing apparatus shown in FIG. 82 simultaneously performs the area-specifying operation and the calculation of a mixture ratio α.

Functional elements similar to those in the block diagram of FIG. 2 are designated with the same reference numerals, and an explanation thereof is thus omitted.

An input image is sent to a mixture-ratio calculator 1101, a foreground/background separator 1102, and an area specifying unit 101.

The area specifying unit 101 generates area information according to an input image, and sends the generated area information to the foreground/background separator 1102 and to a motion-blur adjusting unit 1103.

The mixture-ratio calculator 1101 calculates, based on the input image, an estimated mixture ratio obtained when it is assumed that each pixel included in the input image belongs to a covered background area, and an estimated mixture ratio obtained when it is assumed that each pixel included in the input image belongs to an uncovered background area, and sends the calculated estimated mixture ratio obtained when it is assumed that each pixel included in the input image belongs to the covered background area, and the calculated estimated mixture ratio obtained when it is assumed that each pixel included in the input image belongs to the uncovered background area, to the foreground/background separator 1102.

The mixture-ratio calculator 1101 calculates an estimated motion vector obtained when it is assumed that each pixel included in the input image belongs to the covered background area, according to the estimated mixture ratio calculated when it is assumed that each pixel included in the input image belongs to the covered background area, and an estimated motion vector obtained when it is assumed that each pixel included in the input image belongs to the uncovered background area, according to the estimated mixture ratio calculated when it is assumed that each pixel included in the input image belongs to the uncovered background area, and sends the calculated estimated motion vector obtained when it is assumed that each pixel included in the input image belongs to the covered background area, and the calculated estimated motion vector obtained when it is assumed that each pixel included in the input image belongs to the uncovered background area, to the motion-blur adjusting unit 1103.

Figure 83:
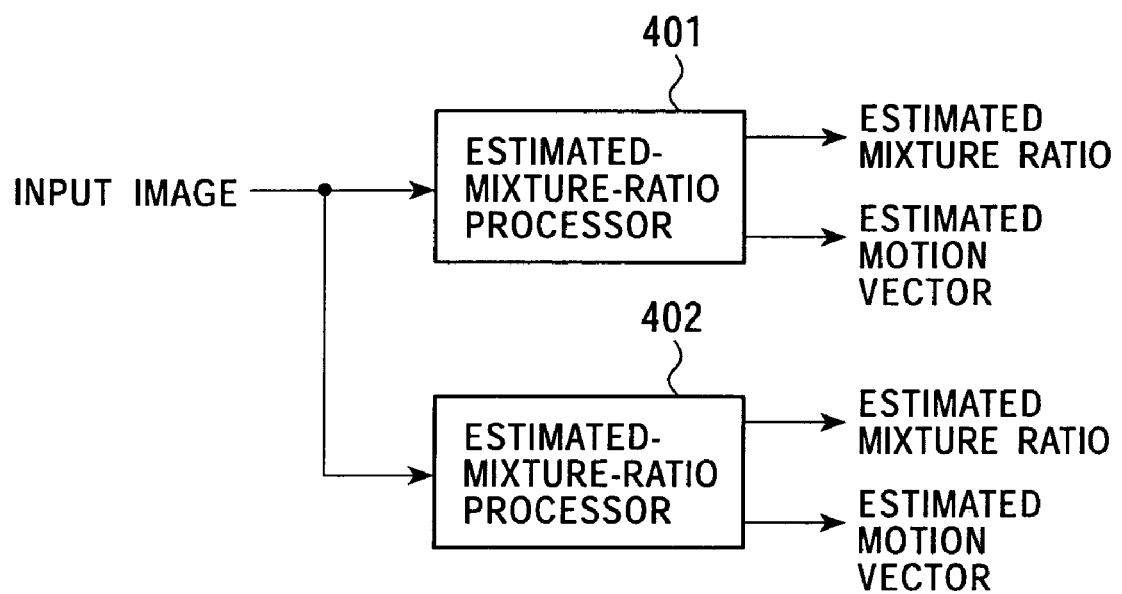
FIG. 83 is a block diagram illustrating the configuration of a mixture-ratio calculator 1101.

FIG. 83 is a block diagram illustrating an example configuration of the mixture-ratio calculator 1101.

An estimated-mixture-ratio processor 401 shown in FIG. 83 is the same as the estimated-mixture-ratio processor 401 shown in FIG. 47. An estimated-mixture-ratio processor 402 shown in FIG. 83 is the same as the estimated-mixture-ratio processor 402 shown in FIG. 47.

The estimated-mixture-ratio processor 401 calculates an estimated mixture ratio for each pixel by the computation corresponding to a model of a covered background area according to an input image, and outputs the calculated estimated mixture ratio. The estimated-mixture-ratio processor 401 calculates an estimated motion vector according to the calculated estimated mixture ratio, and outputs the calculated estimated motion vector.

The estimated-mixture-ratio processor 402 calculates an estimated mixture ratio for each pixel by the computation corresponding to a model of an uncovered background area based on the input image, and outputs the calculated estimated mixture ratio. The estimated-mixture-ratio processor 402 calculates an estimated motion vector according to the calculated estimated mixture ratio, and outputs the calculated estimated motion vector.

The foreground/background separator 1102 generates a foreground component image from the input image according to the estimated mixture ratio calculated when it is assumed that the pixel belongs to the covered background area, sent from the mixture-ratio calculator 1101, the estimated mixture ratio calculated when it is assumed that the pixel belongs to the uncovered background area, sent from the mixture-ratio calculator 1101, and the area information sent from the area specifying unit 101, and sends the generated foreground component image to the motion-blur adjusting unit 1103 and a selector 105.

Figure 84:
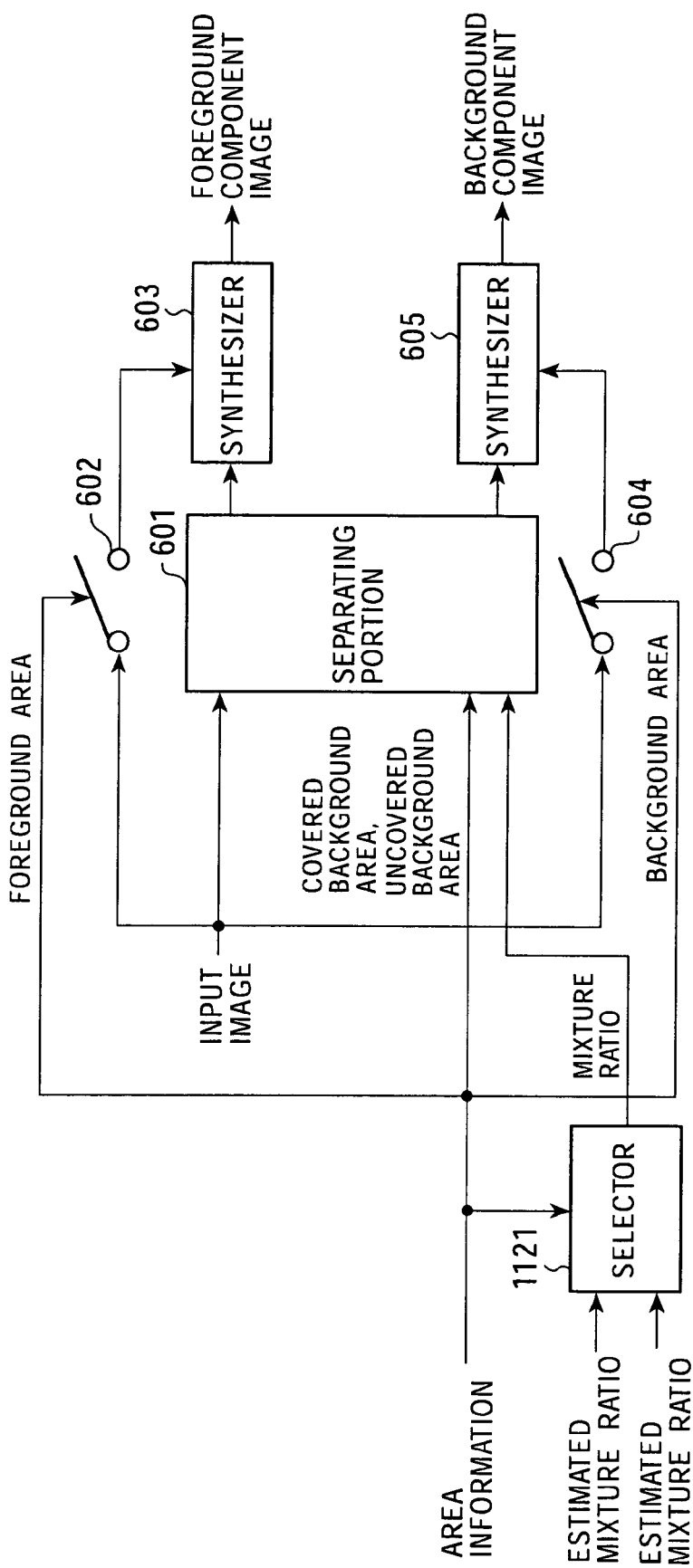
FIG. 84 is a block diagram illustrating the configuration of a foreground/background separator 1102.

FIG. 84 is a block diagram illustrating an example configuration of the foreground/background separator 1102.

Elements similar to those of the foreground/background separator 103 shown in FIG. 59 are indicated by the same reference numerals, and an explanation thereof is thus omitted.

A selector 1121 selects, based on the area information sent from the area specifying unit 101, either the estimated mixture ratio calculated when it is assumed that the pixel belongs to the covered background area, sent from the mixture-ratio calculator 1101 or the estimated mixture ratio calculated when it is assumed that the pixel belongs to the uncovered background area, sent from the mixture-ratio calculator 1101, and sends the selected estimated mixture ratio to a separating portion 601 as the mixture ratio $\alpha$.

The separating portion 601 extracts foreground components and background components from the pixel values of the pixels belonging to the mixed area according to the mixture ratio $\alpha$ sent from the selector 1121 and the area information, and sends the extracted foreground components to a synthesizer 603 and also sends the background components to a synthesizer 605.

The separating portion 601 can have the same structure as that shown in FIG. 64.

The synthesizer 603 synthesizes a foreground component image and outputs it. The synthesizer 605 synthesizes a background component image and outputs it.

The motion-blur adjusting unit 1103 adjusts the amount of motion blur included in the foreground component image sent from the foreground/background separator 1102 according to the area information sent from the area specifying unit 101, the estimated motion vector calculated when it is assumed that the pixel belongs to the covered background area, sent from the mixture-ratio calculator 1101, and the estimated motion vector calculated when it is assumed that the pixel belongs to the uncovered background area, sent from the mixture-ratio calculator 1101, and outputs a foreground component image in which the amount of motion blur has been adjusted.

Figure 85:
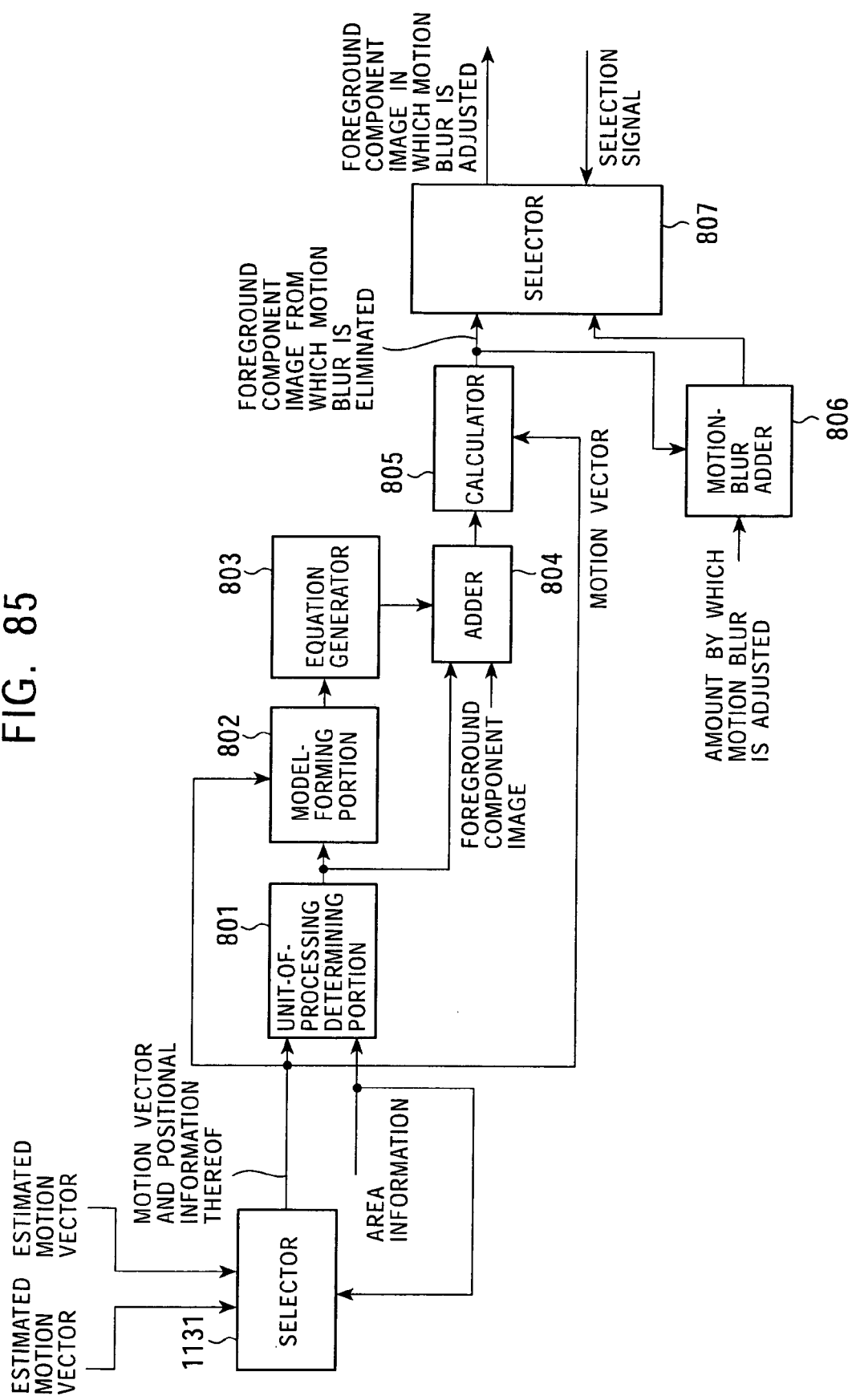
FIG. 85 is a block diagram illustrating the configuration of a motion-blur adjusting unit 1103.

FIG. 85 is a block diagram illustrating the structure of the motion-blur adjusting unit 1103.

Functional elements similar to those shown in FIG. 67 are designated with the same reference numerals, and an explanation thereof is thus omitted.

A selector 1131 selects, based on the area information sent from the area specifying unit 101, either the estimated motion vector calculated when it is assumed that the pixel belongs to the covered background area, sent from the mixture-ratio calculator 1101 or the estimated motion vector calculated when it is assumed that the pixel belongs to the uncovered background area, sent from the mixture-ratio calculator 1101; specifies the selected estimated motion vector as the motion vector; and sends the motion vector to a unit-of-processing determining portion 801, a model-forming portion 802, and a calculator 805.

Back to FIG. 82, the selector 105 selects the foreground component image sent from the foreground/background separator 1102 or the foreground component image in which the amount of motion blur has been adjusted, sent from the motion-blur adjusting unit 1103 according to, for example, a selection signal reflecting a user's selection, and outputs the selected foreground component image.

As discussed above, the image processing apparatus, the structure of which is shown in FIG. 82, adjusts the amount of motion blur included in an image corresponding to a foreground object of the input image, and outputs the resulting foreground object image.

The embodiment has been discussed above by setting the mixture ratio $\alpha$ to the ratio of background components included in pixel values. However, the mixture ratio $\alpha$ may be set to the ratio of foreground components included in pixel values.

The embodiment has been discussed above by setting the moving direction of the foreground object to the direction from the left to the right. However, the moving direction is not restricted to the above-described direction.

In the above description, a real-space image having a three-dimensional space and time-axis information is projected onto a time space having a two-dimensional space and time-axis information by using a video camera. However, the present invention is not restricted to this case, and can be applied to a case in which, when first information in a larger-number first dimensional space is projected onto second information in a smaller-number second dimensional space, distortion generated by the projection is corrected, significant information is extracted, or a more natural image is synthesized.

The sensor is not restricted to a CCD, and may be another solid-state image-capturing device, such as a CMOS (Complementary Metal Oxide Semiconductor), a BBD (Bucket Brigade Device), a CID (Charge Injection Device), or a CPD (Charge Priming Device). Also, the sensor does not have to be a sensor in which detection elements are arranged in a matrix, and may be a sensor in which detection elements are arranged in one line.

A recording medium in which a program for performing the signal processing of the present invention is recorded may be formed of a package medium in which the program is recorded and which is distributed for providing the program for a user separately from the computer, such as the magnetic disk 51 (including a floppy (registered trade name) disk), the optical disk 52 (CD-ROM (Compact Disc-Read Only Memory) and a DVD (Digital Versatile Disc)), the magneto-optical disk 53 (including MD (Mini-Disc) (registered trade name)), or the semiconductor memory 54, as shown in FIG. 1. The recording medium may also be formed of the ROM 22 or a hard disk included in the storage unit 28 in which the program is recorded, such recording medium being provided for the user while being pre-stored in the computer.

In the present specification, the steps describing the program recorded in a recording medium include processing executed time-sequentially according to a described order, and also processing not necessarily executed in a time-sequential manner but executed in parallel or individually.

INDUSTRIAL APPLICABILITY

According to the present invention, the amount of movement which indicates the movement of an object within an exposure period can be obtained.

The invention claimed is:

1. An image processing apparatus for processing image data which is formed of a predetermined number of pixel data obtained by an image-capturing device that includes a predetermined number of pixels having a time integrating function, the image processing apparatus comprising:
   mixture-ratio detection means for detecting, in a mixture area where a foreground object component constituting a foreground object and a background object component constituting a background object are mixed in the image data, a mixture ratio indicating the ratio of a mixture between the foreground object component and the background object component; and
   movement-amount detection means for detecting the amount of movement of the foreground object in an exposure period when the pixel data constituting the image data has been obtained, as a function of the mixture ratio.

2. The image processing apparatus according to claim 1, wherein the mixture-ratio detection means comprises:
   relational-expression generating means for extracting, in correspondence with a designated pixel in a designated frame of the image data, the pixel data in a nearby frame close to the designated frame as background pixel data corresponding to the background object;
   means for extracting the designated-pixel data of the designated pixel and vicinity-pixel data of a vicinity pixel in a vicinity of the designated pixel in the designated frame; and
   means for generating a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

3. The image processing apparatus according to claim 2, wherein the relational-expression generating means generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

4. The image processing apparatus according to claim 3, wherein the movement-amount detection means detects the reciprocal of the gradient of the linear changes of the mixture ratios corresponding to the positions of the pixels in the mixture area as the amount of movement of the foreground object within the exposure period when the image data has been obtained, and outputs the detected amount of movement.

5. An image processing method for processing image data which is formed of a predetermined number of pixel data obtained by an image-capturing device that includes a predetermined number of pixels having a time integrating function, the image processing method comprising:
   a mixture-ratio detection step of detecting, in a mixture area where a foreground object component constituting a foreground object and a background object component constituting a background object are mixed in the image data, a mixture ratio indicating the ratio of a mixture between the foreground object component and the background object component; and
   a movement-amount detection step of detecting the amount of movement of the foreground object in an exposure period when the pixel data constituting the image data has been obtained, as a function of the mixture ratio.

6. The image processing method according to claim 5, wherein the mixture-ratio detection step comprises:
   a relational-expression generating step of extracting, in correspondence with a designated pixel in a designated frame of the image data, the pixel data in a nearby frame close to the designated frame as background pixel data corresponding to the background object; also of extracting the designated-pixel data of the designated pixel and vicinity-pixel data of a vicinity pixel in a vicinity of the designated pixel in the designated frame; and
   a step of generating a plurality of relational expressions indicating relationships among the designated-pixel data, the vicinity-pixel data, and the background pixel data corresponding to the designated pixel and the vicinity pixel, and
   a step of detecting the mixture ratios of the designated pixel and the vicinity pixel according to the relational expressions in the mixture-ratio detection step.

7. The image processing method according to claim 6, wherein in the relational-expression generating step, the relational expressions are generated according to a first approximation in which the values of components of the foreground object are the same, the components being included in the designated-pixel data and the vicinity-pixel data, and a second approximation in which the mixture ratio changes linearly with respect to the positions of the pixels in the mixture area.

8. The image processing method according to claim 7, wherein in the movement-amount detection step, the reciprocal of the gradient of the linear changes of the mixture ratios corresponding to the positions of the pixels in the mixture area is detected as the amount of movement of the foreground object within the exposure period when the image data has been obtained, and the detected amount of movement is output.

9. A recording medium having recorded thereon a program stored on a computer-readable storage medium readable by a computer, for causing the computer to execute a process for processing image data which is formed of a predetermined number of pixel data obtained by an image-capturing device that includes a predetermined number of pixels having a time integrating function, the process comprising:

a mixture-ratio detection step of detecting, in a mixture area where a foreground object component constituting a foreground object and a background object component constituting a background object are mixed in the image data, a mixture ratio indicating the ratio of a mixture between the foreground object component and the background object component, and a movement-amount detection step of detecting the amount of movement of the foreground object in an exposure period when the pixel data constituting the image data has been obtained, as a function of the mixture ratio.

10. The recording medium according to claim 9, wherein the mixture-ratio detection step comprises:

a relational-expression generating step of extracting, in correspondence with a designated pixel in a designated frame of the image data, the pixel data in a nearby frame close to the designated frame as background pixel data corresponding to the background object;

an extracting step of extracting the designated-pixel data of the designated pixel and vicinity-pixel data of a vicinity pixel in a vicinity of the designated pixel in the designated frame; and a step of generating a plurality of relational expressions indicating relationships among the designated-pixel data, the vicinity-pixel data, and the background pixel data corresponding to the designated pixel and the vicinity pixel, and a step of detecting the mixture ratios of the designated pixel and the vicinity pixel according to the relational expressions in the mixture-ratio detection step.

11. The recording medium according to claim 10, wherein in the relational-expression generating step, the relational expressions are generated according to a first approximation in which the values of components of the foreground object are the same, the components being included in the designated-pixel data and the vicinity-pixel data, and a second approximation in which the mixture ratio changes linearly with respect to the positions of the pixels in the mixture area.

12. The recording medium according to claim 11, wherein in the movement-amount detection step, the reciprocal of the gradient of the linear changes of the mixture ratios corresponding to the positions of the pixels in the mixture area is detected as the amount of movement of the foreground object within the exposure period when the image data has been obtained, and the detected amount of movement is output.

13. An image-capturing apparatus:

image-capturing means for outputting an image of an object captured by an image-capturing device that includes a predetermined number of pixels having a time integrating function, as image data formed of a predetermined number of pixel data;

mixture-ratio detection means for detecting, in a mixture area where a foreground object component constituting a foreground object and a background object component constituting a background object are mixed in the image data, a mixture ratio indicating the ratio of a mixture between the foreground object component and the background object component, and movement-amount detection means for detecting the amount of movement of the foreground object in an exposure period when the pixel data constituting the image data has been obtained, as a function of the mixture ratio.

14. The image-capturing apparatus according to claim 13, wherein the mixture-ratio detection means comprises:

relational-expression generating means for extracting, in correspondence with a designated pixel in a designated frame of the image data, the pixel data in a nearby frame close to the designated frame as background pixel data corresponding to the background object;

means for extracting the designated-pixel data of the designated pixel and vicinity-pixel data of a vicinity pixel in a vicinity of the designated pixel in the designated frame; and means for generating a plurality of relational expressions indicating relationships among the designated-pixel data, the vicinity-pixel data, and the background pixel data corresponding to the designated pixel and the vicinity pixel, and means for detecting mixture ratios of the designated pixel and the vicinity pixel according to the relational expressions.

15. The image-capturing apparatus according to claim 14, wherein the relational-expression generating means generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

16. The image-capturing apparatus according to claim 15, wherein the movement-amount detection means detects the reciprocal of the gradient of the linear changes of the mixture ratios corresponding to the positions of the pixels in the mixture area as the amount of movement of the foreground object within the exposure period when the image data has been obtained, and outputs the detected amount of movement.

17. An image processing apparatus, comprising:

a mixture-ratio detection unit configured to detect a mixture ratio indicating a mixture between a foreground object and a background object; and a movement-amount detection unit configured to detect an amount of movement of the foreground object in an exposure period as a function of the mixture ratio.

18. The image processing apparatus according to claim 17, wherein the mixture-ratio detection unit comprises a relational-expression generating unit adapted to:

extract, in correspondence with a designated pixel in a designated frame of the image data, pixel data in a nearby frame close to the designated frame as background pixel data corresponding to the background object; and adapted to extract the designated-pixel data of the designated pixel and vicinity-pixel data of a vicinity pixel in a vicinity of the designated pixel in the designated frame;

generate a plurality of relational expressions indicating relationships among the designated-pixel data, vicinity-pixel data, and background pixel data corresponding to the designated pixel and the vicinity pixel; and detect mixture ratios of the designated pixel and the vicinity pixel according to the relational expressions.

19. The image processing apparatus according to claim 18, wherein the relational-expression generating unit generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

20. The image processing apparatus according to claim 19, wherein the movement-amount detection unit detects the reciprocal of the gradient of the linear changes of the mixture ratios corresponding to the positions of the pixels in the mixture area as the amount of movement of the foreground object within the exposure period when the image data has been obtained, and outputs the detected amount of movement.

21. An image-capturing apparatus, comprising:
an image-capturing unit adapted to output an image of an object captured by an image-capturing device that includes a predetermined number of pixels having a time integrating function, as image data formed of a predetermined number of pixel data;
a mixture-ratio detection unit adapted to detect, in a mixture area where a foreground object component constituting a foreground object and a background object component constituting a background object are mixed in the image data, a mixture ratio indicating the ratio of a mixture between the foreground object component and the background object component, and
a movement-amount detection unit adapted to detect the amount of movement of the foreground object in an exposure period when the pixel data constituting the image data has been obtained, as a function of the mixture ratio.

22. The image-capturing apparatus according to claim 21, wherein the mixture-ratio detection unit comprises relational-expression generating units adapted to:
extract, in correspondence with a designated pixel in a designated frame of the image data, the pixel data in a nearby frame close to the designated frame as background pixel data corresponding to the background object;
extract the designated-pixel data of the designated pixel and vicinity-pixel data of a vicinity pixel in a vicinity of the designated pixel in the designated frame; and
generate a plurality of relational expressions indicating relationships among the designated-pixel data, the vicinity-pixel data, and the background pixel data corresponding to the designated pixel and the vicinity pixel, and mixture ratios of the designated pixel and the vicinity pixel are detected according to the relational expressions.

23. The image-capturing apparatus according to claim 22, wherein the relational-expression generating unit generates the relational expressions according to a first approximation in which the values of components of the foreground object are the same, the components being included in the designated-pixel data and the vicinity-pixel data, and a second approximation in which the mixture ratio changes linearly with respect to the positions of the pixels in the mixture area.

24. The image-capturing apparatus according to claim 23, wherein the movement-amount detection unit detects the reciprocal of the gradient of the linear changes of the mixture ratios corresponding to the positions of the pixels in the mixture area as the amount of movement of the foreground object within the exposure period when the image data has been obtained, and outputs the detected amount of movement.

* * * * *